(12) United States Patent
Maiocco et al.

(10) Patent No.: US 8,239,527 B2
(45) Date of Patent: *Aug. 7, 2012

(54) SYSTEM AND INTERFACE FOR MONITORING INFORMATION TECHNOLOGY ASSETS

(75) Inventors: James N. Maiocco, Seattle, WA (US); Bradley M. Belanger, Seattle, WA (US); Brian E. Mansell, Seattle, WA (US); John A. McCaskey, Seattle, WA (US)

(73) Assignee: Compuware Corporation, Detroit, MI (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/783,567

(22) Filed: May 20, 2010

(65) Prior Publication Data

US 2010/0229096 A1  Sep. 9, 2010

Related U.S. Application Data

(63) Continuation of application No. 11/167,057, filed on Jun. 24, 2005, now Pat. No. 7,752,301, which is a continuation-in-part of application No. 11/120,326, filed on May 2, 2005, now abandoned, said application No. 11/167,057 is a continuation-in-part of application No. 10/826,548, filed on Apr. 16, 2004, now Pat. No. 7,478,151, which is a continuation of application No. 10/764,276, filed on Jan. 23, 2004, now abandoned.

(60) Provisional application No. 60/568,837, filed on May 6, 2004, provisional application No. 60/581,304, filed on Jun. 18, 2004, provisional application No. 60/442,021, filed on Jan. 23, 2003, provisional application No. 60/442,023, filed on Jan. 23, 2003, provisional application No. 60/453,686, filed on Mar. 11, 2003, provisional application No. 60/492,472, filed on Aug. 5, 2003.

(51) Int. Cl.
*G01R 31/08* (2006.01)
*G06F 15/173* (2006.01)

(52) U.S. Cl. .................................. 709/224; 370/230

(58) Field of Classification Search ............ 370/203, 370/389, 397; 709/223, 224; 715/733; 455/423
See application file for complete search history.

(56) References Cited

U.S. PATENT DOCUMENTS

| | | | |
|---|---|---|---|
| 6,664,978 B1 * | 12/2003 | Kekic et al. | 715/733 |
| 6,681,232 B1 * | 1/2004 | Sistanizadeh et al. | 1/1 |
| 6,801,940 B1 * | 10/2004 | Moran et al. | 709/224 |
| 7,093,011 B2 * | 8/2006 | Hirata et al. | 709/223 |
| 2002/0068559 A1 * | 6/2002 | Sharma et al. | 455/423 |
| 2002/0116638 A1 * | 8/2002 | Dobes et al. | 713/201 |
| 2003/0093521 A1 * | 5/2003 | Schlonski et al. | 709/224 |
| 2003/0110252 A1 * | 6/2003 | Yang-Huffman | 709/224 |
| 2004/0044753 A1 * | 3/2004 | Toyoshima et al. | 709/223 |
| 2004/0093408 A1 * | 5/2004 | Hirani et al. | 709/224 |
| 2005/0099288 A1 * | 5/2005 | Spitz et al. | 340/506 |

* cited by examiner

Primary Examiner — Kwang B Yao
Assistant Examiner — Awet Haile
(74) Attorney, Agent, or Firm — Fenwick & West LLP

(57) ABSTRACT

An application service provider (ASP)-based interface and system for analyzing performance and costs of respective enterprise information technology assets from the correlation of metrics data of enterprise SNMP-enabled devices.

16 Claims, 94 Drawing Sheets

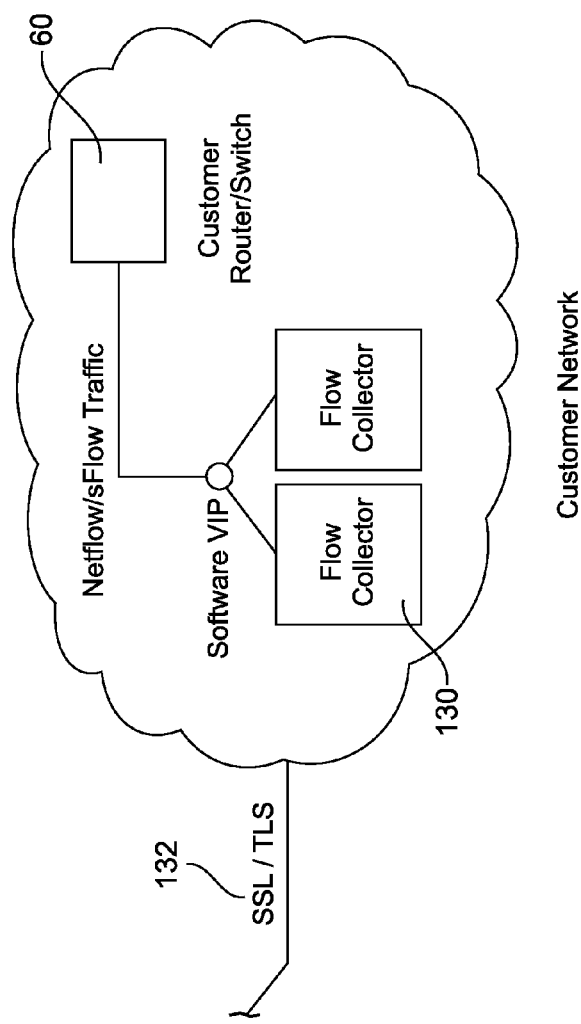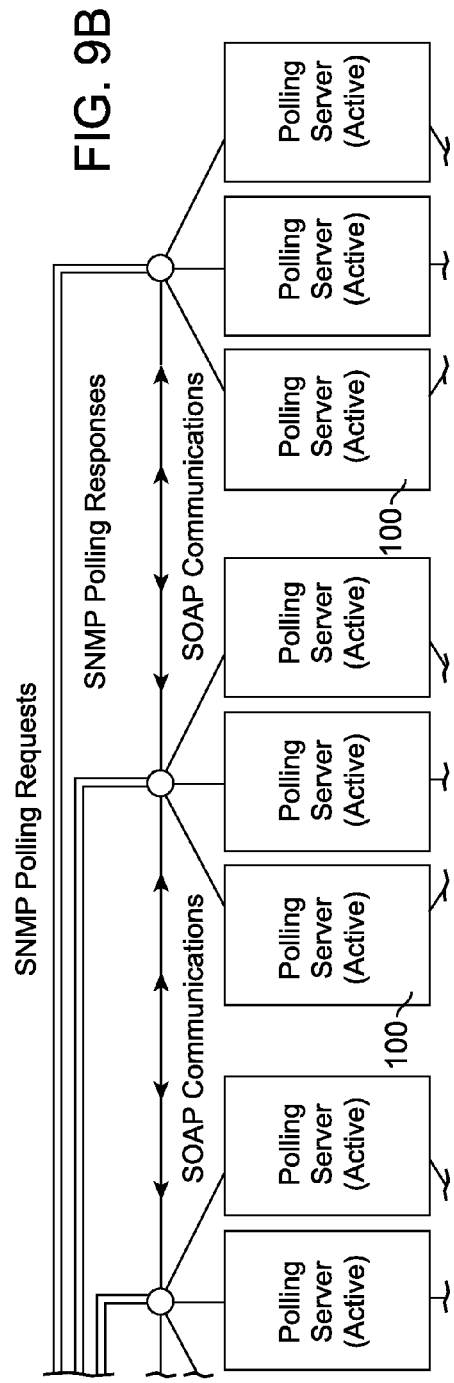
FIG. 9B

File Edit View Go Bookmarks Tools Help http://www.klir.com/platform/dashboard.html (Klir)TECHNOLOGIES™

✓Dashboard | 🖹Reports | ⚠Alerts | ◇Providers | ◇Devices | ▫Users | ⌖Account | ⛭Preferences | ⛨Support | ⎋Log Out

Reports

| New Report | My Reports (36) | Public Reports (19) |

Select Metrics

☐ Device
☐ Interface
☐ VPN

| Template | Description |
|---|---|
| ◉ Metric Summary | Performance across multiple Devices for a single Metric type |
| ○ Top 10 Metric Summary | Performance across multiple Devices for a single Metric type (Top 10 by Group Criteria) |
| ○ Bottom 10 Metric Summary | Performance across multiple Devices for a single Metric type (Bottom 10 by Group Criteria) |
| ○ Device/Interface Summary | Multiple Metrics on a single Device/Interface |
| ○ Status Summary | Current Availability, CPU, Memory, and Traffic Utilization Metrics across multiple Devices |
| ○ Alert Summary | Proactive Alerts: Static, Cumulative, Variable and Standard Deviation Thresholds |
| ○ KPI Summary | Consolidated eKPI and cKPI report |
| ○ eKPI Summary | Equipment Key Performance Indicators (eKPI) |
| ○ cKPI Summary | Circuit Key Performance Indicators (cKPI) |

Showing 1 to 9 of 9

Display Options

Group Criteria: [Device ▾]
View Range: [Current Day ▾]
Graph Interval: [Hour ▾]
Aggregate Type: [Average ▾]
Time Zone: [Device (Local) ▾]

[Generate Report]

Copyright 1999-2005. Klir Technologies, Inc. All rights reserved.

Done

| | Report Name | Template | View Range | Distribution | Frequency | Date Saved |
|---|---|---|---|---|---|---|
| ⦿ | Active Exchange Users | Metric Summary | Current Day | [None] | [n/a] | 05/28/2004 |
| ○ | Active Exchange Users-Seattle | Metric Summary | Current Week | [None] | [n/a] | 07/15/2004 |
| ○ | Active Wireless Clients | Metric Summary | Current Week | [None] | [n/a] | 07/15/2004 |
| ○ | APC Battery Capacity | Metric Summary | Current Day | [None] | [n/a] | 06/03/2004 |
| ○ | APC Battery Overvie | Device/Interface Summary | Current Day | [None] | [n/a] | 05/06/2005 |
| ○ | Availability by Country | Status Summary | Current Hour | [None] | [n/a] | 05/05/2004 |
| ○ | Bottom 10 Util by Device | Top 10 Metric Summary | Current Week | jamesm@jpsciences.com | Weekly | 08/11/2004 |
| ○ | Business Unit Traffic | Metric Summary | Current Day | [None] | [n/a] | 04/15/2004 |
| ○ | Corporate Firewall | Device/Interface Summary | Current Day | [None] | [n/a] | 04/15/2004 |
| ○ | Daily Traffic by ISP | Metric Summary | Current Day | [None] | [n/a] | 04/15/2004 |
| ○ | Dummy Report | Metric Summary | 05/12/2004-05/12/2004 | [None] | [n/a] | 05/12/2004 |
| ○ | eKPI Previous Week | eKPI Summary | Previous Week | [None] | [n/a] | 04/16/2004 |
| ○ | Equipment Cost by Business Unit | eKPI Summary | Previous Month | [None] | [n/a] | 07/01/2004 |
| ○ | Equipment Costs by BU | eKPI Summary | Current Month | [None] | [n/a] | 05/04/2004 |
| ○ | Equipment Costs by Business Unit | eKPI Summary | Previous Month | [None] | [n/a] | 07/01/2004 |
| ○ | Equipment Costs by Make | eKPI Summary | Current Month | [None] | [n/a] | 06/19/2004 |
| ○ | Exchange Server Summary | Device/Interface Summary | Current Day | [None] | [n/a] | 06/03/2004 |
| ○ | ISP Costs by BU | cKPI Summary | Current Month | jamesm@jpsciences.com | Weekly | 05/04/2004 |
| ○ | ISP Costs by Provider | cKPI Summary | Current Month | jamesm@jpsciences.com | Daily | 06/22/2004 |
| ○ | Netscreen Tunnel Traffic | Metric Summary | Current Day | [None] | [n/a] | 08/09/2004 |

Showing 1 to 20 of 36  Next 20 >>

Reports

New Report | My Reports (36) | Public Reports (19)

| | Author ^ | Report Name | Template | View Range | Date Saved |
|---|---|---|---|---|---|
| ● | bradb@klir.com | Interface Traffic (Top 10) | Top 10 Metric Summary | Current Day | 06/03/2004 |
| ○ | bradb@klir.com | Top 10 Tunnel Latency | Top 10 Metric Summary | Current Day | 12/07/2004 |
| ○ | bradb@klir.com | Tunnel Avail (Bottom 10) | Bottom 10 Metric Summary | Current Week | 04/19/2005 |
| ○ | bradb@klir.com | Tunnel Latency (Top 10) | Top 10 Metric Summary | Current Day | 06/02/2004 |
| ○ | bradb@klir.com | Tunnel Traffic (Top 10) | Top 10 Metric Summary | Current Day | 06/03/2004 |
| ○ | brianm@klir.com | Company Tunnel Availability | Metric Summary | Current Day | 02/23/2005 |
| ○ | brianm@klir.com | Email Availability | Metric Summary | Current Day | 10/27/2004 |
| ○ | brianm@klir.com | Polling Servers - Dev/If Summary | Device/Interface Summary | Current Day | 01/26/2005 |
| ○ | brianm@klir.com | Web Servers - Dev/If Summary | Device/Interface Summary | Current Day | 01/26/2005 |
| ○ | daven@klir.com | ddd | Status Summary | Current Hour | 04/25/2005 |
| ○ | daven@klir.com | Status Summary | Status Summary | Current Hour | 04/21/2005 |
| ○ | daven@klir.com | Tunnel Availability | Metric Summary | Current Week | 04/19/2005 |
| ○ | davensuper@klir.com | Top 10 Traffic By Account | Top 10 Metric Summary | Current Week | 05/11/2005 |
| ○ | ops@klir.com | Customer VPN Latency (Top 10) | Top 10 Metric Summary | Current Week | 04/17/2005 |
| ○ | ops@klir.com | Customer VPN Stability (Bot 10) | Bottom 10 Metric Summary | Current Week | 04/17/2005 |
| ○ | ops@klir.com | Email Avail | Metric Summary | Current Week | 10/26/2004 |
| ○ | ops@klir.com | Ops Alerts | Alert Summary | Current Day | 04/17/2005 |
| ○ | ops@klir.com | Status | Status Summary | Current Hour | 04/17/2005 |
| ○ | troyd@klir.com | Errors | Top 10 Metric Summary | Current Day | 04/29/2005 |

Showing 1 to 19 of 19

[Open] [Copy to My Reports]

Copyright 1999-2005. Klir Technologies, Inc. All rights reserved.

FIG. 14

Saved Alerts

| Alert Name ^ | Group Criteria | Group Selections | Metric | Days | Time Frame | Type | Threshold |
|---|---|---|---|---|---|---|---|
| ● Email Availability Alert | Device | Exchange Server | Email Availability | All Week | All Day | Cumulative | If current metric value falls below 95 % for 25... |
| ○ Global CPU Alert | Make | Dell | CPU Utilization | All Week | All Day | Cumulative | If current metric value exceeds 70 % for 50% of... |
| ○ Global Throughput Utilize | Device | backup01.ips.corp, dbpxy01.... | Device Traffic Utilize... | All Week | All Day | Cumulative | If current metric value exceeds 70 % for 60% of... |

Showing 1 to 3 of 3

[Add] [Edit] [Delete]

| Provider Account Name ^ | Provider Name | Billing Type | cKPI Target Type | cKPI Target (High) | cKPI Target (Low) |
|---|---|---|---|---|---|
| ⦿ MCI Datacenter FE | MCI | Burstable | Per Interface | [n/a] | [n/a] |
| ○ XO T1 Corp | XO | Fixed | Global | 1.54 mbps | 512 kbps |

Showing 1 to 2 of 2

[Add] [Edit] [Delete]

Device Configuration
Device Settings

Device Configuration
- Setup Date: 2/24/2005
- Device Name: backup01.ips.corp
- Type: Server
- Serial Number:
- Make: Dell
- Model: 750
- eKPI: ⦿ On  ○ Off
- eKPI Target: 0.60  (0.05-1.00)
- Business Unit:

Device Location Settings
- Time Zone: GMT-7 Pacific Time (US & Canada); Tijuana
- Continent: North America
- Country: US
- State/Province: WA
- City: Seattle
- Region: Northwest
- Datacenter: IDF Closet
- Location Name 2:

| Device Name ∧ | Interface Name | IP Address | Business Unit | Provider | Connection Type | Circuit Capacity | Setup Date |
|---|---|---|---|---|---|---|---|
| ⊙ backup01.ips.corp | eth0 | 10.254.0.26 | | LAN | Fast-E | 1 gbps | 3/25/2005 |
| ○ dbpxy01.sea.prod | Eth0 | | | LAN | Fast-E | 100 mbps | 1/03/2005 |
| ○ dbpxy01.sea.prod | Eth1 | | | LAN | Fast-E | 100 mbps | 1/03/2005 |
| ○ dbpxy02.ips.prod | Eth0 | | | LAN | Fast-E | 100 mbps | 2/24/2005 |
| ○ dbpxy02.ips.prod | Eth1 | | | LAN | Fast-E | 100 mbps | 2/24/2005 |
| ○ dc01.ips.corp | eth1 | 10.254.0.129 | | LAN | GIG-E | 1 gbps | 11/11/2004 |
| ○ Exchange Server | Eth0 | 10.254.0.194 | Corporate | LAN | Fast-E | 100 mbps | 3/14/2005 |
| ○ firepass.klir.com | eth0 | 10.254.0.125 | | LAN | Fast-E | 100 mbps | 4/06/2005 |
| ○ fw000.sea.prod | e2/1-internet | 65.203.228.20 | | LAN | Fast-E | 100 mbps | 12/16/2004 |
| ○ fw000.sea.prod | e2/3-dmz | 65.203.233.189 | | LAN | Fast-E | 100 mbps | 12/16/2004 |
| ○ fw000.sea.prod | mgt | 10.254.1.246 | | LAN | Fast-E | 100 mbps | 12/16/2004 |
| ○ fw001.sea.prod | e2/1-internet | 65.203.228.20 | | LAN | Fast-E | 100 mbps | 12/16/2004 |
| ○ fw001.sea.prod | e2/3-dmz | 65.203.133.189 | | LAN | Fast-E | 100 mbps | 12/16/2004 |
| ○ fw001.sea.prod | mgt | 10.254.1.245 | | LAN | Fast-E | 100 mbps | 12/16/2004 |
| ○ fw01.corp.ips | e1-provider | 67.107.231.238 | Corporate | XO | T1 | 1.54 mbps | 5/03/2004 |
| ○ fw01.iad.prod | e1-provider | 206.112.93.249 | Production | MCI | Fast-E | 10 mbps | 5/03/2004 |
| ○ fw01.iad.prod | e2-public | 10.1.2.254 | Production | Internal | Fast-E | 100 mbps | 5/03/2004 |
| ○ fw01.iad.prod | e4-internal | 10.254.2.254 | Production | Internal | Fast-E | 100 mbps | 5/03/2004 |
| ○ fw01.sea.prod | e1-provider | 65.203.228.27 | Production | MCI | Fast-E | 10 mbps | 5/03/2004 |
| ○ fw01.sea.prod | e2-public | 10.1.1.254 | Production | Internal | Fast-E | 100 mbps | 5/03/2004 |

Showing 1 to 20 of 113     Next 20 >>

FIG. 21

Saved Tunnel Settings

| Devices | Interfaces | Tunnels |

Filter By: [Select All ▾]

| Tunnel Name ∧ | Device Name One | IP Address One | SAID One | Device Name Two | IP Address Two | SAID Two |
|---|---|---|---|---|---|---|
| ⦿ AlaskaAirVPN1 | fwshared.sea.prod | 65.203.228.20 | 65564 | Customer FW | 127.0.0.1 | 0 |
| ○ AlaskaAirVPN2 | fwshared.sea.prod | 65.203.228.20 | 65559 | Customer FW | 127.0.0.1 | 0 |
| ○ AlaskaAirVPN3 | fwshared.sea.prod | 65.203.228.20 | 65563 | Customer FW | 127.0.0.1 | 0 |
| ○ AlohaAirVPN1 | fwshared.sea.prod | 65.203.228.20 | 196619 | Customer FW | 127.0.0.1 | 0 |
| ○ AlphармaVPN1 | fwshared.sea.prod | 65.203.228.20 | 131130 | Customer FW | 127.0.0.1 | 0 |
| ○ AlphармaVPN2 | fwshared.sea.prod | 65.203.228.20 | 131131 | Customer FW | 127.0.0.1 | 0 |
| ○ AlphармaVPN3 | fwshared.sea.prod | 65.203.228.20 | 131132 | Customer FW | 127.0.0.1 | 0 |
| ○ AlphармaVPN4 | fwshared.sea.prod | 65.203.228.20 | 131133 | Customer FW | 127.0.0.1 | 0 |
| ○ AP1VPN1 | fwshared.sea.prod | 65.203.228.20 | 65583 | Customer FW | 127.0.0.1 | 0 |
| ○ BuddingVPN | fwshared.sea.prod | 65.203.228.20 | 65612 | Customer FW | 127.0.0.1 | 0 |
| ○ E&BGiftwareVPN | fwshared.sea.prod | 65.203.228.20 | 262145 | Customer FW | 127.0.0.1 | 0 |
| ○ ExtremeNetworkVPN1 | fwshared.sea.prod | 65.203.228.20 | 65631 | Customer FW | 127.0.0.1 | 0 |
| ○ ExtremeNetworkVPN2 | fwshared.sea.prod | 65.203.228.20 | 65630 | Customer FW | 127.0.0.1 | 0 |
| ○ IPSIASD-IPSCorp | fw01.corp.ips | 67.107.231.238 | 19 | fw01.iad.prod | 206.112.93.249 | 3 |
| ○ IPSSEA-IPSCorp | fw01.corp.ips | 67.107.231.238 | 18 | fw01.sea.prod | 65.203.228.27 | 21 |
| ○ IPSSEA-IPSIAD | fw01.sea.prod | 65.203.228.27 | 22 | fw01.iad.prod | 206.112.93.249 | 10 |
| ○ ItronNet1 | fw01.sea.prod | 65.203.228.27 | 769 | Customer FW | 127.0.0.1 | 0 |
| ○ ItronNet1-Raliegh | fw01.sea.prod | 65.203.228.27 | 789 | Customer FW | 127.0.0.1 | 0 |
| ○ ItronNet1-SD1 | fw01.sea.prod | 65.203.228.27 | 768 | Customer FW | 127.0.0.1 | 0 |
| ○ ItronNet1-SD2 | fw01.sea.prod | 65.203.228.27 | 792 | Customer FW | 127.0.0.1 | 0 |

Showing 1 to 20 of 48                                  Next 20 >>

[Edit] [Add/Delete]

FIG. 23

Saved Users

| | User ID ∧ | Admin Rights | Finance Rights | Saved Reports | Saved Alerts | Last Activity | Time Zone |
|---|---|---|---|---|---|---|---|
| ⊙ | aaronl@klir.com | None | None | 3 | 1 | 05/20/2005 5:09PM | GMT-7 |
| ○ | andrewm@klir.com | None | Read | 2 | 0 | 05/17/2005 12:10PM | GMT-7 |
| ○ | bradb@klir.com | Full | Admin | 23 | 0 | 05/21/2005 8:13AM | GMT-7 |
| ○ | brianm@klir.com | Full | Admin | 6 | 0 | 05/18/2005 12:03PM | GMT-7 |
| ○ | coles@klir.com | Full | Admin | 6 | 0 | 05/20/2005 4:38PM | GMT-7 |
| ○ | danl@klir.com | None | None | 0 | 0 | 04/20/2005 10:08AM | GMT-7 |
| ○ | daven@klir.com | Full | Admin | 8 | 0 | 05/18/2005 4:22PM | GMT-7 |
| ○ | jamesm@klir.com | Full | Admin | 36 | 3 | 05/22/2005 6:18PM | GMT-7 |
| ○ | jeffd@klir.com | None | Admin | 0 | 0 | 06/03/2004 1:40PM | GMT-7 |
| ○ | jmartin@klir.com | None | Read | 6 | 0 | 05/13/2004 11:12PM | GMT-4 |
| ○ | johnm@klir.com | Full | None | 1 | 2 | 05/16/2005 9:15AM | GMT-7 |
| ○ | markb@klir.com | Full | Admin | 1 | 0 | 04/28/2005 2:09PM | GMT-7 |
| ○ | mattm@klir.com | Full | Admin | 0 | 0 | 11/05/2004 10:39AM | GMT-7 |
| ○ | miker@klir.com | Full | Admin | 0 | 0 | 04/14/2005 12:34PM | GMT-7 |
| ○ | ops@klir.com | Full | Admin | 5 | 7 | 05/18/2005 9:30AM | GMT-7 |
| ○ | patentattorneys@sgrlaw.com | None | Read | 0 | 0 | 04/07/2005 4:44PM | GMT-4 |
| ○ | rogerb@klir.com | Full | Admin | 0 | 0 | | GMT-7 |
| ○ | todds@klir.com | None | Read | 6 | 0 | 02/22/2005 5:34PM | GMT-7 |
| ○ | troyd@klir.com | Full | Admin | 1 | 0 | 05/05/2005 12:24PM | GMT-7 |

Showing 1 to 19 of 19

[Add] [Edit] [Delete]

FIG. 25

Klir TECHNOLOGIES™

Contents
- Introduction
- Contact Support
- Getting Started
- Configuration Checklist
- Klir Platform
- Report Templates
- Klir Cost KPI
- RSS Feeds
- Supported Browsers

Introduction

Getting Started (Overview) - A general explanation of the various features and consoles available within the Klir Platform including the Types of Accounts and Types of Users.

Configuration Checklist - A quick synopsis of the configuration steps involved with the initial setup of a customer within the Klir Platform.

Klir Platform Consoles - A detailed step-by-step walk through of how to use the consoles found within the Klir Platform.

Reports - Covers the nine Report Templates found within the Reports Console. This section includes examples that can be implemented by clients to get the most value from the Klir Platform.

Klir Platform/KPI - A detailed explanation of the Klir Platform's Executive and Financial Reporting feature that enables corporate leadership to understand the cost of a Global Network as it relates to actual performance.

Copyright 1999-2005. Klir Technologies, Inc. All rights reserved.

| << Previous Period Next Period >> | | | | |
|---|---|---|---|---|
| Device: Exchange Server | | Aggregate Type: Average ☑ ☑ Interfaces | | |
| Current Status Item | Sun 05/15/05 | Mon 05/16/05 | Tue 05/17/05 | Wed 05/18/05 |
| Exchange Server | | | | |
| ⊚○⊚ Availability (%) | 100.00 | 100.00 | 100.00 | 100.00 |
| Active Processes (processes) | 69.28 | 69.35 | 70.84 | 72.31 |
| Active Users (users) | 6.66 | 6.85 | 7.44 | 6.73 |
| CPU Utilization (%) | 97.33 | 96.13 | 90.18 | 92.98 |
| Discards (packets) | 0.00 | 0.00 | 0.00 | 0.00 |
| Disk Channel Availability (%) | 100.00 | 100.00 | 100.00 | 100.00 |
| Disk Space Used (GB) | 27.50 | 27.62 | 27.84 | 28.18 |
| Disk Space Utilization (%) | 73.86 | 74.20 | 74.79 | 75.70 |
| Email Availability (%) | 100.00 | 100.00 | 100.00 | 100.00 |
| Errors (errors/sec) | 0.00 | 0.00 | 0.00 | 0.00 |
| Memory Used (MB) | 585.85 | 659.03 | 636.50 | 677.06 |
| Memory Utilization (%) | 76.34 | 85.87 | 82.94 | 88.22 |
| Packets/Sec ((thou) packets/sec) | 1.63 | 1.48 | 1.89 | 1.80 |
| Physical Disk Availability (%) | 100.00 | 100.00 | 100.00 | 100.00 |
| Traffic (mbps) | 3.18 | 3.24 | 3.83 | 3.50 |
| Traffic Utilization (%) | 3.18 | 3.24 | 3.83 | 3.50 |
| Virtual Disk Availability (%) | 100.00 | 100.00 | 100.00 | 100.00 |
| Virtual Memory Used (MB) | 999.38 | 991.07 | 867.06 | 883.83 |
| Eth0 | | | | |
| ⊚⊚⊚ Availability (%) | 100.00 | 100.00 | 100.00 | 100.00 |
| Discards (packets) | 0.00 | 0.00 | 0.00 | 0.00 |
| Errors (errors/sec) | 0.00 | 0.00 | 0.00 | 0.00 |
| Packets/Sec ((thou) packets/sec) | 1.63 | 1.48 | 1.89 | 1.80 |
| Traffic (mbps) | 3.18 | 3.24 | 3.83 | 3.50 |
| Traffic Utilization (%) | 3.18 | 3.24 | 3.83 | 3.50 |
| *In Progress. Period not yet complete. | | | | |
| | | | Copyright 1999-2005. Klir Technologies, | |
| Done | | | | |

FIG. 34

| | Showing 1 to 1 of 1 | | |
|---|---|---|---|
| ☑ Tunnels ☐ In/Out ☐ Max/Min Refresh | | | |
| Thu 05/19/05 | Fri 05/20/05 | Sat 05/21/05 | Average |
| 100.00 | 98.96 | 100.00 | 99.85 |
| 72.20 | 70.64 | 68.20 | 70.40 |
| 7.23 | 6.30 | 5.93 | 6.73 |
| 93.95 | 90.96 | 92.00 | 93.36 |
| 0.00 | 0.00 | 0.00 | 0.00 |
| 100.00 | 100.00 | 100.00 | 100.00 |
| 28.39 | 29.14 | 29.62 | 28.33 |
| 76.26 | 78.28 | 79.55 | 76.09 |
| 100.00 | 100.00 | 100.00 | 100.00 |
| 0.00 | 0.00 | 0.00 | 0.00 |
| 654.33 | 644.50 | 683.70 | 648.71 |
| 85.26 | 83.98 | 89.09 | 84.53 |
| 1.78 | 1.69 | 1.65 | 1.70 |
| 100.00 | 100.00 | 100.00 | 100.00 |
| 3.52 | 3.26 | 3.15 | 3.38 |
| 3.52 | 3.26 | 3.15 | 3.38 |
| 100.00 | 100.00 | 100.00 | 100.00 |
| 876.06 | 846.25 | 888.45 | 907.44 |
| 100.00 | 100.00 | 100.00 | 100.00 |
| 0.00 | 0.00 | 0.00 | 0.00 |
| 0.00 | 0.00 | 0.00 | 0.00 |
| 1.78 | 1.69 | 1.65 | 1.70 |
| 3.52 | 3.26 | 3.15 | 3.38 |
| 3.52 | 3.26 | 3.15 | 3.38 |

Inc. All rights reserved.

FIG. 34 (Cont.)

Green/Up Detail:
Only red, red/yellow, yellow/green device/interface detail rows display under group rows as default (default selection is off). All detail rows, including green-only, show under group rows if 'show green/up detail' option selected.

Header (see 01

Drill-down
Yellow ball drill-down to Alert Tmplt for Group/Dvc/Intfc

Drill-down
Hierarchy drill-down to Status Tmplt

☐ Green/Up Deta  ☑ Device

Drill-down
To Dvc/Intfc Tmplt for 'Current Hour'

CPU (%)
11:25 AM
Recent Poll

| Current Status | Item | Type | Name | |
|---|---|---|---|---|
| ◐ ○ ○ | Greenwich | | | 44 |
| ◐ ○ ○ | Greenwich | Device | Device A | 44 |
| ◐ ○ ○ | Greenwich | Interface | Interface A1 | |
| ○ ○ ○ | Manhattan | | | 29 |
| ○ ○ ○ | Manhattan | Device | Device B | 6 |
| ◐ ○ ○ | Manhattan | Interface | Interface B1 | |
| ○ ○ ⊘ | Manhattan | Device | Device C | 52 |
| ○ ○ ⊘ | Manhattan | Interface | Interface C1 | |
| ○ ○ ⊘ | Manhattan | Tunnel | Tunnel C1 on Intfc C1 | |
| ○ ○ ⊘ | Midtown | | | 15 |
| ○ ○ ⊘ | Uptown | | | 24 |

Sort Precedence:
1 - Red (one or more down, none alerting)
2 - Red/Yellow (one or more down, one or more alerting)
3 - Yellow/Green (all up, one or more alerting)
4 - Green (all up, none alerting)

Note: there is no Yellow-only option

Tree Parameters:
View Range and Metrics Tree do not apply for this template.
Only User (GMT-#) time zone applies to this template, not Device (Local) time zone.
Only Average Aggregate Type applies to this template, not Sum.

FIG. 35

Display Options

Group Criteria: Make ▾

View Range: Device
Device Type
Make
Model
Business Unit
Region
Continent
Country
State/Province
City
Datacenter
Location Name2
Provider
Connection Type Time Zone:

Generate Report

FIG. 40

Display Options

Group Criteria: Make

View Range: Current Month

Graph Interval:
- Current Hour
- Current 8 Hours
- Current Day
- Current Week
- Current Month
- Current Quarter
- Current Year
- Previous Hour
- Previous 8 Hours
- Previous Day
- Previous Week
- Previous Month
- Previous Quarter
- Custom...

Aggregate Type:

Time Zone:

Generate Report

FIG. 41

Display Options

| Group Criteria: | Device | ∨ |
| --- | --- | --- |
| View Range: | Current Day | ∨ |
| Graph Interval: | Hour | ∨ |
| Aggregate Type: | Average | ∨ |
| Time Zone: | Device [Local] | ∨ |
| | Device [Local] | |
| | User [GMT-7] | |

[Generate Report]

FIG. 42 klir TECHNOLOGIES™

Report Email

Sender:

Recipients: (comma-delimited)

Subject: Daily Traffic by ISP

Message:

Mail Format: ● HTML ○ Send a Link

[Email Report] [Cancel]

FIG. 44

Report Settings

Report Name: Daily Traffic by ISP

Sharing: ● Yes ○ No

Email Report Regularly: ● Yes ○ No

Recipients: (comma-delimited)

Mail Format: ● HTML ○ Send a Link

Frequency: Daily ▼
 Daily
 Weekly
 Monthly

Save as New Report    Cancel

Configure Alert Parameters

Alert Configuration

- Alert Name: Test Alert
- Metric Type: ●Device ○Interface ○Tunnel
- Metric: CPU Utilization
- Group Criteria: Device
- Group Selection:
  - ☐ Device
    - ☐ A - M
    - ☐ O - P
    - ☐ Q - Z
- **Time Frame*:** 12AM - 12AM ☑All Day
  *refers to Device (local) time
- Days: ☑Sun ☑Mon ☑Tue ☑Wed ☑Thu ☑Fri ☑Sat ☑All Week
- Threshold: Variable
- If current metric Increases by a Percentage value of 33% from the average value calculated over the past 4 Hours

Primary Escalation

- Email Address: [Add Recipient] ●Standard ○Mobile [Delete]
- Alert Frequency: 30 Minutes

Secondary Escalation

- Escalation Delay: 15 Minutes
- Email Address: [Add Recipient] ●Standard ○Mobile [Delete]
- Alert Frequency: 30 Minutes

FIG. 50

Klir Alerts brianm@klir.com Mozilla Firefox

File  Edit  View  Go  Bookmarks  Tools  Help

Configure Alert Parameters

Alert Configuration

| | |
|---:|:---|
| Alert Name: | Test Aeil |
| Metric Type: | ⊙ Device  ⊙ Interface  ⊙ Tunnel |
| Matric: | CPU Utilization ▽ |
| Group Criteria: | Device ▽ |
| Group Selection: | ☐ Device<br>　⊞ A - M<br>　⊞ O - P<br>　⊞ Q - Z |
| Time Frame*: | ▽　▽  ☑ All Day<br>*refers to Device (local) time |
| Days: | ☑ Sun ☑ Mon ☑ Tue ☑ Wed ☑ Thu ☑ Fri ☑ Sat ☑ All Week |
| Threshold: | Standard Deviation ▽ |
| | If current metric value  Exceeds ▽  mean +/- 1.43  standard |

Primary Escalation

| | | | |
|---:|:---|:---|:---|
| Email Address: | serverj@klir.com | ⊙ Standard  ○ Mobile | Delete |
| Email Address: | billg@klir.com | ⊙ Standard  ○ Mobile | Delete |
| Email Address: | 2066675303@ | ○ Standard  ⊙ Mobile | Delete |
| | Add Recipient | | |
| Alert Frequency: | 30 Minutes ▽ | | |

Secondary Escalation

| | | | |
|---:|:---|:---|:---|
| Escalation Delay: | 5 Minutes ▽ | | |
| Email Address: | george@klir.com | ⊙ Standard  ○ Mobile | Delete |
| Email Address: | 2065551212@mibile.spln.com | ○ Standard  ⊙ Mobile | Delete |
| | Add Recipient | | |
| Alert Frequency: | 30 Minutes ▽ | | |

Tertiary Escalation

| | | | |
|---:|:---|:---|:---|
| Escalation Delay: | 5 Minutes ▽ | | |
| Email Address: | mattam@klir.com | ⊙ Standard  ○ Mobile | Delete |
| | Add Recipient | | |
| Alert Frequency: | 30 Minutes ▽ | | |

Save  Cancel

Done

Provider Monthly Billing

| Billing Method: | Fixed ∨ | | |
|---|---|---|---|
| Monthly Cost ($): | 150.00 | Throughput: 1024 | kbps ∨ |

FIG. 53

| Provider Monthly Billing | |
|---|---|
| Billing Method: | Burstable ⌄ |
| Fixed Floor Cost ($): | 100.00 | Throughput: 512 kbps ⌄ |
| Threshold: | 95% ⌄ |
| Burstable Rate ($): | 150.00 | Throughput: 1024 kbps ⌄ |

FIG. 54

| Provider Monthly Billing | |
|---|---|
| Billing Method: | Variable ⌄ |
| Monthly Incremental Rate ($): | 150.00 Throughput: 256 kbps ⌄ |
| Threshold: | 95% ⌄ |
| Variable Capacity: | 1024 kbps ⌄ |
| Overage Incremental Rate ($): | 150.00 Throughput: 512 kbps ⌄ |

FIG. 55

| Provider Monthly Billing | | | |
|---|---|---|---|
| Billing Method: | Cumulative ⌄ | | |
| Fixed Floor Cost ($): | 300.00 | Throughput: | 1024 kilobytes ⌄ |
| Overage Incremental Rate ($): | 150.00 | Throughput: | 256 kilobytes ⌄ |

FIG. 56

<< Prev Period Next Period >>
Unit: kbps

Showing 1 to 2 of 2 [Refresh]

| Subnet Group | Sun 05/22/05 | Mon 05/23/05 | Tue 05/24/05 | Wed 05/25/05 | Thu 05/26/05 | Fri 05/27/05* | Sat 05/28/05* | Average* |
|---|---|---|---|---|---|---|---|---|
| Range | 3.35 | 6.06 | 10.45 | 15.73 | 6.27 | | | 8.56 |
| ☐ From devweb01.klir.com To: | 2.37 | 5.11 | 0.99 | 11.51 | 1.59 | | | 2.23 |
| Paul Mach | 2.25 | 2.34 | 3.05 | 4.46 | 3.86 | | | 3.10 |
| 10.254.0.45/32 | 0.00 | 1.08 | 2.58 | 2.20 | 1.46 | | | 1.46 |
| 10.254.0.13/32 | 0.42 | 0.76 | 1.02 | 1.00 | 0.30 | | | 0.86 |
| coles | 0.00 | 0.20 | 1.02 | 1.22 | 1.51 | | | 0.79 |
| 10.254.0.99/32 | 0.19 | 0.45 | 0.95 | 0.36 | 0.45 | | | 0.56 |
| John McCeskey | 0.00 | 0.20 | 0.00 | 1.16 | 0.00 | | | 0.29 |
| 10.254.0.09/32 | 0.00 | 0.00 | 0.07 | 0.00 | 0.00 | | | 0.07 |
| ☐ To devweb01.klir.com From | 0.48 | 1.35 | 1.45 | 2.12 | 0.60 | | | 1.33 |
| 10.254.0.45/32 | 0.00 | 0.50 | 0.56 | 0.00 | 0.21 | | | 0.41 |
| Paul Mach | 0.34 | 0.07 | 0.42 | 0.22 | 0.11 | | | 0.00 |
| 10.254.0.13/32 | 0.00 | 0.40 | 0.10 | 0.72 | 0.17 | | | 0.01 |
| coles | 0.00 | 0.20 | 0.02 | 0.34 | 0.10 | | | 0.26 |
| 10.254.0.99/32 | 0.12 | 0.04 | 0.36 | 0.10 | 0.03 | | | 0.21 |
| John McCeskey | 0.00 | 0.01 | 0.00 | 0.02 | 0.00 | | | 0.02 |
| 10.254.0.39/32 | 0.00 | 0.00 | 0.00 | 0.00 | 0.01 | | | 0.01 |

*In progress: Period not yet complete in some time zones.

Copyright 1999-2005, Klir Technologies, Inc. All rights reserved

Done

FIG. 61 (Cont.)

Subnet Settings

Application Settings | Subnet Settings

| Subnet Group ^ | CIDR Address | Start IP Address | End IP Address | Comment |
|---|---|---|---|---|
| ○ Aanon Libidisos | 10.254.0.15/32 | 10.254.0.15 | 10.254.0.15 | It's Libadisos ) |
| ○ Brain Mansell | 10.254.0.27/32 | 10.254.0.27 | 10.254.0.27 | Brain |
| ○ Cisco 1700's Subnet | 192.168.255.0/24 | 192.168.255.0 | 192.168.255.255 | This is the subnet that lives between the cisco 1700 VPN tes |
| ○ coles | 10.254.0.16/32 | 10.254.0.16 | 10.254.0.16 | This guy makes me jealous |
| ○ daven | 10.254.0.120/32 | 10.254.0.120 | 10.254.0.129 | |
| ○ devweb01.kilr.com | 10.254.1.220/32 | 10.254.1.220 | 10.254.1.220 | This is the private subnet for devweb01 |
| ○ devweb01.kilr.com | 65.203.233.161/32 | 65.203.233.161 | 65.203.233.161 | This is the subnet for devweb01 |
| ○ jesssical | 10.254.0.34/32 | 10.254.0.34 | 10.254.0.34 | |
| ○ John MaCaskey | 10.254.0.14/32 | 10.254.0.14 | 10.254.0.14 | This is John's IP Address |
| ○ Joshgas | 10.254.0.21/32 | 10.254.0.21 | 10.254.0.21 | |
| ○ mail01.ips.corp | 10.254.0.194/32 | 10.254.0.194 | 10.254.0.194 | Exchange Server |
| ○ Mattm | 10.254.0.19/32 | 10.254.0.19 | 10.254.0.19 | |
| ○ ops01.sea.ips.prod | 10.254.1.250/32 | 10.254.1.250 | 10.254.1.250 | Ops01 - Nagios Server |
| ○ Paul Mach | 10.254.0.12/32 | 10.254.0.12 | 10.254.0.12 | Paul likes to run |
| ○ Server 01 | 10.254.0.193/32 | 10.254.0.193 | 10.254.0.193 | |
| ○ Slashdot | 66.35.250.151/32 | 66.35.250.151 | 66.35.250.151 | uh |
| ○ Traffic Generation Server | 172.16.0.10/32 | 172.16.0.10 | 172.16.0.10 | This is the subnet for the traffic generation server behind |

Showing 1 to 17 of 17

Add | Edit | Delete

Copyright 1999-2005, Kilr Technologies, Inc. All rights reserved

FIG. 65

Application Settings

Application

Application Name: AOL Instant Mesg

Comment: AOL Instant Messanger Related Trafic

| Port | Protocol |
|---|---|
| 5190 | TCP |

[Delete]
[Add] [TCP ▾]

Showing 1 to 1 of 1

Procurement

Procurement Date: 12/2003 (e.g. 12/2003)
Procurement Method: Purchase ▾
Purchase Price ($): 123
Depreciation: 3-year Straightline ▾

Maintenance Contract

Contract Date: 12/2003 (e.g. 12/2003)
Contract Cost ($): 123
Contract Duration: 60 ▾ (months)

Labor

Monthly Hours: 12
Hourly Rate ($): 34

[Save] [Cancel]

FIG. 66

@ Klir - Reports - brianm@klir.com - Mozilla Firefox

File Edit View Go Bookmarks Tools Help

Klir TECHNOLOGIES™

Reports

| New Report | My Reports (4) | Public Reports (25) |

Select Metrics
- Device
- Interface
- VPN

| Template | Description |
|---|---|
| ⊙ Metric Summary | Performance across multiple Devices for a single Metric type |
| ○ Device/Interface Summary | Multiple Metrics on a single Device/Interface |
| ○ Status Summary | Current Availability, CPU, Memory, and Traffic Utilization Matrics across multiple Devices |
| ○ Alert Summary | Proactive Alerts: Static, Cumulative, Variable and Standard Deviation Thresholds |
| ○ KPI Summary | Consolidated eKPI and cKPI report |
| ○ eKPI Summary | Equipment Key Performance Indicators (eKPI) |
| ○ cKPI Summary | Circuit Key Performance Indicators (cKPI) |
| ○ Multi-Application Summary | Provides a cross-section of multiple applications utilized by a selected group criteria |
| ○ Single-Application Summary | Provides detailed usage information about a single application |
| ○ Top Talkers | View the top subnets by traffic usage |
| ○ Application Costs | Identify Application costs across multiple Subnet Groups |

Showing 1 to 11 of 11

Display Options

Group Criteria: Device
View Range: Current Day
Graph Interval: Hour
Aggregate Type: Average
Time Zone: Device (Local)

[Generate Report]

Copyright 1999-2005, Klir Technologies, Inc. All rights reserved

FIG. 68

Select Application
- Custom
  - AOL Instant Msngr.
  - APCPCNS
  - http
  - Message Send Proto
  - MS Global Catalog
  - MS Remote Desktop
  - MSN Messenger's
  - SIP (VOIP Related)
- Standard
  - 3
    - 3com-amp3
    - 3com-tsmux
    - 3com-tsmux;pop3pw
  - 9 - A
  - B
  - C
  - D
  - E
  - F
  - G
  - H
  - I
  - J - K
  - L
  - M
  - N
  - O
  - P
  - Q
  - R
  - S
  - T
  - U
  - V
  - W
  - X
  - Y - Z

| Template | |
|---|---|
| ○ | Metric Sumr |
| ○ | Device/intel Summary |
| ○ | Status Sum |
| ○ | Alert Summ |
| ○ | KPI Summa |
| ○ | eKPI Summ |
| ○ | cKPI Summ |
| ○ | Multi-Applica Summary |
| ⊙ | Single-Appli Summary |
| ○ | Top Talkers |
| ○ | Application |
| Showing 1 to 11 | |

| Display Option |
|---|
| Grou |
| Vi |
| Grapl |
| T |

Generate Rep

FIG. 69

Equipment Costs

| Procurement | | | |
|---|---|---|---|
| Date: | 11/2003 | (i.e. 12/2003) | |
| Method: | Purchase ▽ | | |
| Purchase Price ($): | 2844 | | |
| Depreciation: | 3-year Straightline ▽ | | |

| Maintenance Contract | | | |
|---|---|---|---|
| Procurement Date: | 11/2003 | (i.e. 12/2003) | |
| Contract Cost ($): | 1000 | | |
| Contract Duration: | 12 ▽ | (months) | |

| Labor Contract | |
|---|---|
| Monthly Hours: | 10 |
| Hourly Rate ($): | 50 |

FIG. 71

| << Previous Period Next Period >> | | Aggregate Type: Average ▼ | Showing 1 to 10 of 42 ☑ In/out ☐ Max/Min Refresh | |
|---|---|---|---|---|
| Unit: (thou) errors/sec | | | | |
| Device | 12:00 AM - 08:00 AM | 08:00 AM - 04:00 PM* | 04:00 PM - 12:00 AM* | Average* |
| Range (sum) | 5.07 | 10.78 | | 7.93 |
| Range In | 2.30 | 2.30 | | 2.30 |
| Range Out | 2.77 | 8.48 | | 5.63 |
| fw01.corp.ips | 2.77 | 8.48 | | 5.63 |
| fw01.corp.ips In | 0.00 | 0.00 | | 0.00 |
| fw01.corp.ips Out | 2.77 | 8.48 | | 5.63 |
| dbpxy01.sea.prod | 2.27 | 2.27 | | 2.27 |
| dbpxy01.sea.prod In | 2.27 | 2.27 | | 2.27 |
| dbpxy01.sea.prod Out | 0.00 | 0.00 | | 0.00 |
| prodweb01.sea.prod | 0.01 | 0.01 | | 0.01 |
| prodweb01.sea.prod In | 0.01 | 0.01 | | 0.01 |
| prodweb01.sea.prod Out | 0.00 | 0.00 | | 0.00 |
| fwshared.sea.prod | 0.01 | 0.01 | | 0.01 |
| fwshared.sea.prod In | 0.01 | 0.01 | | 0.01 |
| fwshared.sea.prod out | 0.00 | 0.00 | | 0.00 |
| fw000.sea.prod | 0.01 | 0.01 | | 0.01 |
| fw000.sea.prod In | 0.01 | 0.01 | | 0.01 |
| fw000.sea.prod Out | 0.00 | 0.00 | | 0.00 |
| voip01.ips.corp | 0.00 | 0.00 | | 0.00 |
| voip01.ips.corp In | 0.00 | 0.00 | | 0.00 |
| voip01.ips.corp Out | 0.00 | 0.00 | | 0.00 |
| ups02.ips.corp | 0.00 | 0.00 | | 0.00 |
| ups02.ips.corp In | 0.00 | 0.00 | | 0.00 |
| ups02.ips.corp Out | 0.00 | 0.00 | | 0.00 |
| ups01.ips.corp | 0.00 | 0.00 | | 0.00 |
| ups01.ips.corp In | 0.00 | 0.00 | | 0.00 |
| ups01.ips.corp Out | 0.00 | 0.00 | | 0.00 |
| sw01.ips.corp | 0.00 | 0.00 | | 0.00 |
| sw01.ips.corp In | 0.00 | 0.00 | | 0.00 |

FIG. 75

<< Previous Period Next Period >>　　　　　　　　　　　　　　　　　　　　　　　Showing 1 to 10 of 42
Unit: (thou) errors/sec　　　　　　　Aggregate Type: [Average v]　☐ In/out ☐ Max/Min [Refresh]

| Device | 12:00 AM - 08:00 AM | 08:00 AM - 04:00 PM* | 04:00 PM - 12:00 AM* | Average* |
|---|---|---|---|---|
| Range (sum) | 5.07 | 10.78 | | 7.93 |
| fw01.corp.ips | 2.77 | 8.46 | | 5.63 |
| dbpxy01.sea.prod | 2.27 | 2.27 | | 2.27 |
| prodweb01.sea.prod | 0.01 | 0.01 | | 0.01 |
| fwshared.sea.prod | 0.01 | 0.01 | | 0.01 |
| fw000.sea.prod | 0.01 | 0.01 | | 0.01 |
| valp01.ips.corp | 0.00 | 0.00 | | 0.00 |
| ups02.ips.corp | 0.00 | 0.00 | | 0.00 |
| ups01.ips.corp | 0.00 | 0.00 | | 0.00 |
| sw01.ips.corp | 0.00 | 0.00 | | 0.00 |
| svcs02.sea.prod | 0.00 | 0.00 | | 0.00 |

FIG. 77

| Device ^ | 12:00 AM - 08:00 AM | 08:00 AM - 04:00 PM* | 04:00 PM - 12:00 AM* | Average* |
|---|---|---|---|---|
| Range (sum) | 5.07 | 10.02 | | 7.95 |
| fwshared.sea.prod | 0.01 | 0.01 | | 0.01 |
| mail01.sea.prod | 0.00 | 0.00 | | 0.00 |
| ops01.sea.prod | 0.00 | 0.00 | | 0.00 |
| ops02 | | | | |
| poll01a.sea.prod | 0.00 | 0.00 | | 0.00 |
| poll01b.sea.prod | 0.00 | 0.00 | | 0.00 |
| poll02a.sea.prod | 0.00 | 0.00 | | 0.00 |
| poll02b.sea.prod | 0.00 | 0.00 | | 0.00 |
| poll03a.sea.prod | 0.00 | 0.00 | | 0.00 |
| poll03b.sea.prod | 0.00 | 0.00 | | 0.00 |

<< Previous Period Next Period >>   << Previous 10 Next 10 >>  Showing 11 to 20 of 42
Unit: (thou) errors/sec   Aggregate Type: [Average v]  ☐ In/out  ☐ Max/Min  [Refresh]

FIG. 78

| << Previous Period Next Period >> | | << Previous 10 Next 10 >> Showing 11 to 20 of 42 | | |
|---|---|---|---|---|
| Unit: (thou) errors/sec | | Aggregate Type: Average▼ ☐ In/out ☐ Max/Min Refresh | | |
| Device ∧ | 12:00 AM - 08:00 AM | 08:00 AM - 04:00 PM* | 04:00 PM - 12:00 AM* | Average* |
| Range (sum) | 5.07 | 10.82 | | 7.95 |
| fwshared.sea.prod | 0.01 | 0.01 | | 0.01 |
| mail01.sea.prod | 0.00 | 0.00 | | 0.00 |
| ops01.sea.prod | 0.00 | 0.00 | | 0.00 |
| ops02 | | | | |
| poll01a.sea.prod | 0.00 | 0.00 | | 0.00 |
| poll01b.sea.prod | 0.00 | 0.00 | | 0.00 |
| poll02a.sea.prod | 0.00 | 0.00 | | 0.00 |
| poll02b.sea.prod | 0.00 | 0.00 | | 0.00 |
| poll03a.sea.prod | 0.00 | 0.00 | | 0.00 |
| poll03b.sea.prod | 0.00 | 0.00 | | 0.00 |

*In Progress, Poried not yet complete in some time zones.

FIG. 79

Service Provider Billing Methodologies and cKPI Algorithm i. Fixed Billing Methodology

| | Circuit Type | T-1 |
|---|---|---|
| A | Circuit Type | T-1 |
| B | Fixed Floor | 1.54 mbps |
| C | Fixed Cost | $1,200 |
| D | Burst Rate | n/a |
| E | Burst Rate | n/a |
| F | Threshold | n/a | ii. Burstable Billing methodology

| | | |
|---|---|---|
| A | Circuit Type | Fast - E |
| B | Fixed Floor | 10mbps |
| C | Fixed Cost | $2,000 |
| D | Burst Rate | 1mbps |
| E | Burst Rate | $250 |
| F | Threshold | 99% | iii. Variable Billing Methodology

| | | |
|---|---|---|
| A | Circuit Type | Frame Relay |
| B | Incremental Rate | 256 kbps |
| C | Incremental Cost | $150 |
| D | Variable Capacity | 1024 kbps |
| E | Overage Incremental Cost | $200 |
| F | Threshold | 96% | iv. Cumulative Billing Methodology

| | | |
|---|---|---|
| A | Circuit Type | Gig - E |
| B | Fixed Floor | 150 GB |
| C | Fixed Cost | $20,000 |
| D | Overage incremental | 1 GB |
| E | Overage Incremental | $1,500 |
| F | Threshold | n/a |

Algorithm

| I | U1 | U1 | U2 | U2 | U3 | U3 | J | K | L | M | T1 | T2 | C | Y1 | Y2 | Z | R |
|---|---|---|---|---|---|---|---|---|---|---|---|---|---|---|---|---|---|
| (G+H)/2 | | | | | | | H/1 | G/1 | | M | C/B | (C+E)/U# | C | Y1 | Y2 | C+E+Y1+Y2 | R |
| 9 | 4.6 | | 12.7 | | 14.3 | | 0.66 | 1.33 | 1.67 | 125.00% | $200 | $227 | $2,000 | $1,250 | $1,000 | $500 | $4,750 | ($750) |

| | | |
|---|---|---|
| G | Target High | 12mbps |
| H | Target Low | 6mbps |
| I | Target (Avg) | 9mbps |
| Y1 | Other Fixed Cost | $1,000 |
| D1 | Misc 1 | $750 |
| O2 | Misc 2 | $250 |
| Y2 | Labor Costs | $500 |
| O3 | Labor Rate | $50 |
| O4 | Labor Hours | 10 |

Check
Burstable
14.3M 125%
Z 4750
C 2000
G 12
B 10
E 250
Y1 1000
Y2 500

4750
2000

500 2 12
1000 250 10
500

4000
-750

R -750 ($750)

Example - Burstable Billing Methodology Burstable Billing Methodology

| | | |
|---|---|---|
| A | Circuit Type | Fast-E |
| B | Fixed Floor | 10mbps |
| C | Fixed Cost | $2,000 |
| D | Burst Rate | 1mbps |
| E | Burst Cost | $250 |
| F | Threshold | 99% |

FIG. 80

Standard View Ranges
[Current and Previous]

| View Range | Template/Graph Interval | Example Current Date/Time: Thurs Jan 15, 2004 7:47pm Time Span Shown in Report for Example |
|---|---|---|
| Hour | 5 Min/5 Min | Current Hour: Jan 15, 2004, 7pm - 8pm<br>Previous Hour: Jan 15, 2004, 6pm - 7pm |
| 8 Hours | Hour/Hour - default<br>Hour/5 Min - option | Current 8 Hours: Jan 15, 2004, Noon - 8pm<br>Previous 8 Hours: Jan 15, 2004, 8am - Noon |
| Day (default) | 8 Hour/Hour - default<br>8 Hour/5 Min - option | Current Day: Jan 15, 2004 (entire day)<br>Previous Day: Jan 14, 2004 (entire day) |
| Week | Day/Day - default<br>Day/Hour - option | Current Week: Sun Jan 11-Sat Jan 17, 2004<br>Previous Week: Sun Jan 4 -Sat Jan 10, 2004 |
| Month | Week/Day | Current Month: Jan 1-31, 2004<br>Previous Month: Dec 1-31, 2003 |
| Quarter | Month/Week | Current Quarter: Jan 1-Mar 31, 2004<br>Previous Quarter: Oct 1-Dec 31, 2003 |
| Year | Month/Week | Current Year: Jan 1- Dec 31, 2004<br>Previous Year: (not an available option) |

Template indicates which template (e.g. day, week, month, etc) should be used.

Graph Interval Indicates what granularity of data is being used for the graph within template only (the granularity of the columns in the tables always remains the same within a template (e.g. day, week, month, etc).

Custom View Ranges

From [d a t e] [cal ctrl]
To [d a t e] [cal ctrl]

Custom Selection
0-1 hours
2-12 hours
0.5-2 days
3-9 days
10-43 days
44 days - 365 days <- Yesterday - default (assume 12:00AM for day selected)
<- Today - default (refer to Sections 3.2.3 and 3.3 of the Spec)
Template/Graph Interval
5 min/5 min
Hour/Hour (default), Hours/5 min (option)
8 Hour/Hour (default), 8 Hour/5 min (option)
Day/Day (default), Day/Hour (option)
Week/Week (default), Week/Day (option)
Month/Week

Custom View Range can only be selected in calendar days: hour selections that currently exist in the system will no longer be an option for the user.

Current / Previous:
Current and Previous for Standard View Range selections are always relative to the current day/time. For example, 'Current Hour' is always for the current hour, Previous Week' is always for the Sunday through Saturday of the previous week relative to what the current day/week is. Current/Previous only apply to Standard View Ranges: all Custom View range selections are static based on the specific from and to dates selected.

Validation:
Users will not be allowed to select a timeframe where:
- from > = to, or
- from is more than a year prior to today
- to > today (a user can select the next day if they have devices in a time zone later than the users time zone and data has been collected for those devices in a Device (Local) time that's the next day relative to the user's current date).

FIG. 81

☑ Dashboard 🗎 Reports ◇ Alerts ◇ Providers ◇ Devices ☐ Users ⚙ Account ⚙Preferences ☑Support ⏻Log Out

Request Object Additions / Deletions

Account Summary

| | |
|---|---|
| Account Name: | Klir |
| Contract Date: | 04/13/2004 |
| Expiration Date: | Never Expires |
| Total Objects: | 205 |
| Licensed Objects: | 0 |

"Objects" include any monitored physical or virtual device or interface, including all Wide Area Network (WAN), Local Area Network (LAN), Wireless Access Point (WAP), Virtual Private Network (VPN), Voice over Internet Protocol (VoIP), Server devices or interfaces, and all VPN tunnel endpoints or VIPs of a Company's critical infrastructure, as designated by the Company or an authorized Solution Provider.

Add

Your account is subject to a License Agreement that includes a range of Licensed Objects. You may add additional Objects within the range of your License Agreement at no cost to your Company. If you add new Objects that exceed your License Agreement, there will be additional charges to increase the number of Licensed Objects. To add Objects, please provide your identification and the times you are available below, and an Account Representative will contact you shortly, Thank you.

Delete

Deletion of Objects is a permanent configuration change. As such, it is the policy of Klir Technologies to verbally conform deletion to avoid erroneous configuration changes. Please provide your identification and the times you are available below, and an Account Representative will contact you shortly, Thank you.

Contact

| | |
|---|---|
| Name: | |
| Title: | |
| Email: | |
| Phone: | |
| Contact Times (Date/Time) | |
| Option 1: | |
| Option 2: | |
| Request/Comment: | |

[Submit Request] [Cancel]

FIG. 82

SYSTEM AND INTERFACE FOR MONITORING INFORMATION TECHNOLOGY ASSETS

CROSS-REFERENCE TO RELATED APPLICATIONS

This application is a continuation of U.S. application Ser. No. 11/167,057 filed on Jun. 24, 2005 which is a continuation-in-part of U.S. application Ser. No. 11/120,326 filed May 2, 2005, which claims the benefit of U.S. Provisional Application No. 60/568,837 filed May 6, 2004 and U.S. Provisional Application No. 60/581,304 filed Jun. 18, 2004, and which is a continuation-in-part of U.S. application Ser. No. 10/826,548 filed Apr. 16, 2004, which is a continuation of U.S. patent application Ser. No. 10/764,276, filed Jan. 23, 2004, which claims the benefit of U.S. Provisional Application No. 60/442,021, filed Jan. 23, 2003, U.S. Provisional Application No. 60/442,023, filed Jan. 23, 2003, U.S. Provisional Application No. 60/453,686, filed Mar. 11, 2003, and U.S. Provisional Application No. 60/492,472, filed Aug. 5, 2003, all of which are relied on and incorporated by reference.

BACKGROUND OF THE INVENTION

During the past 10 years, companies have made significant investments to configure robust networks to support burgeoning applications, transactions and communications over the Internet. Yet, the majority of tools to support network operations have been focused on internal Local Area Networks (LANs), despite the demand to support external business applications. As a result, global networks have been managed locally without a clear picture of performance, operational requirements, the allocation of network resources, and affiliated costs across multiple Internet Service Providers (ISPs).

Further, the internal hardware, software and traps, typically used in the prior art to gather data has only limited out-of-the-box functionality to monitor, alert, analyze and report on applications, equipment and Internet Service Provider (ISP) performance and costs across diverse network segments that today make up an enterprise's global network, such as data (including Internet Protocol (IP)), wireless (including Wireless Access Point (WAP) access and equipment), voice (including Voice over Internet Protocol (VoIP)) and Virtual Private Networks (VPNs). Different sets of tools have been required to monitor unique applications, different network segments, service providers and affiliated costs. As a result, executives and operational personnel responsible for these various IT assets have lacked global enterprise visibility to comprehend the use, performance and costs of these intertwined systems.

Accordingly, there is a need to gauge the performance of global networks, including application usage, ISP quality of service, and device performance from a single dashboard across a multi-vendor environment.

The present invention answers this need by enabling clients to remotely monitor disparate networks, service providers, and applications in a multi-vendor Wide Area Network (WAN) without displacing internal management applications.

SUMMARY OF THE INVENTION

Generally described, the present invention relates to a fully-managed Application Service Provider (ASP)-based system to monitor, alert, analyze and report on the performance and costs of global Information Technology (IT) assets from a single user interface; including application usage, device metrics and Internet Service Provider (ISP) performance across Data, Wireless, Voice over IP (VoIP), Virtual Private Networks (VPN), and Servers (collectively an "IT analytics systems").

It is thus an object of the present invention to provide a global network monitoring, alerting, analyses and reporting system that can operate in a distributed multi-vendor networking environment, across multiple service providers, and support any Simple Network Management Protocol (SNMP)-enabled device, Netflow-enabled device, or sFlow-enabled device.

Another object of the present invention is to provide an IT analytics system that utilizes embedded network protocols and the flexibility and reliability of the public Internet to collect and disseminate client data.

A further object of the present invention is to provide an IT analytics system that is completely maintained and managed, and thus does not require a client to purchase, install, or maintain any software, agents, or plug-ins.

Another object of the present invention is to provide an IT analytics system that allows a client to retain complete control over its network.

A still further object of the present invention is to provide an IT analytics system that delivers a real-time view of global Internet access services and networking equipment from a single web interface.

Yet another object of the present invention is to provide an IT analytics system that offers standardized device and interface statistics across disparate networks to enable the client to evaluate Service Level Agreements (SLAs), device performance, bandwidth utilization, and to aid the client in strategic planning.

Another object of the present invention is to provide an IT analytics system for dedicated VPNs that delivers a real-time view of VPN device performance, VPN tunnel availability, VPN tunnel health statistics, and point-to-point VPN tunnel latencies.

A still further object of the present invention is to provide an IT analytics system that correlates VPN tunnel sessions across heterogeneous network environments.

Another object of the present invention is to provide an IT analytics system that delivers a real-time view of the performance of Wireless Access Point (WAP) equipment, including device availability, wireless traffic statistics over monitored equipment, wireless signal strength, wireless Quality of Service (QOS), and data about remote wireless users to ensure that sufficient upstream bandwidth exists to support cost effective provisioning of the equipment needed to power the wireless networks.

A still further object of the present invention is to provide an IT analytics system that enables the client to customize and save performance data for groups of devices based on multiple criteria, to dynamically graph and compare performance statistics, and to sort performance data based on device criteria (e.g., make, model, type, or alias), location (e.g., continent, country, state/province, city, or custom alias), Internet Service Provider (ISP) (e.g., alias, circuit type), or any combination thereof.

Yet another object of the present invention is to provide an IT analytics system that delivers proactive alerts which predict failures and notify responsible parties before a network event impacts mission-critical operations.

Another object of the present invention is to provide an IT analytics system that delivers customized performance reports.

A further object of the present invention is to provide an IT analytics system that is scalable and cost-effective.

Other objects, features, and advantages of the present invention will also become apparent upon inspection of the following detailed description of the preferred embodiment of the invention, taken in conjunction with the drawings and appended claims.

BRIEF DESCRIPTION OF THE DRAWINGS

FIG. 12 is a GUI showing the Reports interface, New Report selected from the toolbar menu in an embodiment of the present invention.

FIG. 13 is a GUI showing the Reports interface, My Reports selected from the toolbar menu in an embodiment of the present invention.

FIG. 14 is a GUI showing the Reports interface, Public Reports selected from the toolbar menu in an embodiment of the present invention.

FIG. 15 is a GUI showing the Saved Alerts interface selected from the toolbar menu in an embodiment of the present invention.

FIG. 16 is a GUI showing the Configure Alert Parameters interface selected from the toolbar menu in an embodiment of the present invention.

FIG. 17 is a GUI showing the Saved Providers interface selected from the toolbar menu in an embodiment of the present invention.

FIG. 18 is a GUI showing the Configure Provider Parameters interface selected from the toolbar menu in an embodiment of the present invention.

FIG. 19 is a GUI showing the Saved Device Settings interface selected from the toolbar menu in an embodiment of the present invention.

FIG. 20 is a GUI showing the Device Configuration interface selected from the toolbar menu in an embodiment of the present invention.

FIG. 21 is a GUI showing the Saved Interface Settings interface selected from the toolbar menu in an embodiment of the present invention.

FIG. 23 is a GUI showing the Saved Tunnel Settings interface selected from the toolbar menu in an embodiment of the present invention.

FIG. 25 is a GUI showing the Saved User Settings interface selected from the toolbar menu in an embodiment of the present invention.

FIG. 29 is a GUI showing the Support interface selected from the toolbar menu in an embodiment of the present invention.

FIG. 30 is a GUI showing the Login/Logout interface selected from the toolbar menu in an embodiment of the present invention.

FIG. 34 is a screen display of a report utilizing the Device/Interface Summary template to convey all the performance data monitored and available for a single device selected by the User in an embodiment of the present invention.

FIG. 40 is a screen display of Group Criteria options that a user may select to sort data based on a hierarchy of common attributes in an embodiment of the present invention.

FIG. 41 is a screen display of View Range options that a user may select to view data based on selected period of time or custom range in an embodiment of the present invention.

FIG. 42 is a screen display of Time Zone options that a user may select to view data based on the relative time zone of the user, or the location of the device in an embodiment of the present invention.

FIG. 44 is a screen display of Email Reporting options that a user may select to distribute reports to others identified by the user in an embodiment of the present invention.

FIG. 45 is a screen display of Report Settings options that a user may select to distribute reports on regular intervals, share with others, or save in an embodiment of the present invention.

Figure 46:
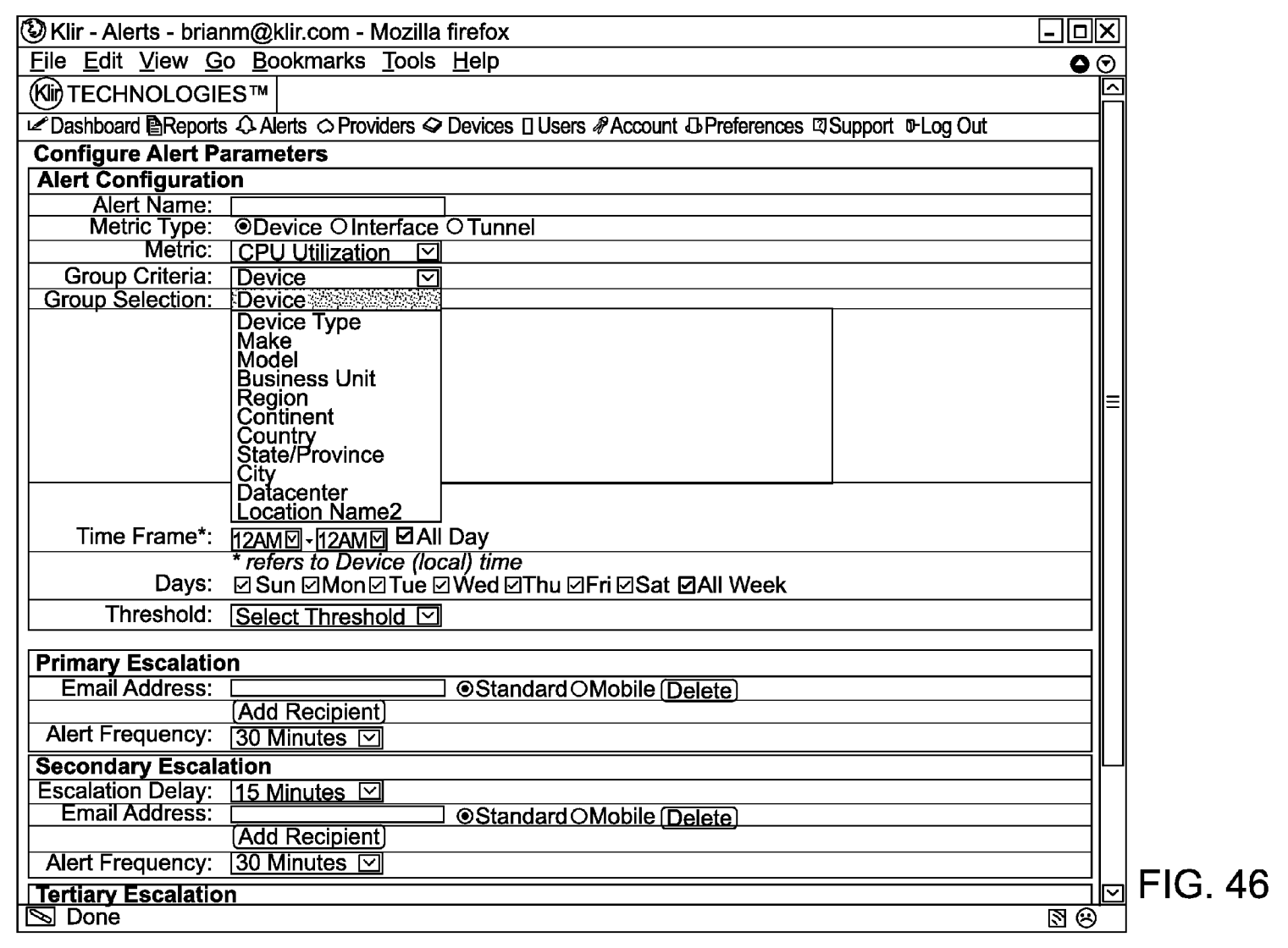

FIG. 46 is a screen display of Configure Alert Settings by Group Criteria that a user may select to apply an alert across a set of devices or interfaces with a common set of attributes in an embodiment of the present invention.

Figure 47:
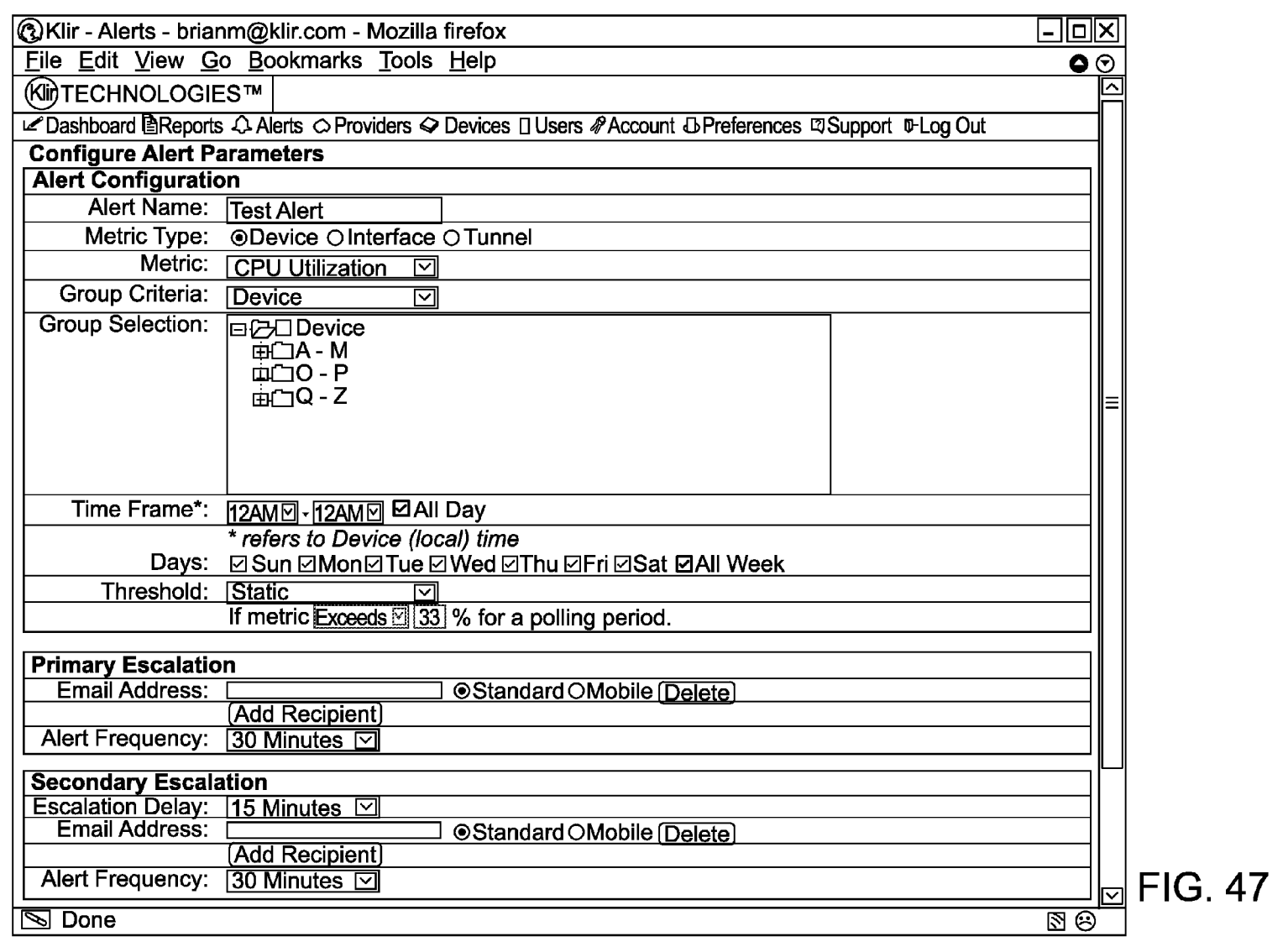

FIG. 47 is a screen display of a format of setting a Static Threshold Alert under the Configure Alert Settings GUI that a user may select to create an alert in an embodiment of the present invention.

Figure 48:
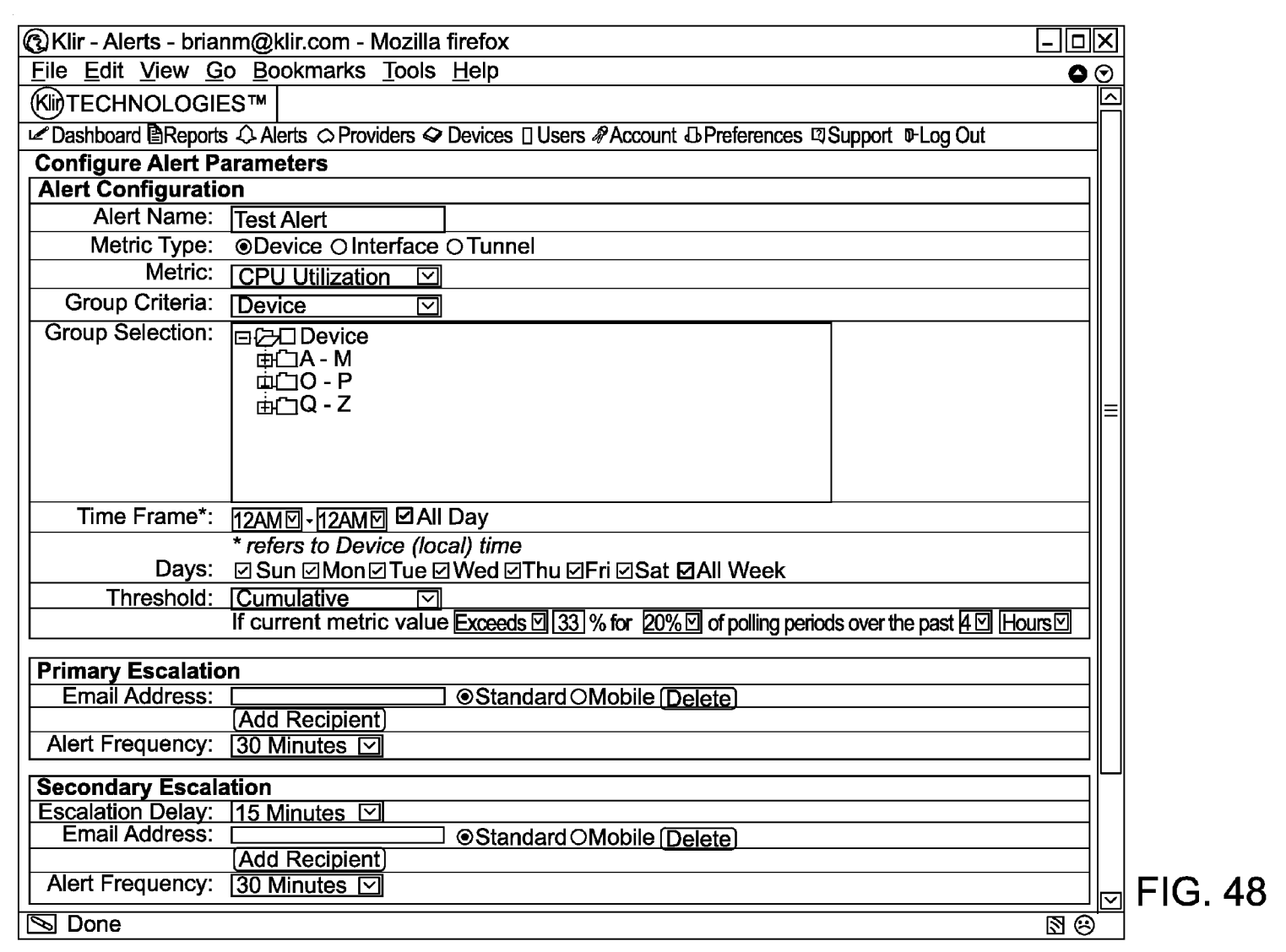

FIG. 48 is a screen display of a format of setting a Cumulative Threshold Alert under the Configure Alert Settings GUI that a user may select to create an alert in an embodiment of the present invention.

FIG. 49 is a screen display of a format of setting a Variable Threshold Alert under the Configure Alert Settings GUI that a user may select to create an alert in an embodiment of the present invention.

FIG. 50 is a screen display of a format of setting a Standard Deviation Threshold Alert under the Configure Alert Settings GUI that a user may select to create an alert in an embodiment of the present invention.

FIG. 52 is a screen display of a format of configuring Account Settings of provider accounts across a set of devices or interfaces with a common set of attributes under the Configure Provider Settings GUI in an embodiment of the present invention.

FIG. 53 is a screen display of a format of configuring a Fixed billing account under the Configure Provider Settings GUI in an embodiment of the present invention.

FIG. 54 is a screen display of a format of configuring a Burstable billing account under the Configure Provider Settings GUI in an embodiment of the present invention.

FIG. 55 is a screen display of a format of configuring a Variable billing account under the Configure Provider Settings GUI in an embodiment of the present invention.

FIG. 56 is a screen display of a format of configuring a Cumulative billing account under the Configure Provider Settings GUI in an embodiment of the present invention.

FIG. 65 is a screen display of the Subnet Settings page, a listing of custom (user-defined) subnet groups for the account in an embodiment of the present invention.

FIG. 66 is a screen display of the Application Configuration page for custom applications where a user may indicate port/protocol assignments and costs attributed to an application in an embodiment of the present invention.

FIG. 68 is a screen display of the templates listing on the Reports page, including the Apps template in an embodiment of the present invention.

FIG. 69 is a screen display of the applications folders on the Reports page in an embodiment of the present invention.

FIG. 71 is a screen display of the configuration of device costs in an embodiment of the present invention.

FIG. 75 is a screen display of a data grid table within a report containing both inbound and outbound values in an embodiment of the present invention.

FIG. 77 is a screen display of a data grid table in an embodiment of the present invention.

FIG. 78 is a screen display of a data grid table in an embodiment of the present invention.

FIG. 79 is a screen display of an in-progress data grid table in an embodiment of the present invention.

FIG. 80 is a chart explaining the cKPI formula in an embodiment of the present invention.

FIG. 81 is a table of Time Standard and Custom View ranges in an embodiment of the present invention.

FIG. 82 is a screen display of an Add/Delete object screen in an embodiment of the present invention.

DETAILED DESCRIPTION OF THE INVENTION

Figure 9A:
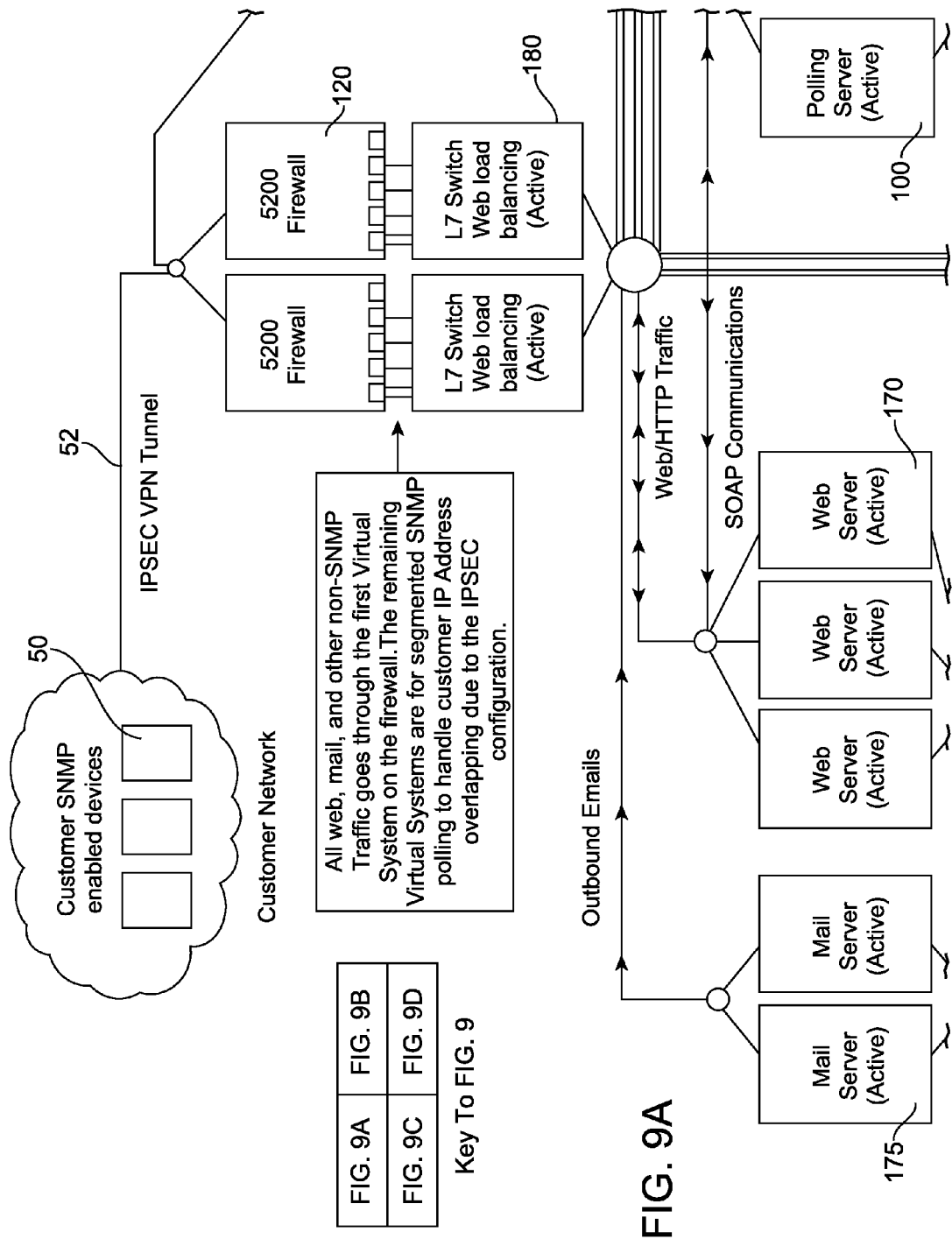
FIG. 9 is an architectural diagram showing an updated IT analytics system in an embodiment of the present invention.
Figure 9C:
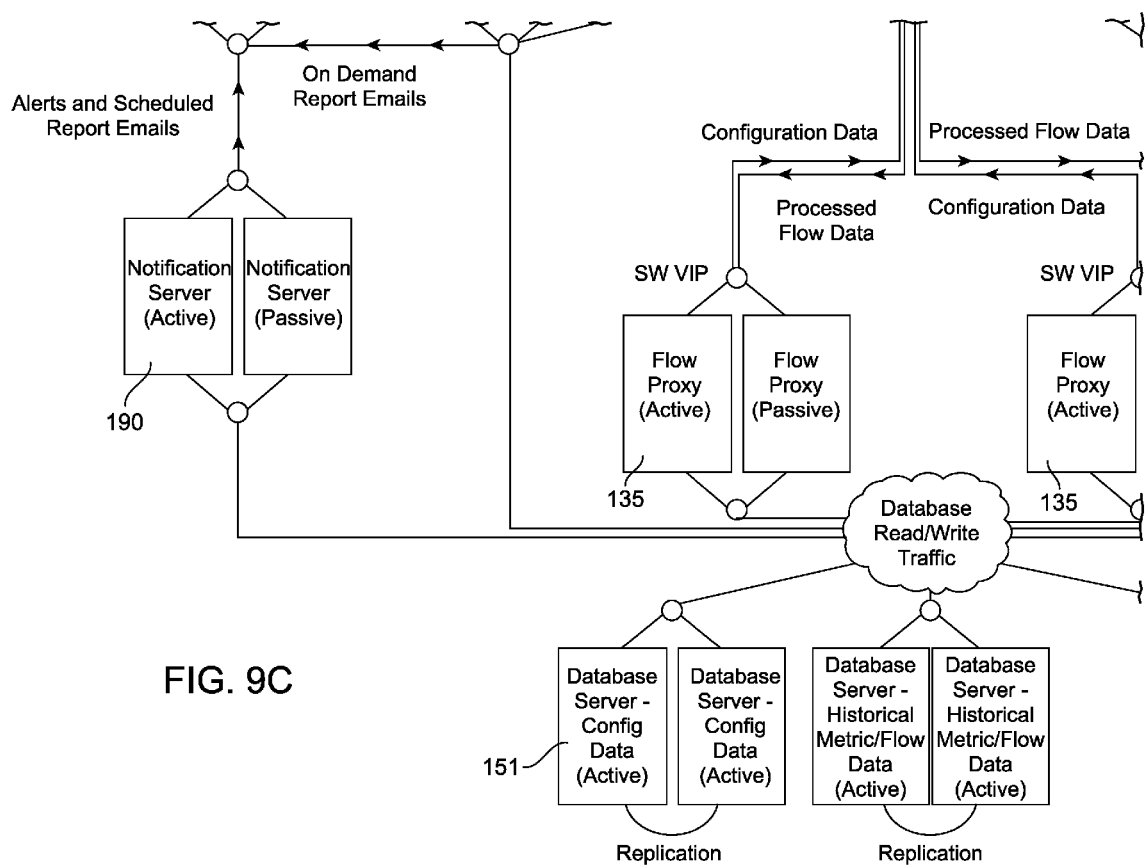
Figure 9D:
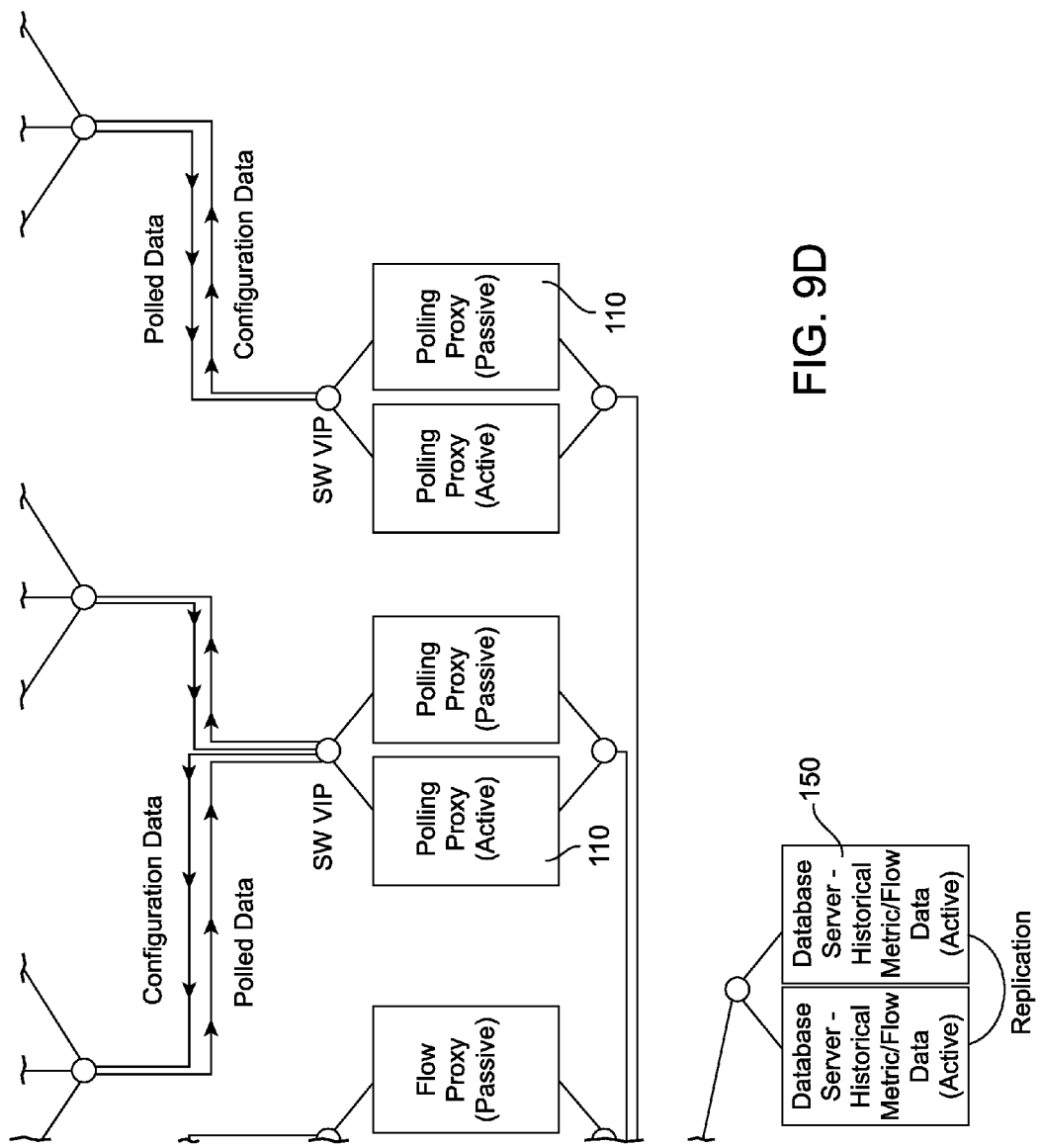

FIG. 9 provides a high-level architecture of a data network monitoring and management system in an embodiment of the invention. Referred to as the Platform or Platform process in embodiments, the present invention provides a system and method of enabling communications between a network device and application servers, a storage server computer and an end-user workstation.

Devices monitored by the system have SNMP read permissions enabled and be visible to the polling servers by establishing a VPN link and routing between the client and the datacenter.

User access to the Platform user interface is through a standards compliant web based interface; the user can use a variety of standard web browsers from their client machine. In one embodiment, the Platform User Interface (UI) requires a minimum of Internet Explorer 5.5, NetScape 6.0, Mozilla [1.6], and preferably at least Internet Explorer 6.0. It is appreciated, however, that alternative versions of the aforementioned browsers, custom browsers or similar interfaces are encompassed by the present invention.

In an embodiment of the invention, the client console also provides an optional 128-bit Secure Sockets Layer (SSL) secured logins into the system. In one embodiment the use of SSL for plots/table metrics is avoided because SSL taxes the server's performance and is unnecessary for providing statistics to the user. The present invention utilizes an SHA1 hash of the user's password as a cookie, which is validated for security when web pages are loaded.

The polling server requests data from the client device. The client device returns the requested data to the polling server which in turn delivers it to the database server. The data is stored until the client workstation authenticates a user session and requests the stored data from the Platform via the web based user interface. A session terminates when the client logs out or terminates use of the Internet web browser for an extended duration of time.

The Platform data collection modules are described in more detail as follows:

Customer SNMP Poller (CSP)

The CSP, residing on the polling server, is a compiled C program script which is scheduled to run every five minutes, via a UNIX cron configuration. Upon being launched, the CSP makes a SQL query to a database that resides on the data warehouse server to determine the list of active customers. For each customer, the CSP uses a multithreaded process, meaning that each customer device is polled in parallel, not serially. Each thread queries the database again to determine that customer's IP address and Object Identification (OID) information. OID is defined by the SNMP standards for a specific MIB. MIBs may be common standards across multiple devices (e.g. IF.MIB), or unique and/or proprietary to specific devices or applications (e.g. ORACLE.MIB). CSP then uses the C module built into the NET-SNMP package to make an SNMP query to each of the customer's devices with the corresponding IP address and OIDs. All of the returned raw data is then written to the database in the event_log data table, along with a timestamp, which denotes the current time. If a customer device does not return any valid data, a value of NULL is written to the database with the same timestamp. In other embodiments, rather than sending out many individual SNMP get requests (one for each SNMP-suite metric), the system includes all OIDs pertaining to one device in each SNMP get request, i.e., SNMP get bulk requests.

With continuing reference to FIG. 9, in one embodiment of the invention components of the Platform are further described.

Polling servers 100 perform the basic functions of SNMP data gathering off of customer devices 50. The Polling Server 100 pairs with a Polling Proxy 110. Polling Servers 100 run a process once every 5 minutes which communicates back to the Polling Proxy server 110 in order to determine what customer devices 50 need to be polled. The Polling Server 110 then sends SNMP GET requests to gather data from customer devices 50 and then feeds the resulting data back to the Polling Proxy 110 server.

Polling Servers 100 are broken into groups called "Polling Clusters." Each Polling Cluster is assigned to a Virtual Firewall System within the NetScreen 5200 firewall 120. This allows multiple customers to use the same IP Address ranges for their devices 50, and yet the polling servers 100 may uniquely identify them through careful segmentation and grouping of Virtual Firewall Systems and Polling Clusters. Finally, each Polling Cluster contains at least 2 Polling Servers 100 in order to achieve High Availability and Failover requirements.

Polling Proxies 110 serve as the controllers for Polling Servers 100, and also as proxies between the Polling Servers 100 and the backend metric/flow data database servers 150 and the configuration data database servers 151. The Polling Proxy 110 is a daemon process which runs constantly and acts in an active/passive failover pair. The Polling Proxy 110 initiates a new polling period every 5 minutes and checks the database to determine which customer devices 50 are active and need to be polled for that period. Once the list of active devices is determined the Proxy 110 waits for Polling Servers 100 to connect and request work. The Polling Proxy 110 then sends the work to the Polling Server 100 and waits for data to come back. Once the Polling Proxy 110 receives the necessary data it takes several actions: a) it inserts raw metric data into the appropriate Database Server—Historical Metric/Flow Data 50, b) it evaluates any alert rules which customers have established on the data, e.g., if CPU Utilization exceeds 50% then email customer@customer.com (various alert rules are subsequently), c) it maintains a list of the most recent SNMP Counter values so that next period the delta between the old counter and new counter can be computed, and d) It performs data aggregation and inserts or updates hourly, daily, weekly, and monthly averages into the Database Server—Historical Metric/Flow Data 51.

Flow Collectors 130 are places either onsite in the datacenter or offsite on Customer Premises depending on the size of the customer. Flow Collectors 130 serve the purposes of listening for incoming NetFlow or sFlow data and performing rollup and processing to prepare the data for use in the system. The Flow Collectors 130 are deployed in pairs for high availability. Failover is handled via a software controlled Virtual IP Address which customer NetFlow or sFlow enabled devices are set to send flow sampling data to. The Flow Collector communicates with the Flow Proxy 135 via a SSLv3/TLSv1 secured connection 132 in order to receive its configuration and pass collected flow data back to the rest of the system.

The Flow proxy 135 is located in the datacenter and serves to maintain and read configuration data for all Flow Collectors 130 in the system. The Flow proxy 135 also serves to receive collected data from the Flow Collectors 130 and to then insert raw 5 minute data to the Database Server—Historical Metric/Flow Data 151, as well as to insert/update hourly, daily, weekly, and monthly average values.

Configuration Database Servers 150 are setup in a replicated pair to support high availability. These servers store all the configuration data related to customer accounts within the system. The Polling Proxy 110, Flow Proxy 130, Web Server 170, and Notification Server 190, all read and or update configuration information regarding customer accounts directly to/from these servers.

A cluster of paired metric/flow data database servers 150 is setup to store the historical SNMP, alert/rule error, and NetFlow/sFlow data. These servers are broken out from the previously described Configuration Database Servers 151 in order to achieve a higher degree of scalability and architectural flexibility. These servers do not store any configuration data but only historical data about devices within the system which is expected to grow linearly over time.

A cluster of 2-n (minimum of 2 for high availability) web servers 170 running Apache and PHP is setup to host the web based user interface of the system. This includes both the Portal visible to end users and the Admin client used internally to manage accounts. These servers 170 are responsible for handling all web traffic to/from the system and for doing all of the processing to generate useful web based reporting on the stored data. The details of the web based user interface are subsequently described.

A pair of Mail Servers 175 provide high availability mail transport service which is used to deliver reports requested by the user from the web based user interface on the Web Server 170, as well as to deliver automated scheduled reports and periodically triggered alert emails. These systems are standard Unix based SMTP mail servers and are shown here only for the purpose of showing the application flow for sending reports and alerts.

A pair of notification servers 190 is setup to provide high availability for scheduled report emails and alert emails. These servers 190 check once an hour for any scheduled reports that users have setup via the web based user interface on the Web Server 170 and then generate the reports and mail out the content. Notification servers 190 also check once a minute for any new alert emails which are queued to go out inside the Database Server—Historical Metric/Flow data 151. If there are any new entries in the database for alerts that have not yet sent notifications then the Notification Server 190 generates an alert email that summarizes the error (or errors) which have occurred and sends it to the specified user.

The customer network contains SNMP enabled devices 50. These devices are reachable to the system via an IPSEC VPN Tunnel 52 which is established from the datacenter to the customer site.

Customer NetFlow/sFlow enabled Router/Switch 60 supports Netflow/sFlow monitoring. These devices 60 must be configured to send flow sampling data to the Flow Collector 130 pair placed on the customer site, or to a Collector 130 pair hosted at the Datacenter. Collectors 130 on the customer site cut down on external bandwidth usage.

Netscreen 5200 firewalls 120 are deployed at the datacenter to support the establishing of a large number of IPSEC VPN Tunnels and to establish distinct routing to the Polling Server 100 even in the case of separate customer networks having overlapping network address ranges. As shown in FIG. 9, each Polling Server 100 is set to route its traffic through a specific Virtual Firewall System within the 5200 120 so that such overlaps can be mitigated by placing the overlapping devices on separate Polling Clusters to force the correct routing.

Layer 7 load balancing switches 180 are utilized within the datacenter to establish Virtual IP Addresses to load balance web and mail traffic. The layer 7 switch 180 is setup to performing availability and health checking on the servers it balances to automatically remove any servers that have failed before forwarding them traffic.

Figure 6:
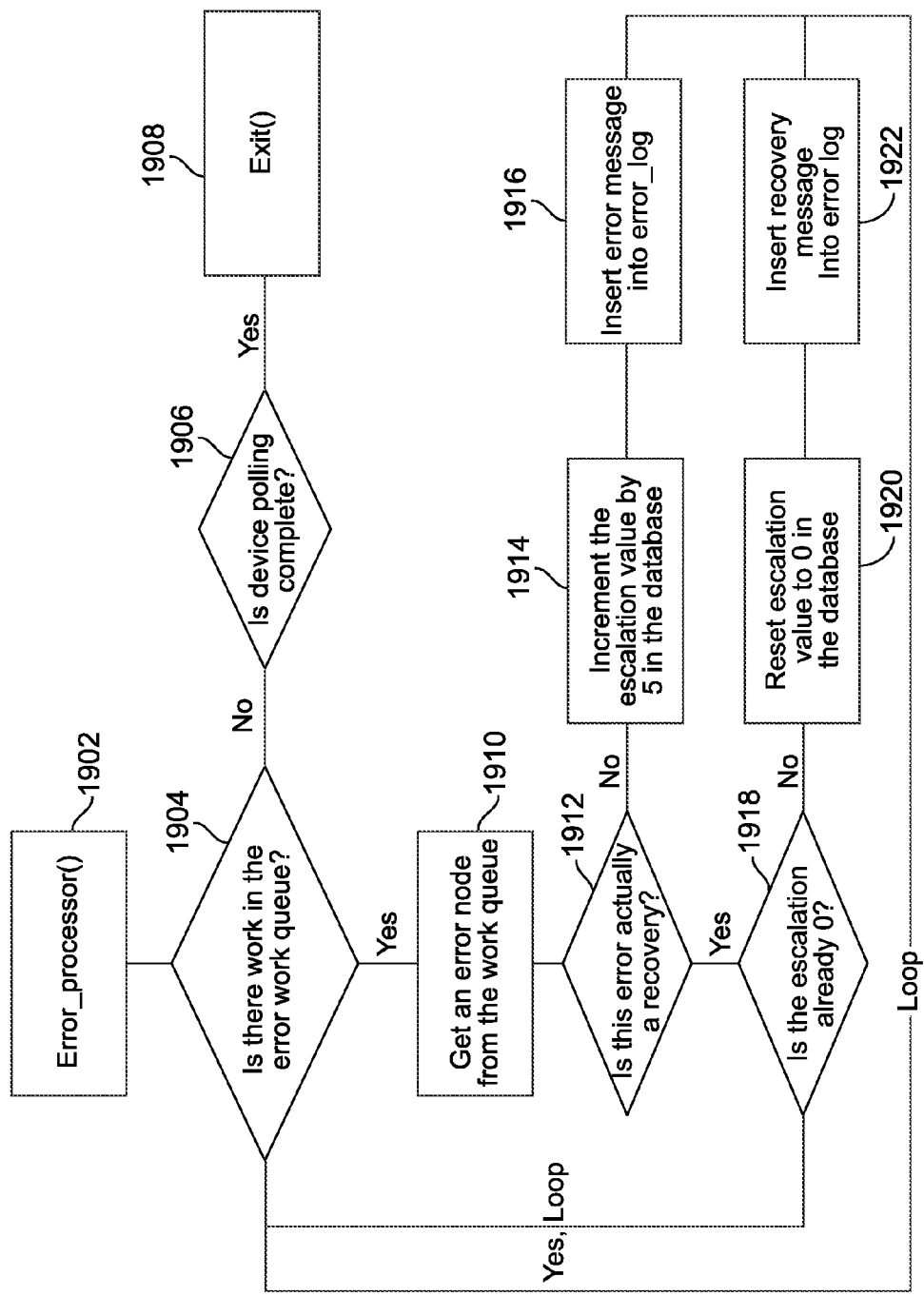
FIG. 6 is a flow diagram of an Error_processor thread in an embodiment of the present invention.
Figure 7:
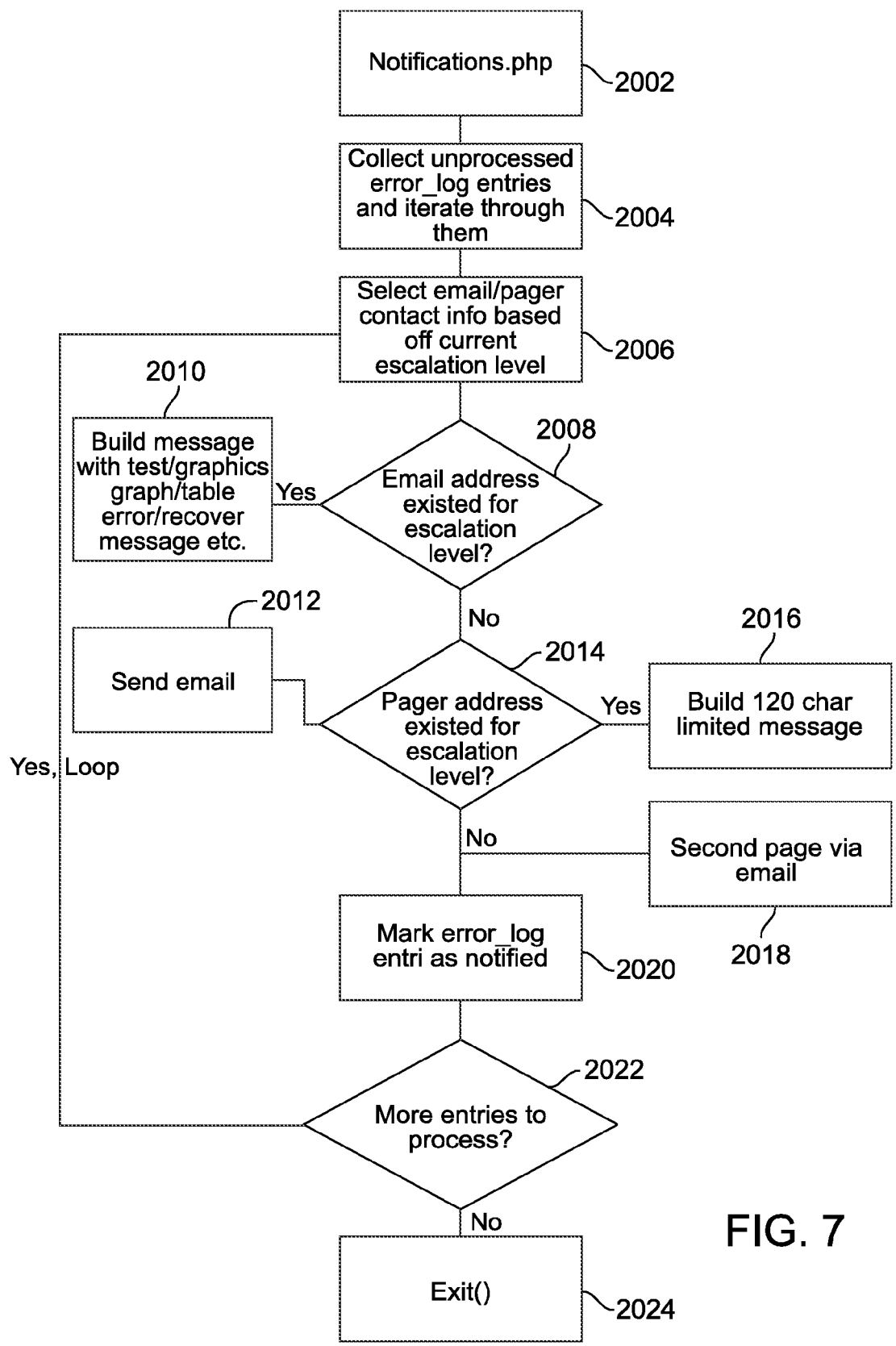
FIG. 7 is a flow diagram of a Notifications process in an embodiment of the present invention.
Figure 8:
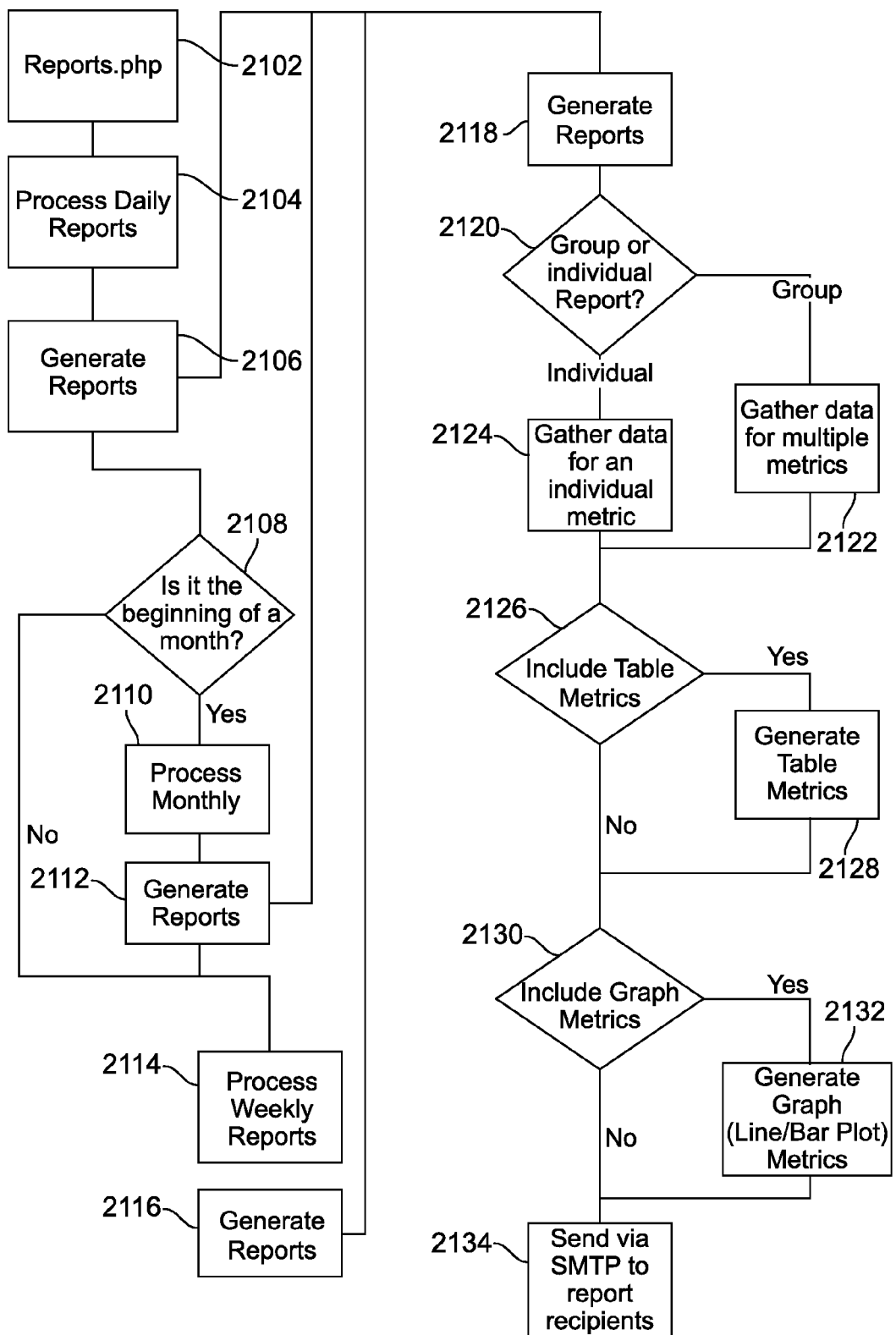
FIG. 8 is a flow diagram of the Report Generation process in an embodiment of the present invention.

FIGS. 1-8 show one embodiment of a multithreaded polling engine including VPN monitoring (as well as Platform), comprising Main( ) flow (FIG. 1) that calls Device_poll( ) (FIGS. 2A and 2B), Process_rules (FIG. 3), Event_inserter( )(FIG. 4), Counter_updater( )(FIG. 5), Error_processor( )(FIG. 6), Notifications.php (FIG. 7) and Reports.php (FIG. 8).

Figure 1:
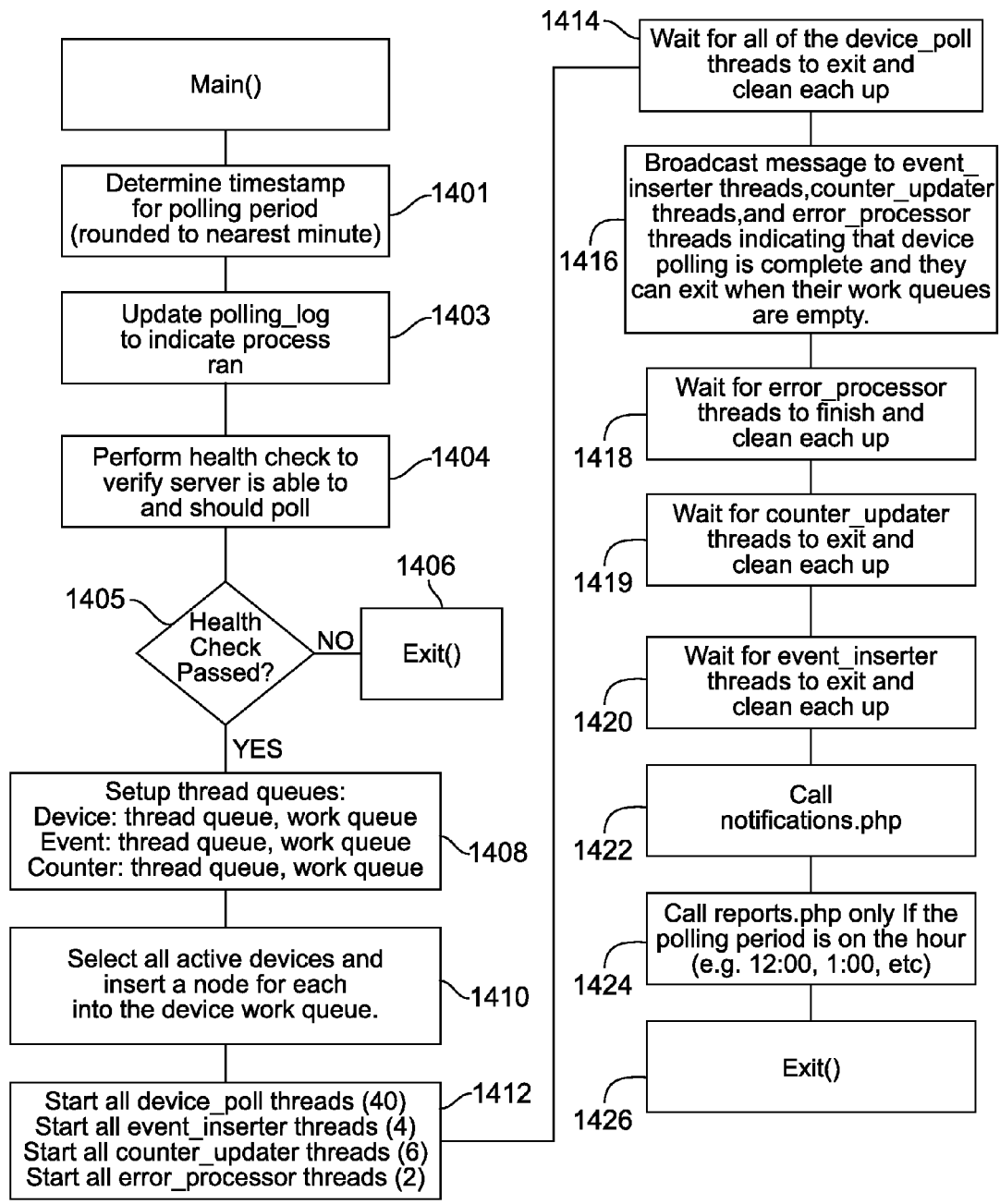
FIG. 1 is a flow diagram of a Main polling process in an embodiment of the present invention.

Referring to FIG. 1, Main( ) polling process is also referred to in this description as ips_engine. Main ( ) flow is launched by Cron, a Unix/Linux event scheduler for executing commands or processes at desired times, every five (5) minutes on exact five (5) minute intervals. The polling cron job will run every 5 minutes on both the primary and disaster recovery site production servers.

Following initiation, the ips_engine determines at step 1401 the timestamp for the polling period rounded to the nearest minute. When the polling cron job process is started, an entry is added to the polling_log (local database) indicating that the process for polling was correctly started at step 1403. This update occurs before any additional checking, as all it is meant to log is that the process was started by the cron job. Each production server is assigned a server_type tag in the statscope.ini file (configuration) identifying it as either the 'primary' or 'secondary' server for failover purposes.

At step 1404 a health check is performed during each polling session and be used to determine whether that individual server should poll or not. This health check is partially dependant upon the times on the two servers being very closely in sync (with a <10 second discrepancy). This requirement is to be handled by ops using time server synchronization.

Additional checking is done before event_log inserts to attempt to further guarantee that duplicate data is not inserted. These checks should never truly be necessary due to the health check, but are implemented simply as one extra layer of checking.

At step 1405, the Primary Server carries out the health check by: (1) checking that its database connection is up (if it is not then exit) and (2) checking that its internet connection is up by checking 10 predetermined internet sites via HTTP-GET and if any of those checks succeed then "up", otherwise "down". If determined "down" in the health check step 1405 then exit at step 1406, otherwise continue with polling as shown in step 1408.

The Secondary Server during the health check determines if the primary server is up by checking if it can connect to the primary servers database. If it can, the secondary server waits 10 seconds and checks that there is an entry in the primary servers database polling_log for this period from the primary server. If the secondary servers finds an entry, it assumes the primary to be up and exits. If the secondary server does not find an entry, then it assumes the primary to be down, and continues checking. If it could not connect to the primary servers database then it assumes the primary is down, and continues checking. If still checking, the secondary server then checks that its database connection is up and exits if it is not. If still checking, the secondary also check that its internet connection is up by checking 10 predetermined internet sites via HTTP-GET and if any of those checks succeed then the secondary is up, otherwise it is down. It the secondary server determines it is down in the above step then it exits, otherwise it continues with polling.

Once the health check is passed at step 1405, the ips_engine sets up thread queues at step 1408 for the device (FIGS. 2A and 2B), event (FIG. 4), counter (FIG. 5) and error (FIG. 6) subflows. At step 1410 active devices are selected and a node for each device inserted into the device work queue.

At step 1412, then the device (FIGS. 2A and 2B), event (FIG. 4), counter (FIG. 5) and error (FIG. 16) threads are started.

Figure 2A:
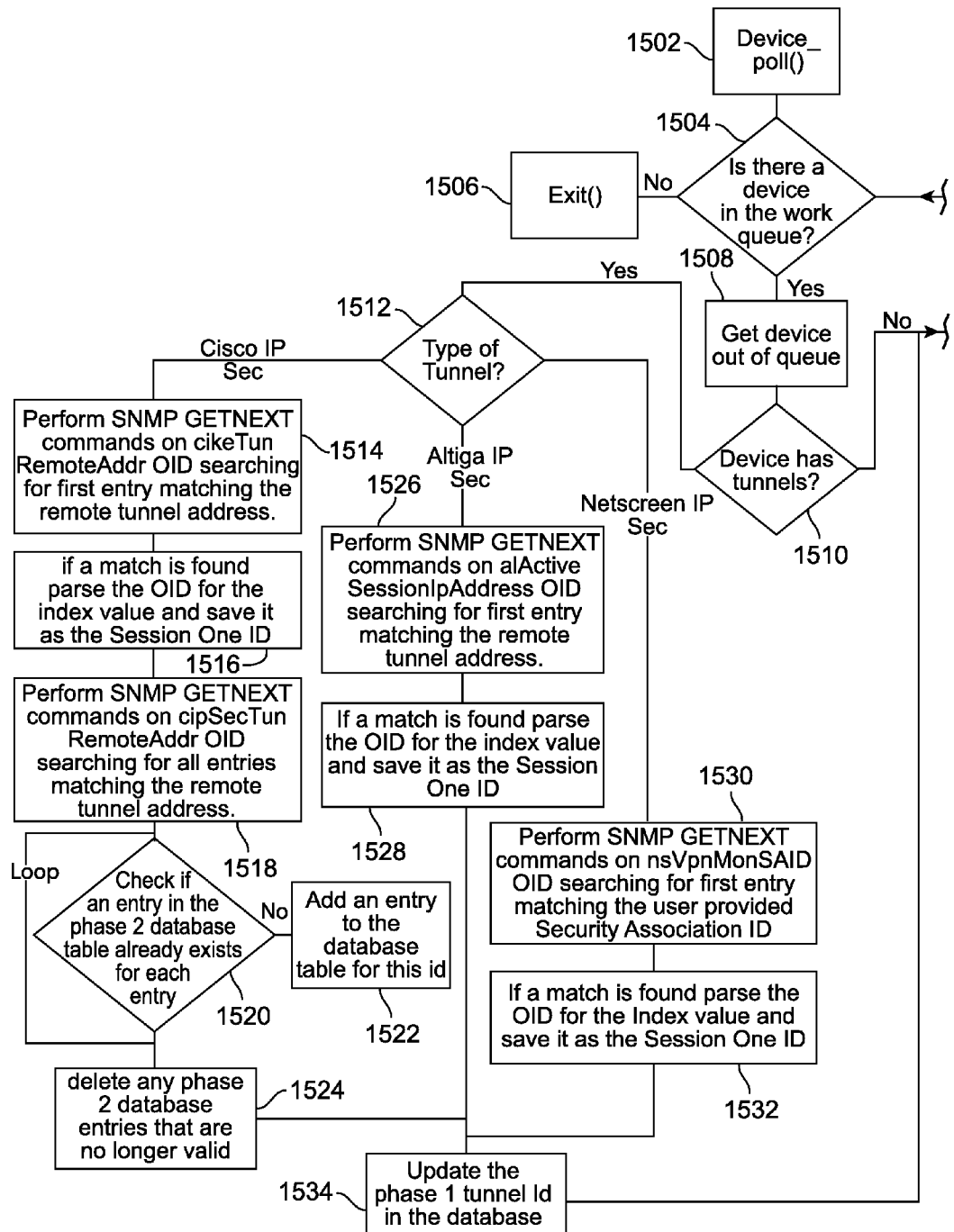
FIGS. 2A and 2B is a flow diagram of a Device polling process in an embodiment of the present invention.
Figure 2B:
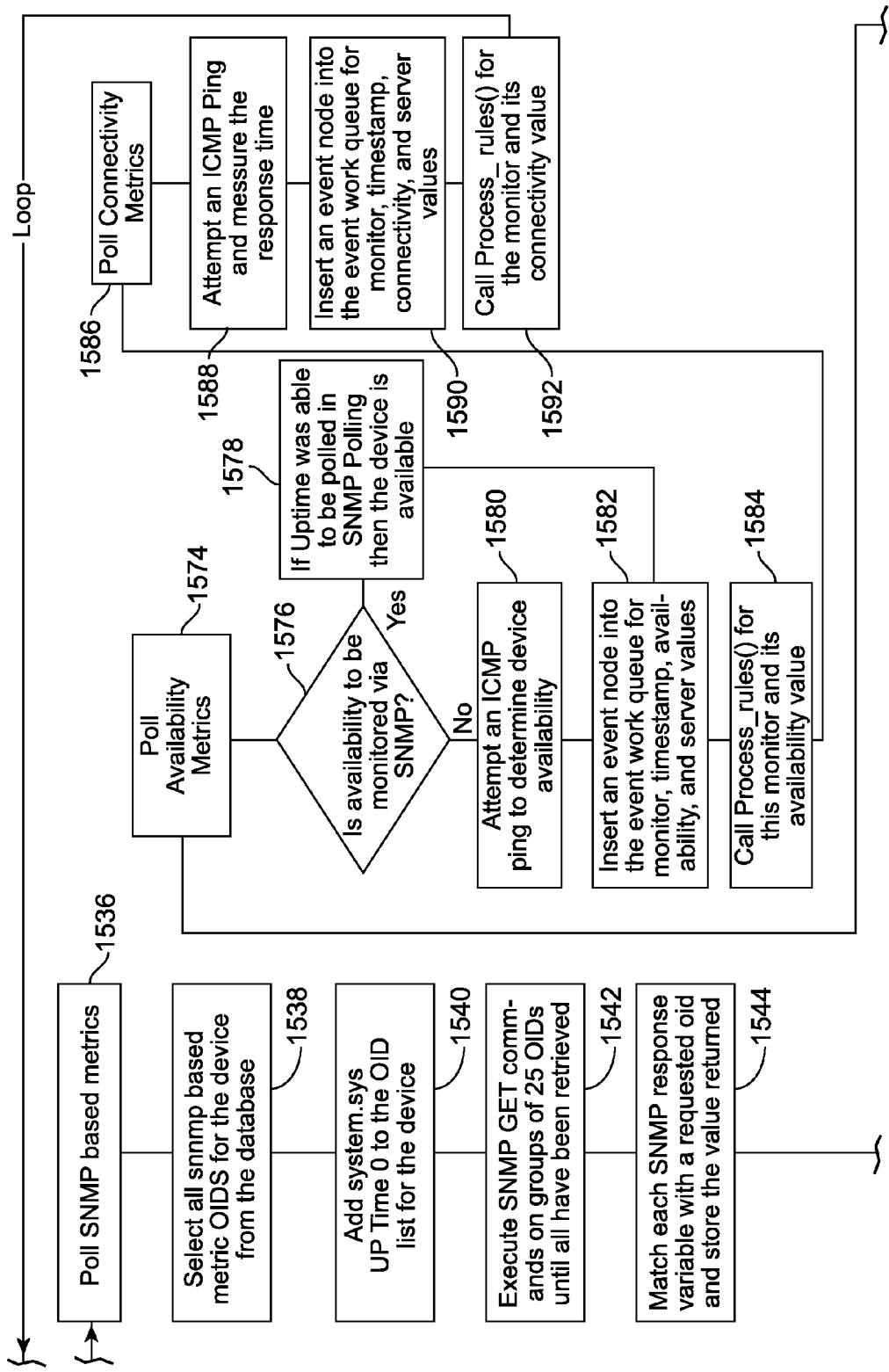
Figure 2B:
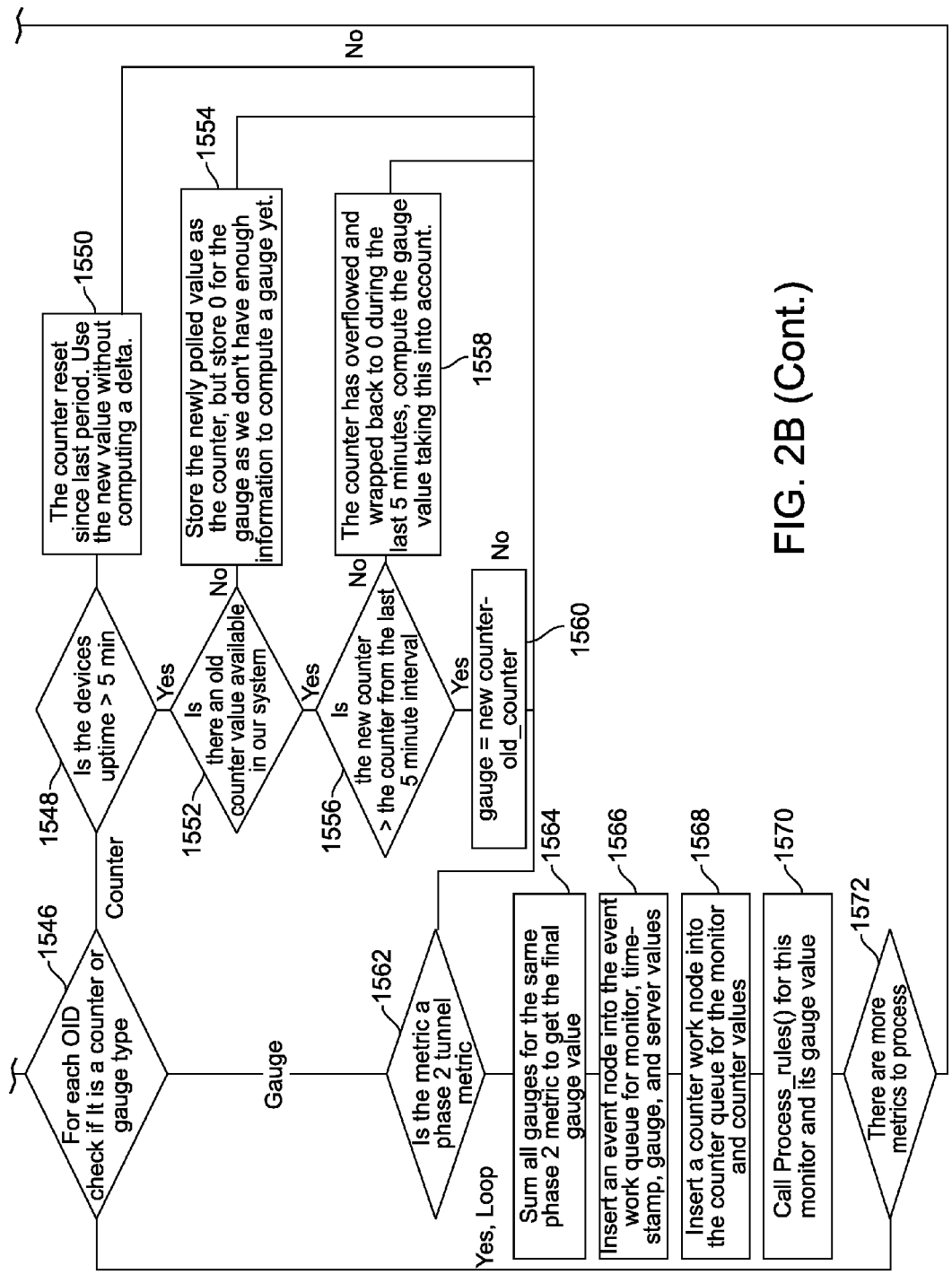

Referring to FIGS. 2A and 2B, the Device_poll flow is initiated at step 1502. At step 1504, the Device_poll thread determines whether there is a device in the work queue. If not, the Device_poll process exits. If there is a device in the work queue, the device is retrieved from the queue at step 1508.

At step 1510, the thread determines if the device has tunnels, i.e., whether the device contains encrypted data intended for use only within a Virtual Private Network (VPN). If not, then the device is polled for SNMP based metrics at step 1536 (discussed further below). If the device has tunnels, the thread determines what type of tunnel it uses, based on the make/model of the device (e.g. Cisco, NetScreen, Altiga), at step 1512.

If the device uses Cisco Systems IPsec, the Device-poll thread performs, at step 1514, SNMP GETNEXT commands on each cikeTunRemoteAddr Object ID (OID) to search for the first entry that matches the remote tunnel address. When a match is found, the OID is parsed at step 1516 for its index value and this index value is saved as the Session One ID. At step 1518, the thread then performs SNMP GETNEXT commands on each cipSecTunRemoteAddr OID to search for all entries matching the remote tunnel address. For each entry, the thread checks at step 1520 to see if an entry in the phase 2 database table already exists. If an entry does already exist, the thread loops and checks the next entry at step 1520. If an entry does not exist on the phase 2 database table, an entry is added to that table for the ID at step 1522. At step 1524, the thread deletes any phase 2 database entries that are no longer valid. The thread then updates the phase 1 tunnel ID in the database at step 1534.

Referring back to step 1512, if the device uses Altiga Networks IPSec, the Device-poll thread performs, at step 1526, SNMP GETNEXT commands on each alActiveSessionlpAddress OID to search for the first entry that matches the remote tunnel address. When a match is found, the OID is parsed at step 1528 for its index value and this index value is saved as the Session One ID. The thread then updates the phase 1 tunnel ID in the database at step 1534.

Referring back once again to step 1512, if the device uses NetScreen IPSec, the Device-poll thread performs, at step 1530, SNMP GETNEXT commands on each nsVpnMonSAID OID to search for the first entry that matches the user-provided Security Association ID. When a match is found, the OID is parsed at step 1532 for its index value and this index value is saved as the Session One ID. The thread then updates the phase 1 tunnel ID in the database at step 1534.

Proceeding from step 1534, or from step 1510 if the device does not have tunnels, the Device_poll thread polls the device's SNMP-based metrics at step 1536. At step 1538, the thread selects all SNMP-based metric OIDs for the device from the database. The thread then adds system.sysUpTime.0 to the OID list for the device at step 1540. SNMP GET commands are then executed at step 1542 on OIDs in groups of 25 until all OIDs have been retrieved. At step 1544, the thread then matches each SNMP response variable with a requested OID and stores the returned value.

For each OID that was retrieved, step 1546 checks to determine if it is a "counter" OID, an OID that increments by one for every time an event occurs, or a "gauge" OID, an OID that reports a specific variable. If the OID is a gauge OID, the thread proceeds immediately to step 1562.

If, however, the OID is a counter OID, step 1548 determines whether the device's uptime is greater than five minutes. If not, step 1550 resets the counter since the last period, the thread uses the new counter value without computing a delta, and the thread proceeds to step 1562. If the device's uptime is greater than five minutes, the thread determines at step 1552 whether there is an old counter value available in the system. If not, step 1554 stores the newly polled value as the counter, but stores zero for the gauge because there is not yet enough information available to compute a gauge; the thread then proceeds to step 1562. If an old counter value is available in the system, step 1556 determines whether the new counter is greater than the counter from the last 5 minute interval. If not, step 1558 computes the gauge value taking into account that the counter necessarily has overflowed and wrapped back to zero during the last 5 minutes; the thread then proceeds to step 1562. If the new counter is greater than the counter from the last 5 minute interval, the gauge is set at step 1560 to be equal to new_counter minus old_counter; the thread then proceeds to step 1562.

Turning to step 1562, at this step, the Device_poll thread determines whether the metric is a phase 2 tunnel metric. If so, the thread sums all gauges for the same phase 2 metric to get the final gauge value at step 1564. At step 1566, the thread then inserts an event node into the event work queue for the monitor, timestamp, gauge, and server values. A counter work node is then inserted into the counter queue for the monitor and counter values at step 1568. Next, the thread calls the Process_rules thread (detailed below) for the monitor and its gauge value at step 1570.

At step 1572, the thread then determines if there are any more metrics to process. If so, the thread loops back to step 1546. If not, the thread polls the availability metrics at step 1574.

From step 1574, the thread proceeds to step 1576, where it evaluates whether the availability is to be monitored via SNMP or not. If not, the thread attempts an Internet Control Message Protocol (ICMP) Ping to determine the device's availability at step 1580. If the availability is to be monitored via SNMP, the thread determines, at step 1578, if it was able to poll the device's Uptime in SNMP polling; if successful, then that means the device is available. From steps 1578 or 1580, the thread continues to step 1582 where it inserts an event node into the event work queue for the monitor, timestamp, availability, and server values. Next, the thread calls the Process_rules thread (detailed below) for the monitor and its availability value at step 1584.

Next, the Device_poll thread polls the connectivity metrics at step 1586. At step 1588, the thread attempts an ICMP Ping and measures the response time. The thread then inserts an event node into the event work queue for the monitor, timestamp, availability, and server values at step 1590. Next, the thread calls the Process_rules thread (detailed below) for the monitor and its connectivity value at step 1592.

Finally, the Device_poll thread loops back to step 1504 for polling the next device, if any, in the work queue.

Figure 3:
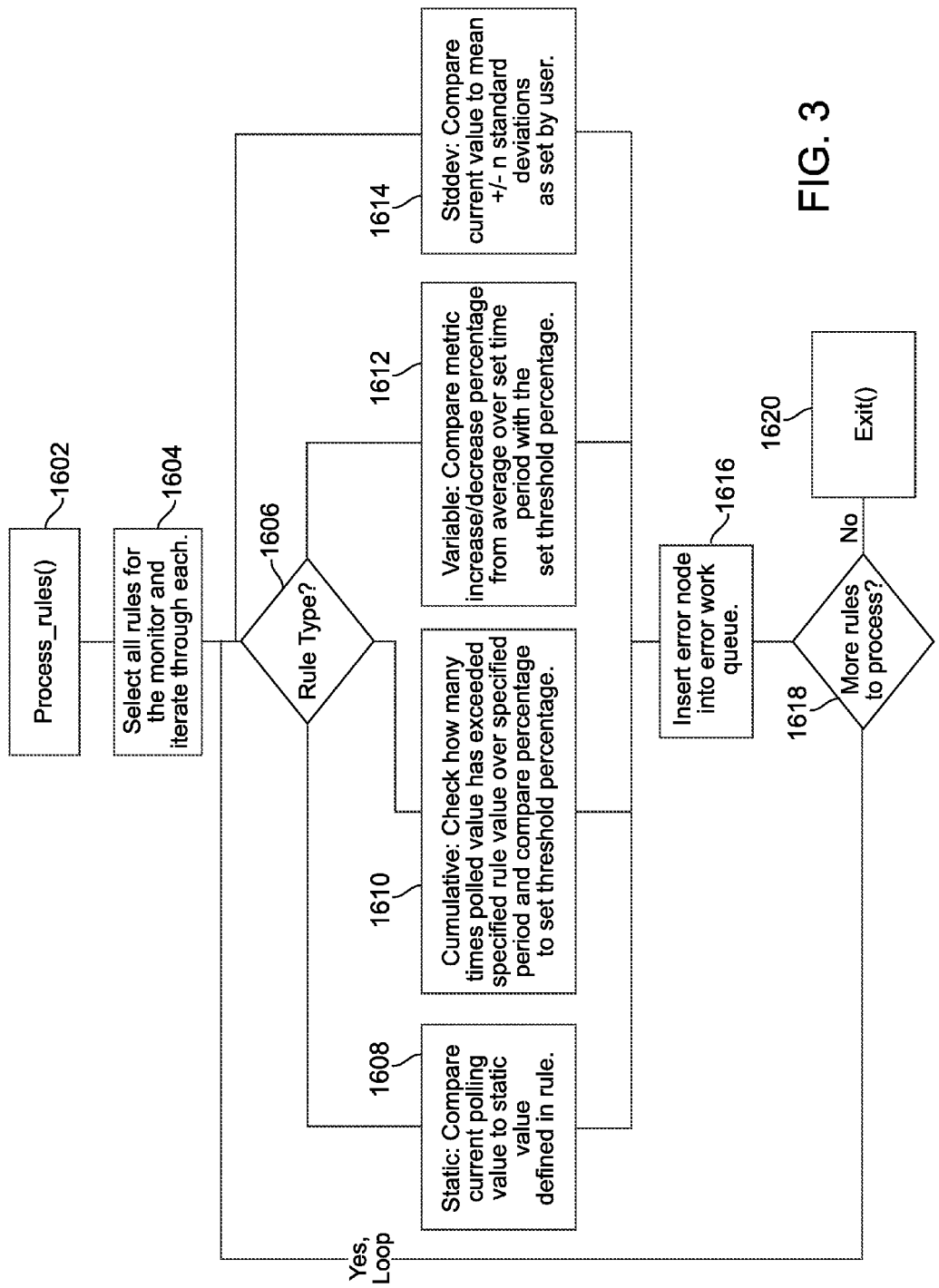
FIG. 3 is a flow diagram of a Process_rules thread in an embodiment of the present invention.

Referring to FIG. 3, the Process_rules thread, called by the Device_poll thread at steps 1570, 1584, and 1592 (FIG. 2B), is described. The Process_rules thread processes all of the rules for a specific monitor, tests the result for each monitor to see whether any thresholds have been exceeded, and inserts an entry into the error work queue for each exceeded threshold. The Process_rules thread begins at step 1604, where it selects all the rules for the particular monitor and iterates through each rule. Appendix 3 provides an embodiment of the actual code for carrying out rule processing.

At step 1606, the thread determines which type of rule is selected. If it is a static rule, the thread compares the current polling value to the static value defined in the rule at step 1608. If it is a cumulative rule, the thread checks how many times the polled value has exceeded a specified rule value over a specified time period and compares this percentage to a set threshold percentage at step 1610. If it is a variable rule, the thread compares the metric increase or decrease percentage from the average over a set time period with a set threshold percentage at step 1612. Lastly, if it is a standard deviation rule, the thread compares the current value to standard deviations (mean+/−n) as set by the user at step 1614. If any of the thresholds from steps, 1608, 1610, 1612, or 1614 are exceeded, the thread inserts an error node into the error work queue at step 1616.

The Process_rules thread then evaluates whether there are more rules to process at step 1618. If so, the thread loops back to step 1606. If not, the thread exits.

Figure 4:
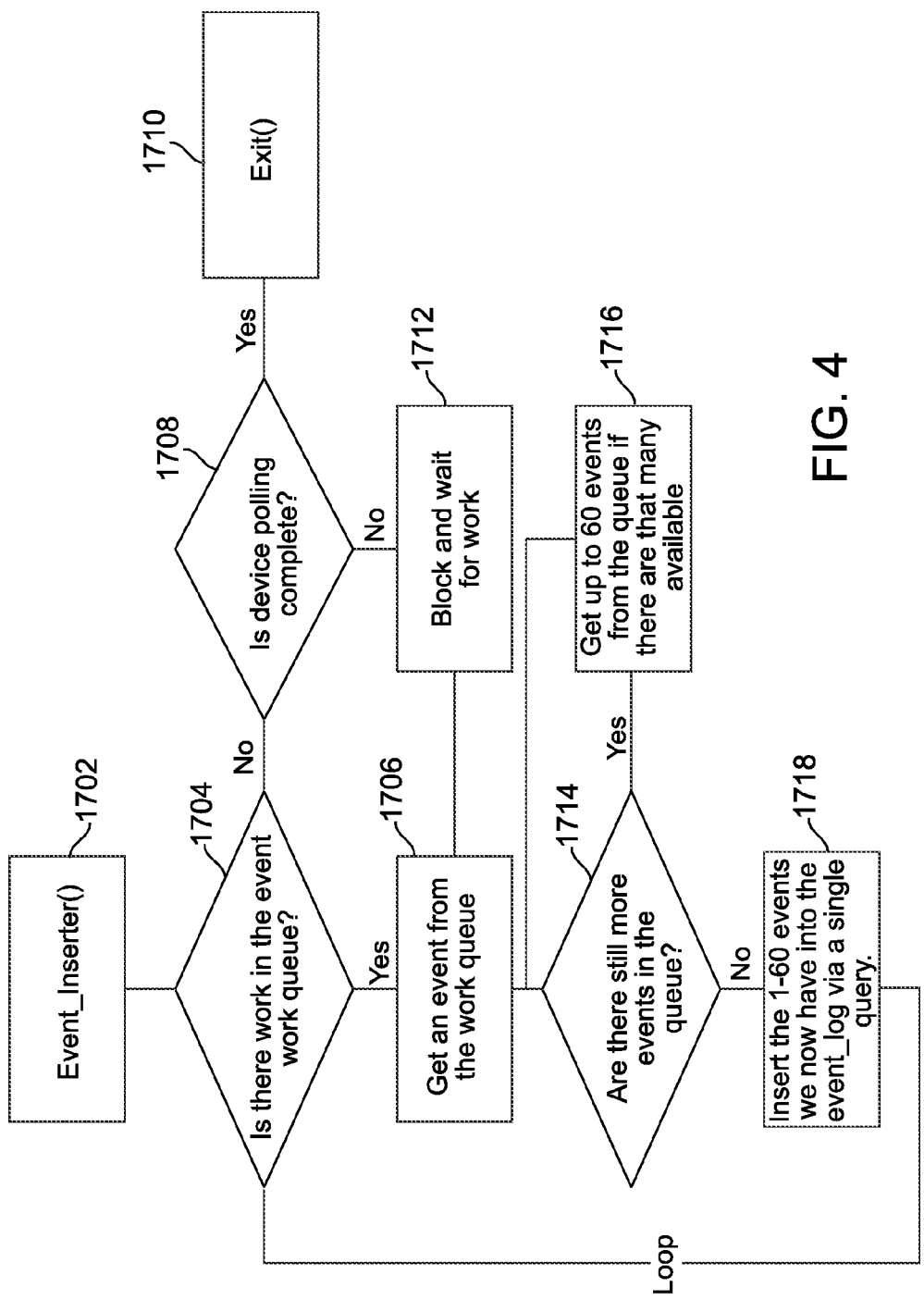
FIG. 4 is a flow diagram of an Event_inserter thread in an embodiment of the present invention.

Referring to FIG. 4, the Event_inserter thread is initiated at step 1702. The Event_inserter flow processes poll result entries in event work queue and inserts the entries into the event_log in the database.

At step 1704, the Event_inserter thread determines if there is work in event work queue. If yes, an event is retrieved from the work queue at step 1706. If no, the thread determines at step 1708 if device polling (FIGS. 2A and 2B) is complete. If device polling is not complete, the event_inserter( ) blocks and waits for work at step 1712. If device polling is complete the Event_inserter thread exits.

With reference to step 1706, when the thread does not exit, an event is obtained from the work queue. At step 1714, the thread determines if there are still more events in queue. If yes, up to 60 events are obtained from the queue at step 1716. If no, up to 60 events are inserted into event_log at step 1718 in a single query, and the process loops to step 1704.

In certain embodiments of the invention, when it comes time to insert into the event_log (as either a primary or secondary server), first check that a row with the same monitor_id, monitor_server_id, and timestamp does not already exist. If replication is up to date this will ensure that even if polling runs on both sides for a polling period, data only gets inserted once.

Figure 5:
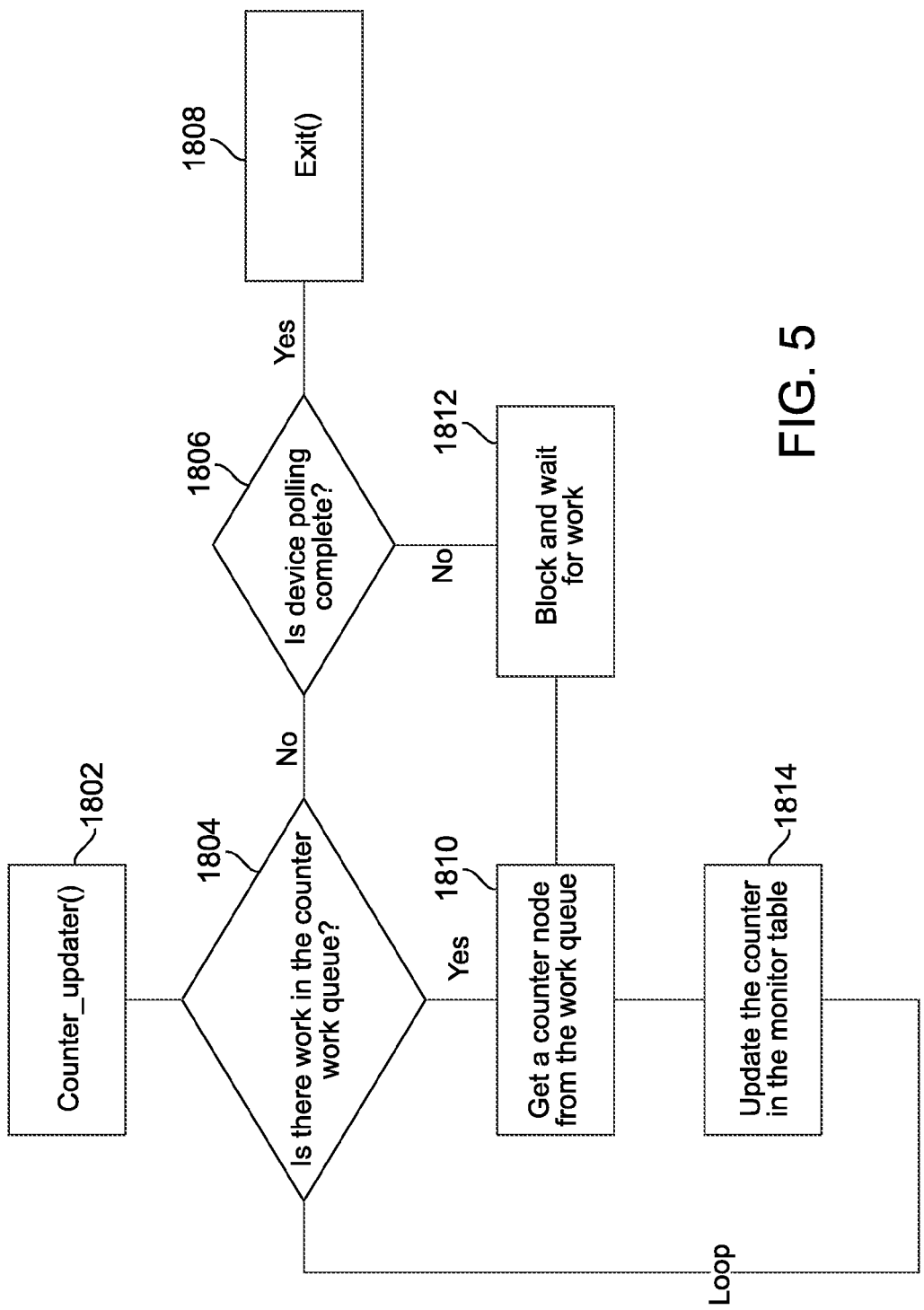
FIG. 5 is a flow diagram of a Counter_updater sub-flow in an embodiment of the present invention.

Referring to FIG. 5, the counter_updater flow processes poll entries in the counter work queue and updates the counter value in the monitor table in the database. This function is provided because counter value needs to be saved in the database for comparison with the next polled counter value so a gauge value can be computed.

After the counter_updater( ) subflow is initiated at step 1802, the first determination is whether there is work in the counter work queue at step 1804. If yes, a counter node is retrieved from the work queue at step 1810. If no, a query is made at step 1806 to determine if device polling (FIGS. 2A and 2B) is complete. If polling is complete, the thread exits at step 1808. If polling is not complete, at step 1812 the thread is blocked and waits for work and proceeds to step 1810.

From step 1810, the counter_updater flow updates the counter in the monitor table at step 1814. The process then loops back to step 1804.

Referring to FIG. 6, the Error_processor flow processes rule evaluation result entries in the error work queue and determines for each entry if an error_log entry needs to be made in the database. Entries are made in the error_log when (1) a threshold has been exceeded and (2) an exceeded threshold has recovered. This flow also updates the escalation value in the database. Appendix 2 sets forth an embodiment of the actual code that may be used to perform error processing.

At step 1902, the error_processor thread is initiated. Next, the thread determines if there is work in the error work queue at step 1904. If no work, at step 1906, the thread determines if the device polling (FIGS. 2A and 2B) is complete. Once the polling is complete the thread exits at step 1908.

Following step 1904, if there is work in the error work queue, at step 1910 an error node is obtained from the work queue. At step 1912, the flow queries whether the error is actually a recovery. If the error is a recovery, at step 1918 it is determined whether the escalation is already 0. If the error is not a recovery, the escalation value is incremented by 5 in the database at step 1914, and an error is inserted into the error_log at step 1916.

At step 1918, where it is determined if the escalation is already at 0, the flow proceeds to step 1920 if the escalation is not at 0. At step 1920 the escalation is reset 0 and a recovery message is inserted into the error log at step 1922. If the escalation is already at 0, the process loops back to step 1904. This also occurs after steps 1916 and 1922.

Referring again to FIG. 1 of the Main( ) flow process, at step 1414 device polling proceeds through exit and clean up before a broadcast message is sent to event_inserter, counter_updater and error_processor threads at step 1416 to notify of completion of device polling so they can exit when their work queues are empty.

At steps 1418, 1419 and 1420, the error_processor, counter_updater and event_inserter threads are awaited for exit and clean up. After the clean up and exit of these subflows, notifications.php is called at step 1422.

Referring to FIG. 7, the Notification Engine (notifications.php) is described.

At step 2004, the Notifications thread collects all of the unprocessed error_log entries and iterates through each of entry. The thread first selects the email or pager contact information which is based off of the current escalation level at step 2006. At step 2008, the thread determines whether an email address exists for the escalation level. If so, the thread builds a message that includes such information as text and/or graphics, graphs and/or tables, or error and/or recover messages at step 2010. This message is then sent at step 2012.

After sending an email message at step 2012, or after determining that no email address existed for the escalation level at step 2008, the thread determines whether a pager address exists for the escalation level at step 2014. If so, the thread builds a 120 character limited message at step 2016 and sends the message as a page via email at step 2018.

After sending a page at step 2018, or after determining that no page address existed for the escalation level at step 2014, the thread marks the error_log entry as notified at step 2020. At step 2022, the thread evaluates whether there are more entries to process. If so, the thread loops back to step 2006. If not, the thread exits.

Referring again to FIG. 1 of the Main( ) flow, after notifications.php has exited, reports.php is called at step 1424 if the polling period [is on the hour.]

Referring now to FIG. 8, the Reports Engine (reports.php) is described. The Reports Engine processes the daily reports at step 2104, then proceeds to step 2106 to generate the daily report (detailed below). At step 2108, the thread determines whether it is the beginning of the month. If it is the beginning of the month, the thread processes the monthly report at step 2110, generates the monthly report at step 2112 (detailed below), then processes the weekly reports at step 2114 and generates the weekly report at step 2116 (detailed below). If however, it is not the beginning of the month, the thread proceeds directly to step 2114.

At step 2118, the Reports Engine generates the daily, weekly, or monthly report. The thread determines whether the report is a group or individual report at step 2120. If it is a group report, the thread gathers data for multiple metrics at step 2122. Otherwise, if it is an individual report, the thread gathers data for an individual metric at step 2124.

At step 2126, the thread determines whether table metrics are to be included in the report. If so, the table metrics are generated at step 2128. If not, the thread proceeds directly to step 2130.

At step 2130, the thread evaluates whether graph metrics are to be included in the report. If so, the graph metrics (i.e., a line or bar plot) is generated at step 2132. If not, the thread proceeds directly to step 2134, where the thread sends the report to its recipients via SMTP and then exits.

In one embodiment, when an end user selects "metrics" to be generated the system propagates all point arrays and then builds a static image and html table based on these values. In another embodiment, the point arrays might be propagated twice to build a dynamic image and html table based on the given form elements. This embodiment can cut load times down by up to 50% and provide a richer content experience.

Further embodiments of the invention set forth provide interfaces to the Platform as described with reference to FIGS. 10-82:

User Interface (UI)

Figure 10:
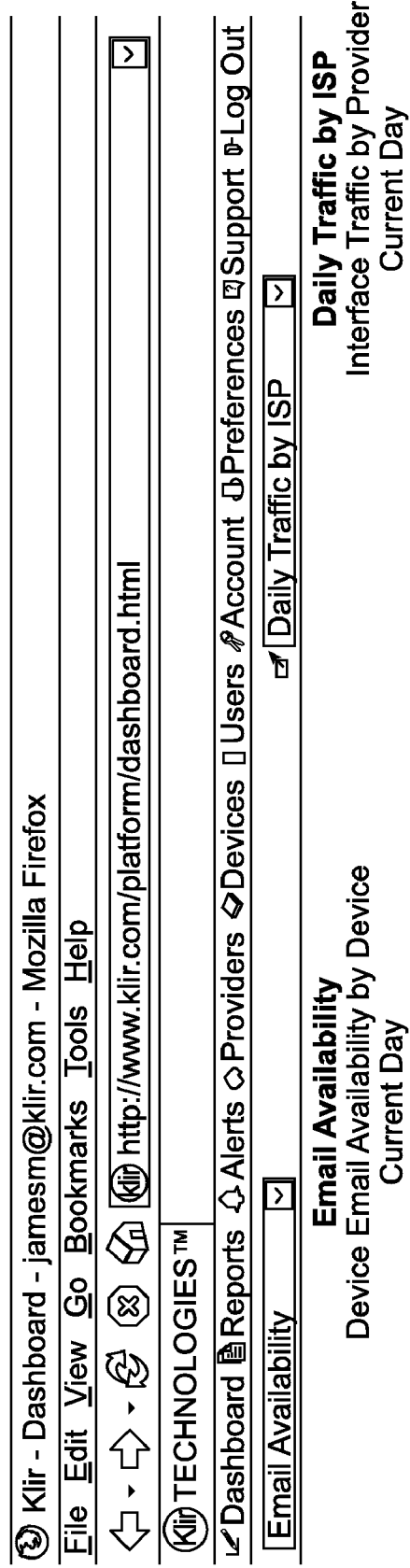
FIG. 10 is a graphical user interface (GUI) showing selectable interfaces from a toolbar menu in an embodiment of the present invention.

Referring to FIG. 10, the presentation of data to the user is through a series of graphical user interfaces (GUIs or Graphic Interface) linked through icons that provide a menu of options along the top of the page for the user to access specific features of the inventions.

In one embodiment the Platform includes a tool bar menu enabling the available GUIs to be selected by a user, including a Dashboard, consolidation of Devices and VPN Tunnels into a single GUI called "Devices", "Alerts", "Reports", "Providers", "Accounts" and "Preferences".

Account Filter and Account Selectors

Figure 57:
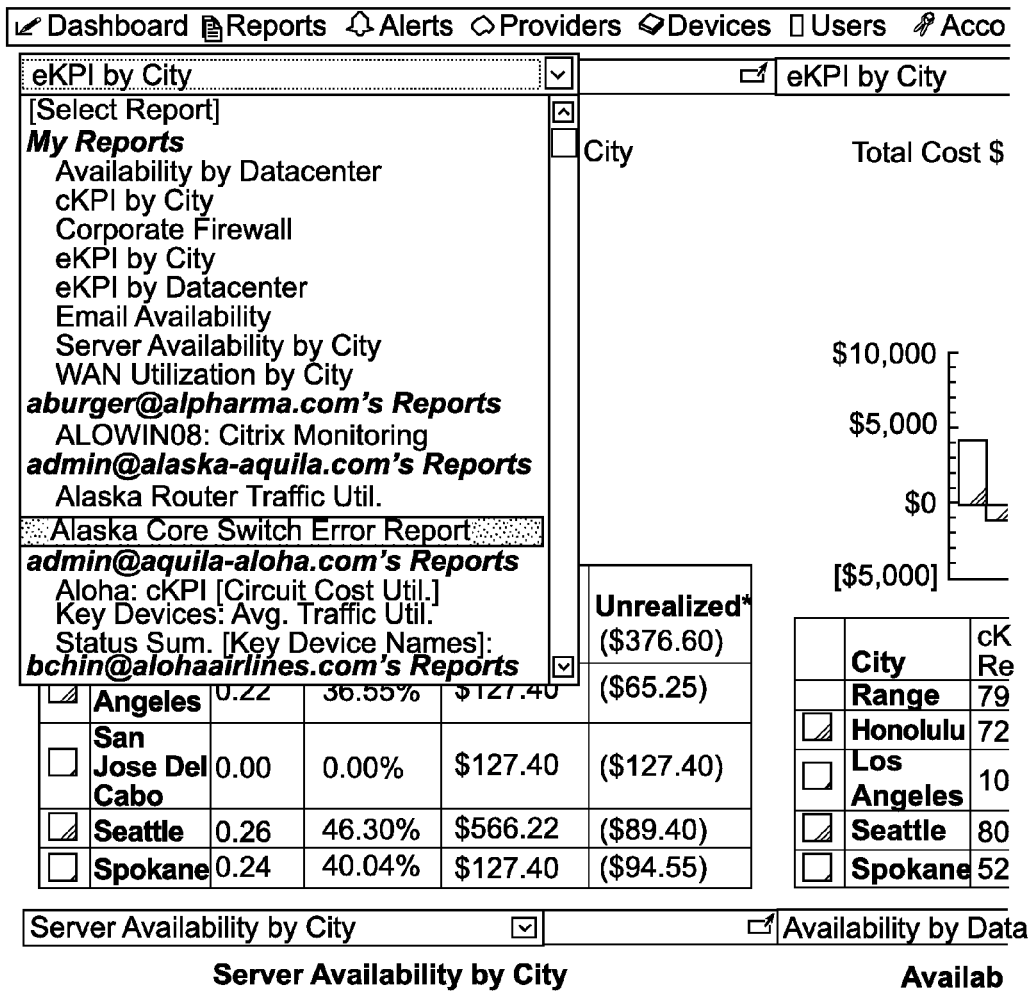
FIG. 57 is a screen display showing the Super-Account Drop-down selector for Reports on the Dashboard GUI in an embodiment of the present invention.

Referring to FIG. 57, in another embodiment of the invention, the Account and Account Filter selectors display at the top of various interfaces for Super-Accounts allowing users to display, filter and configure information by individual Accounts, or across multiple Accounts. If the number of Accounts under the Super-Account is 20 or less, then Account is the only selector provided. If the number is greater than 20 then the Account Filter selector is provided initially and the values for this selector is each letter of the alphabet [A-Z], each digit [0-9], and '(Select All)' or '(Select One)' (depending on the interface) which will appear at the top of the list. Only the letters/numbers that apply to existing Accounts under the Super-Account will appear as values for the Account Filter selector. If the user changes the Account Filter selection from an initial default of '(Select All)' or '(Select One)' and selects one of the letter/number values, then the Account selector will appear and the initial default selection is the first Account (according to ascending alphanumeric sort by Account Name) for the letter/number selected. For example, if Accounts 'Basic Networking' and 'Boston Engineering' are the two Accounts under the Super-Account that start with 'B' and the Super-User selects 'B' in the Account Filter selector, then 'Basic Networking' would be the initial default selection for the Account selector. If the number of Accounts under the Super-Account is 20 or less and the Account Filter does not apply for the Super-Account, then the initial default selection for the Account selector is '(Select All)', '(Select One)', or the Super-Account as indicated in the various interface mockups.

Dashboard

Referring again to FIG. 11, in another embodiment of the invention, the Platform includes a central console, or Dashboard, where Users can peruse a series of Saved Reports from a single interface. The dashboard includes summary graphs and data that provide the user with a quick synopsis of selected performance and costs information. The Dashboard interface provides an optional start page a user may select when logging into the Platform.

Dashboard Cells

Figure 11:
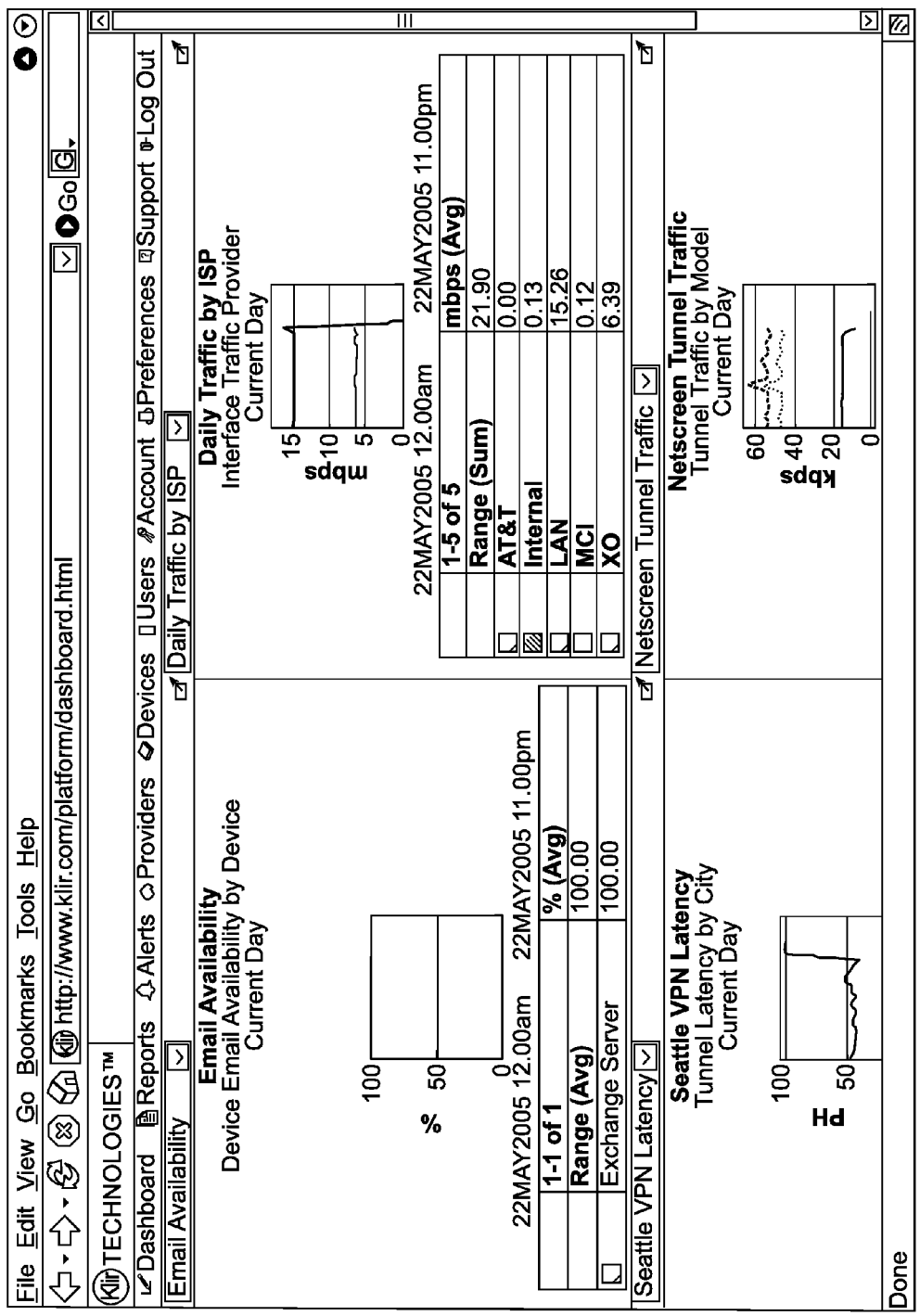
FIG. 11 is a GUI showing the Dashboard interface selected from the toolbar menu in an embodiment of the present invention.
Figure 22:
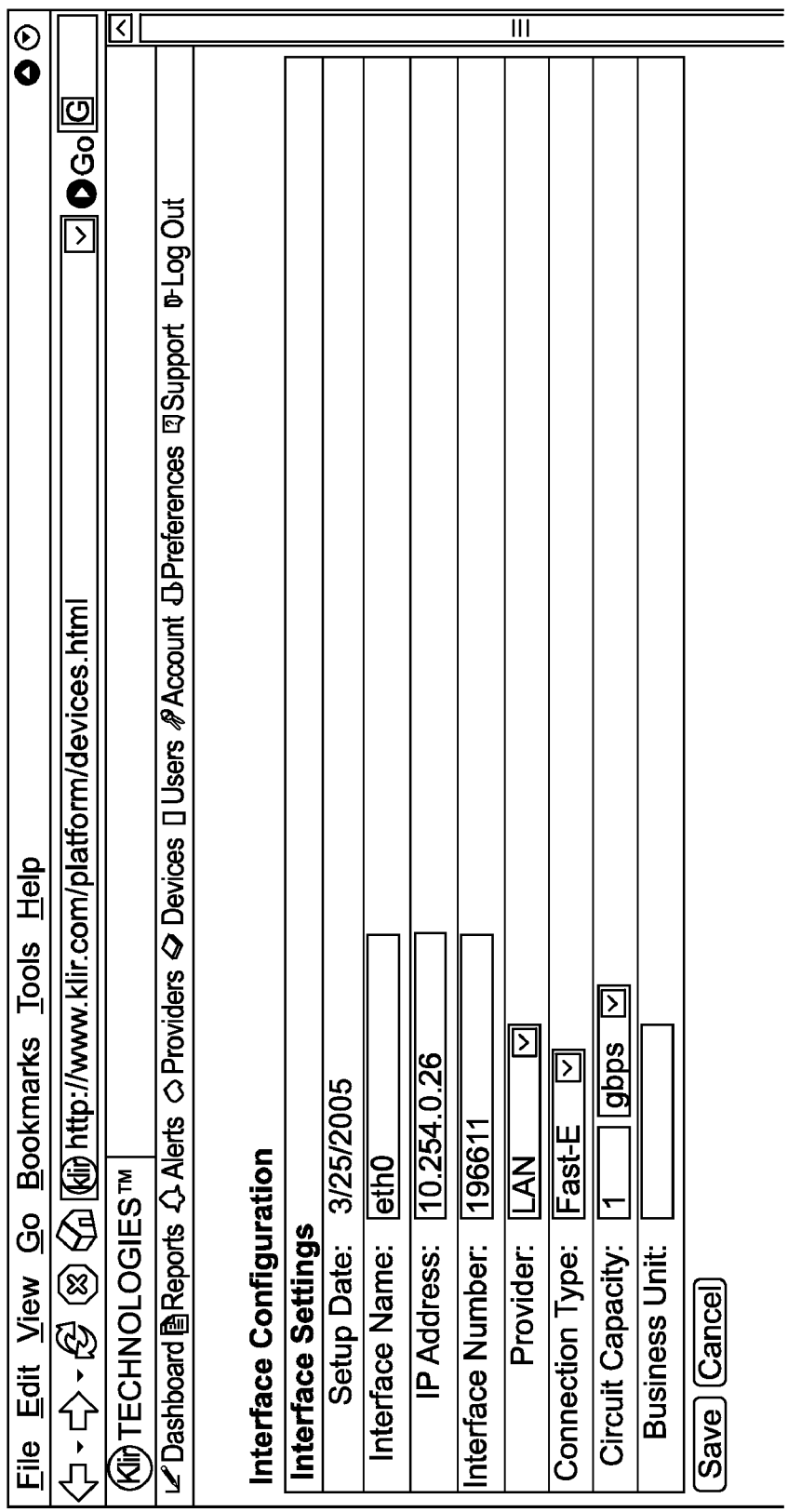
FIG. 22 is a GUI showing the Interface Configuration interface selected from the toolbar menu in an embodiment of the present invention.
Figure 24:
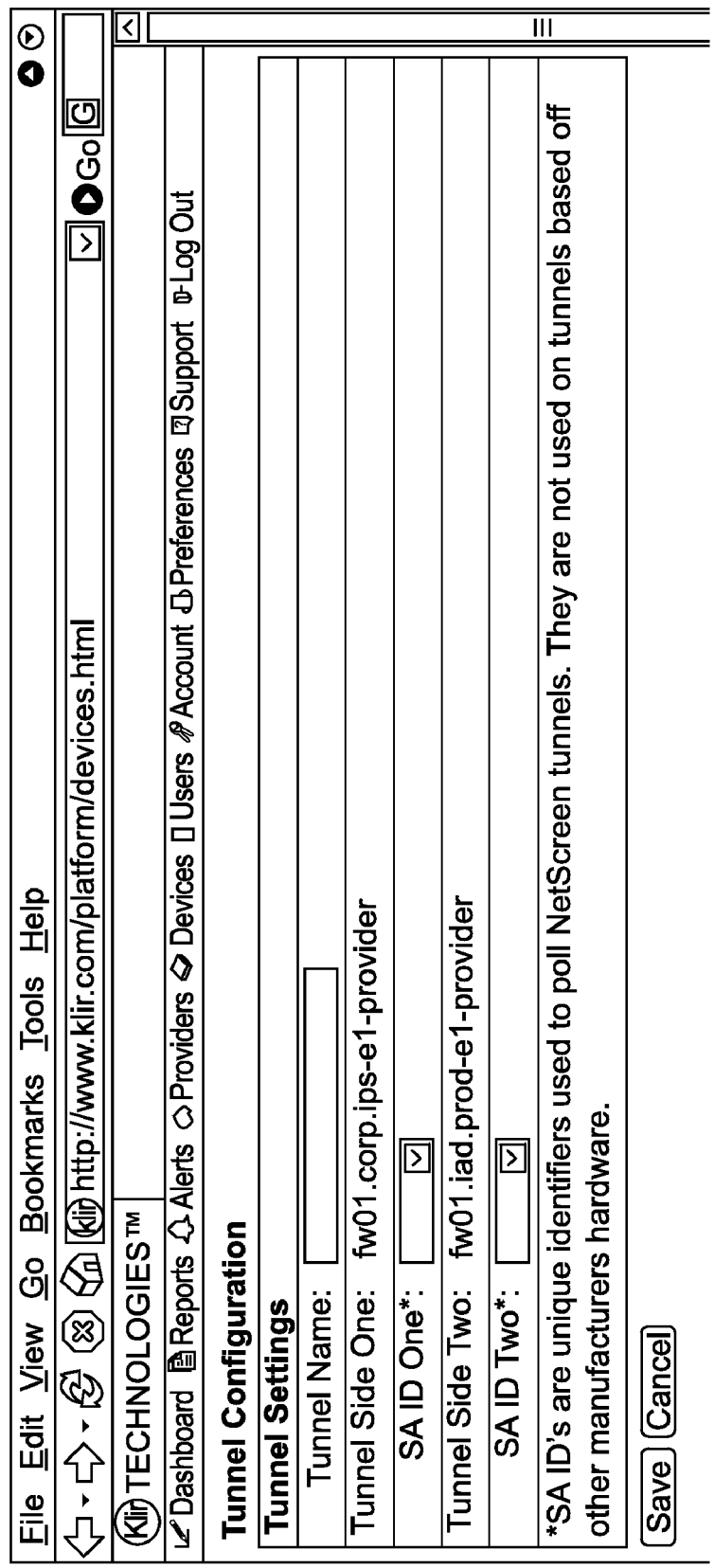
FIG. 24 is a GUI showing the Tunnel Configuration interface selected from the toolbar menu in an embodiment of the present invention.

With continuing reference to FIG. 11, in another embodiment of the invention, the dashboard includes one (1) to nine (9) cells that enable the user to select a Saved Report or Shared Report they wish to see from a drop-down box. Upon entry to the dashboard, each of the Saved Reports or Shared Reports are displayed. The user has the ability to select any report from the drop-down box to select which reports display in each of the displayed dashboard cells. If no report has been selected for a cell then "(Select Report)" is displayed as the selection in the report selector drop-down box for the dashboard cell. The user can choose the "Select Report" selection in the report selector drop-down box for a dashboard cell to have no report displayed for the cell (e.g. to clear a cell or set a blank cell). Upon selecting a Saved Report to view within a cell the report displays in the cell and the selected report will also be saved as the report to display in that cell on the users Dashboard going forward.

Drop-Down Box Contents

Figure 58:
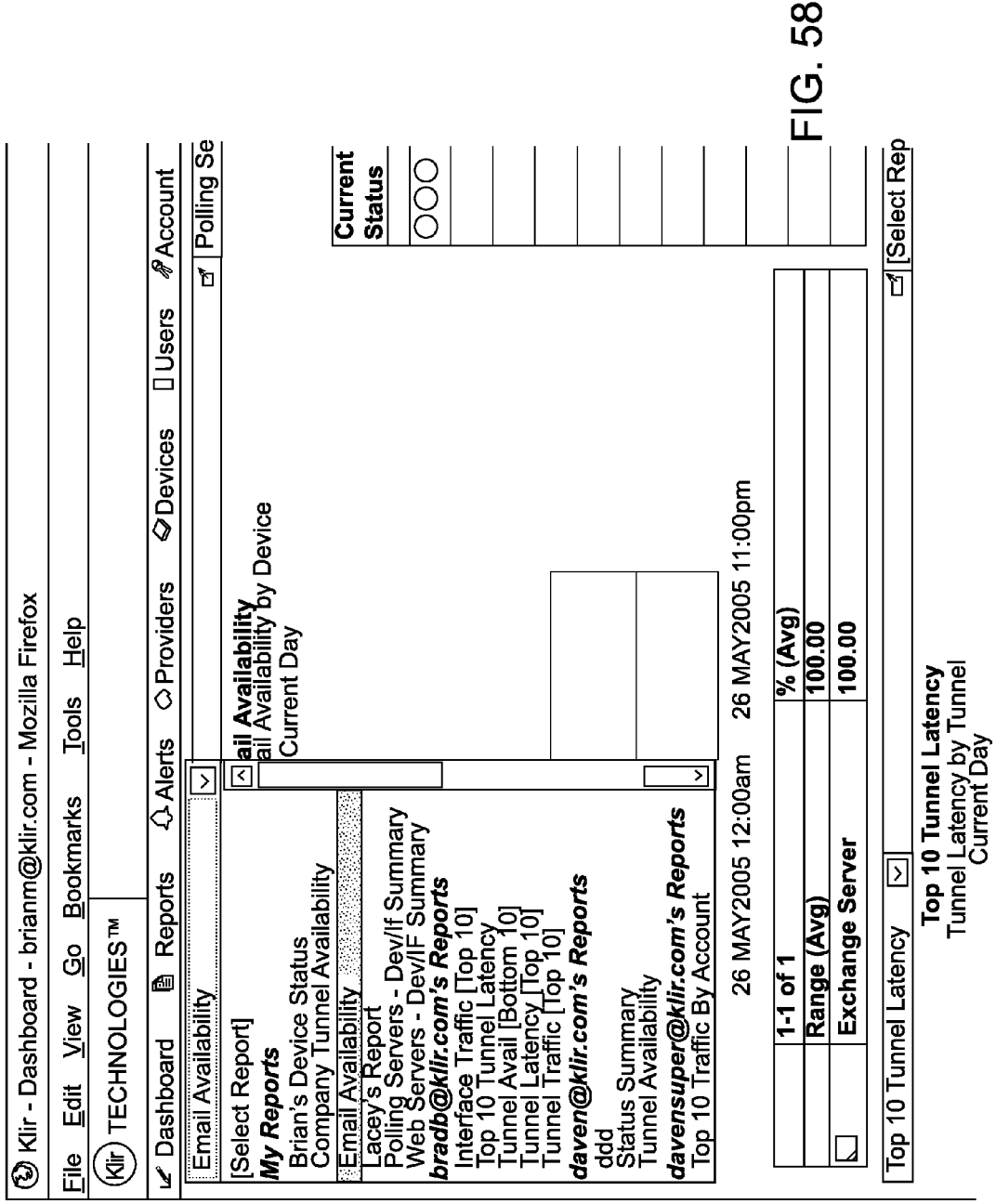
FIG. 58 is a screen display showing the Drop-down selector for Reports on the Dashboard GUI in an embodiment of the present invention.

Referring to FIG. 58, in another embodiment of the invention, the user's Saved Reports available in the drop-down box is created by the user from the Reporting interface and added to their "Saved Reports" list. The Saved Reports listed in the drop-down box is listed in alphabetical order for ease of reference. Shared Reports made "public" by other users will also be displayed in the drop-down box and available for selection in the Dashboard. See below for more detail about creating and saving reports, and sharing reports with other users.

Reduced Size Formats

Referring again to FIG. 11, in another embodiment of the invention, The Saved Reports and Shared Reports displayed in the dashboard will present reduced-formats of the Saved Report templates. In another embodiment of the invention, a user may select Large, Medium or Small reduced display formats in the individual Preferences for their dashboard configuration to accommodate a variety of screen sizes and resolutions. The parameters for the reduced-size format for each report are set for in Templates.

Drill-Down

If the user clicks on any individual Saved Report in the Dashboard view, a new window will open up with the full template view of the Saved Report selected. From the opened window, the user has the ability to continue to drill-down to finer detailed information; each selection will open a new window See Drill Down below for more detail.

Dashboard Refresh

Dashboard interface can auto-refresh. The Dashboard will refresh every 5 minutes (on the 4$^{th}$ minute after each polling cycle begins—e.g. on the H:M4 and H:M9 intervals since polling occurs on the H:M0 and H:M5 intervals). If a user goes to the Dashboard page within 30 seconds of a regularly scheduled refresh, then that next refresh is skipped to avoid refreshing the Dashboard page so soon after the user initially pulls it up; all subsequent refreshes will occur as normal.

Blank Dashboard

If a user does not have any saved reports that can be set to default display on their Dashboard, or if the user has not set any of their saved reports to default display on their Dashboard, then an instruction box above the dashboard should appear containing a set of instructions for how the user can create & save a report and then select it for display on their Dashboard.

Reports

Referring to FIG. 12, in another embodiment of the invention, Reporting interface facilitates creating and saving reports based on a set of standardized templates. The functionality of the Reporting interface provides a 'templates-metrics' driven reporting interface.

General Operation

With continuing reference to FIG. 12, in another embodiment of the invention, From the Reports interface, the user is presented with two options to view reports: (1) Create New Report; or (2) Saved Report(s). These two primary functions are arranged in the center of the interface, with the Tree View on the left hand side of the interface initially not displayed. The user selects either a single template under Create New Report, or a single report under Saved Reports.

Create New Report

With continuing reference to FIG. 12, in another embodiment of the invention, The Create New Report list contains a set of templates that may be applied to the Metrics Tree, Device Tree, and Group Criteria to create a new report. This template will expand as we continue to grow accordingly as we support new functionality and device metrics. Below the list of Templates is an indicator message (grayed out) that states "Select New Report Criteria." Upon selecting a toggle for a specific template, the indicator message below will change from gray to black, directing the user to "Select New Report Criteria" and the parameters tree section on the left will expand with the appropriate settings for that given template (e.g. the Metrics tree in the parameters section on the left only appears for the Metrics templates (Metrics Summary & Top-10/Bottom-10 Metrics Summaries).

Referring to FIG. 12, in another embodiment of the invention, A user selects a report template via a radio button to allow them to only select a single template at a time. The layout of the parameters tree section on the left adjusts based on the template selected. If a Saved Report was selected under the Saved Reports list, then any Create New Report template selection is cleared, the parameters tree section on the left will disappear, and the "Open, Edit, Settings, Delete" buttons underneath will re-enable.

Saved Report(s)

Referring to FIG. 13, in another embodiment of the invention, The Saved Report(s) section will contain a list of Saved Reports that were previously generated by the user and saved. The Saved Report(s) list displays the Report Name, Template, Date Saved, View Range, Frequency (for distribution), and Distribution (list for emailing). The list is arranged in alphabetical order by the Report Name given by the user. However, the table also enables the user to click on a column header and sort data (forward and reverse). Below the table, are buttons for "Open", "Edit", "Settings" and "Delete" for a Saved Report. See Reports figure.

Public Report(s)

Referring to FIG. 14, in another embodiment of the invention, The Public Report(s) section contains a list of Saved Reports that have been saved and shared out by other users within the account. The other users have granted read/copy access to these reports so that all users within their account have the ability to generate publicly-accessible reports individually as well as within the dashboard.

"Open" Saved Reports

Referring again to FIG. 13, in another embodiment of the invention, the user may click on the Report Name to open the report, or select a toggle then click the "Open" button below the table. The Saved Report opens new window sized smaller than the Reporting Interface, enabling the user to quickly select the information behind the report.

"Edit" Saved Reports

With continuing reference to FIG. 13, in another embodiment of the invention, the user clicks on a report name to edit a report, or select a toggle then click the "Edit" button below the table. The parameters of the saved report populate in the same window; the tree view is populated with information pertaining to the Saved Report (e.g. View Range, Template Name, Metrics, Devices/Connection/Location, and Group Criteria) and the report name is displayed at the top of the parameters section on the left above the template name. The user can then edit parameters (the template cannot be changed when editing a saved report) and click the "Update" button to save the changes or click the "Cancel" button to cancel changes. The user can click the "Generate Report" button after clicking "Update" to generate the report after editing it if they choose.

"Settings" or "Delete" Saved Reports

As shown in FIG. 13, in another embodiment of the invention, From the Saved Report(s) section, a user may choose to select "Settings" (not shown) or "Delete" for a report. If Settings is selected, the user is presented with a small window enabling the user to only edit the (1) Report Name, (2) change the Frequency of distribution, or (3) change the Distribution list for the report. If Delete is selected, the user is presented with a small window to confirm deletion (Delete report? Yes or No). Upon selecting Yes, the report is deleted from the list of Saved Reports. If the deleted report was a default on the Dashboard, then the user's default is nil (meaning the user has a blank-area on the Dashboard, and may set another default upon re-entering the Dashboard).

A user may not select multiple Saved Reports to open, edit, settings or delete. If another Saved Report was previously selected, selecting a different Saved Report will cause the other toggle to be deselected. If a Template was previously selected, then any Saved Report(s) selection is deselected, the indicator message will go gray under the Create New Report list and the parameters tree view on the left will disappear.

Tree View

Referring again to FIG. 12, in another embodiment of the invention, upon selecting a Template from the Create New Report list, the user selects parameters outlining the criteria for the report. If a Saved Report is opened, then the Tree View automatically populates with the relevant data for the selected report.

Template Name Display

With continuing reference to FIG. 12, in another embodiment of the invention, Upon selecting a specific Template under Create New Report, or upon selecting a Saved Report from the Saved Report(s) section, the name of the base Template appears in the top left hand corner of the left margin. This function provides a reference point, particularly for Saved Reports.

Metrics

In another embodiment of the invention, Metrics are arranged in folders pertaining to Device and Interface types (Device Metrics, Interface Metrics, Wireless Interface Metrics, Tunnel Metrics and VIP Metrics), the same way this is setup in the system today. The parameters tree view section on the left adjusts based on the template selected.

In other embodiments, the Metrics tree also includes:
1) The check-boxes changed to radio-buttons to allow the user to only select a single metric at a time; the check-box for the top level nodes in the tree (e.g. Device Metrics, Interface Metrics, etc) are not presented since more than one metric can no longer be selected.
2) Separate inbound/outbound metrics are not displayed in the tree; a combined total metric is displayed instead. For example, the computed Traffic metric is displayed under the Interface Metrics node of the tree instead of the two separate Inbound Traffic and Outbound Traffic metrics that displayed in other embodiments of the system.
3) The Availability metric under the Device node in the tree can be renamed to 'Device Availability.'

Metric Summary, Top 10 Metric Summary, Bottom 10 Metric Summary

Figure 31:
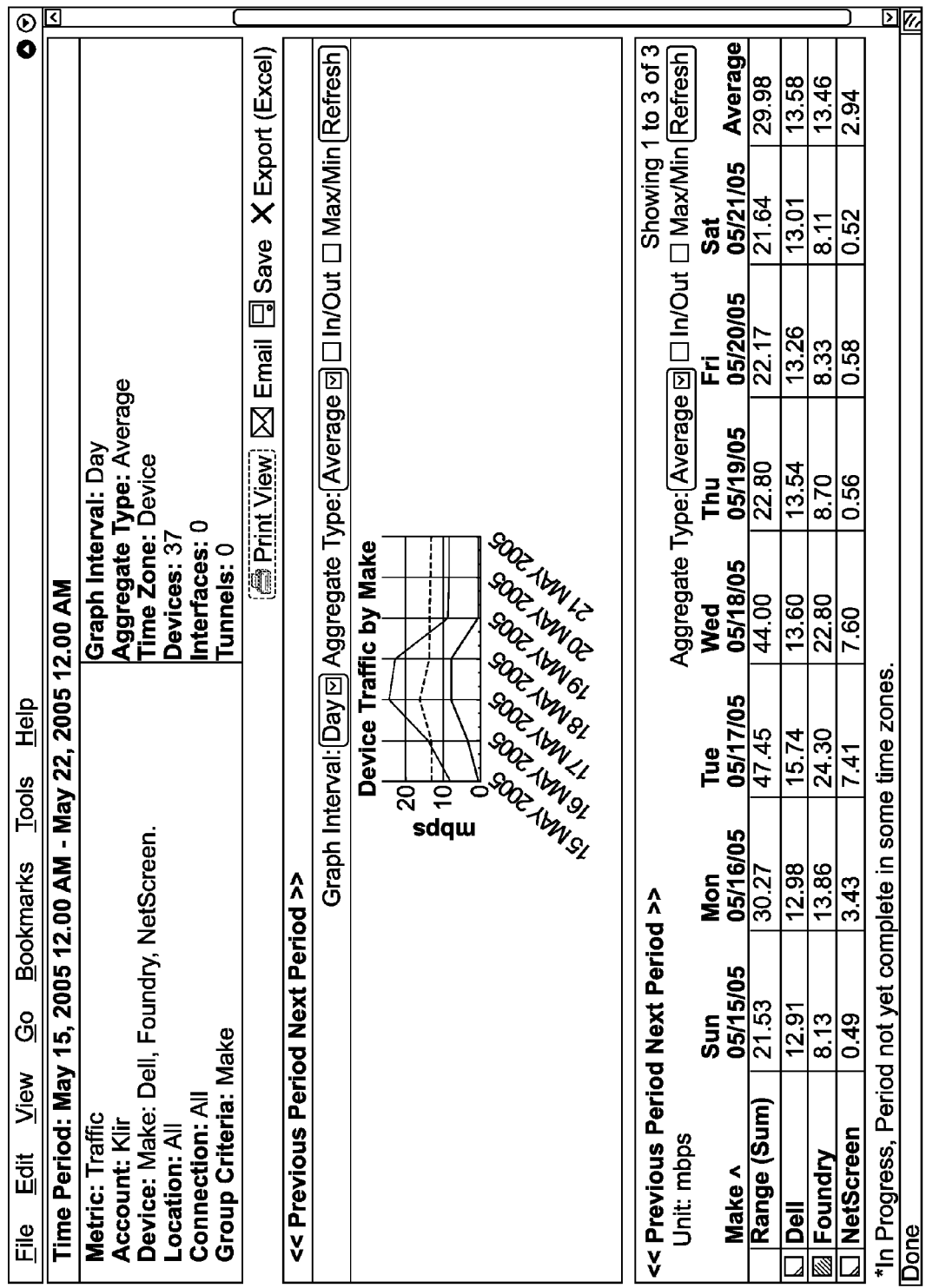
FIG. 31 is a screen display of a report utilizing the Metric Summary template to convey performance data for a single metric across multiple devices in an embodiment of the present invention.
Figure 32:
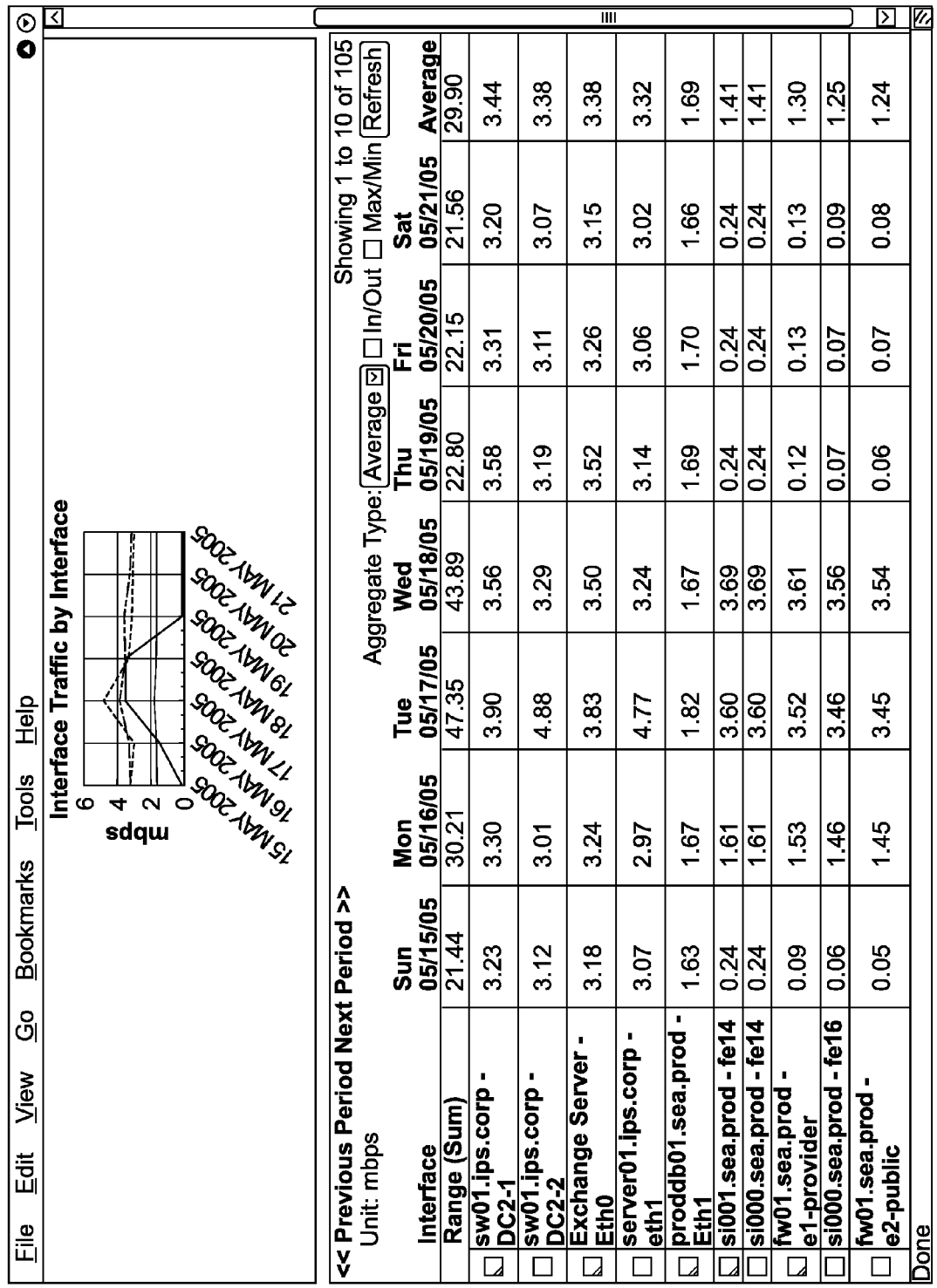
FIG. 32 is a screen display of a report utilizing the Top 10 Metric Summary template to convey performance data for a single metric across multiple devices arranged by the "top 10" group criteria as selected by the User in an embodiment of the present invention.
Figure 33:
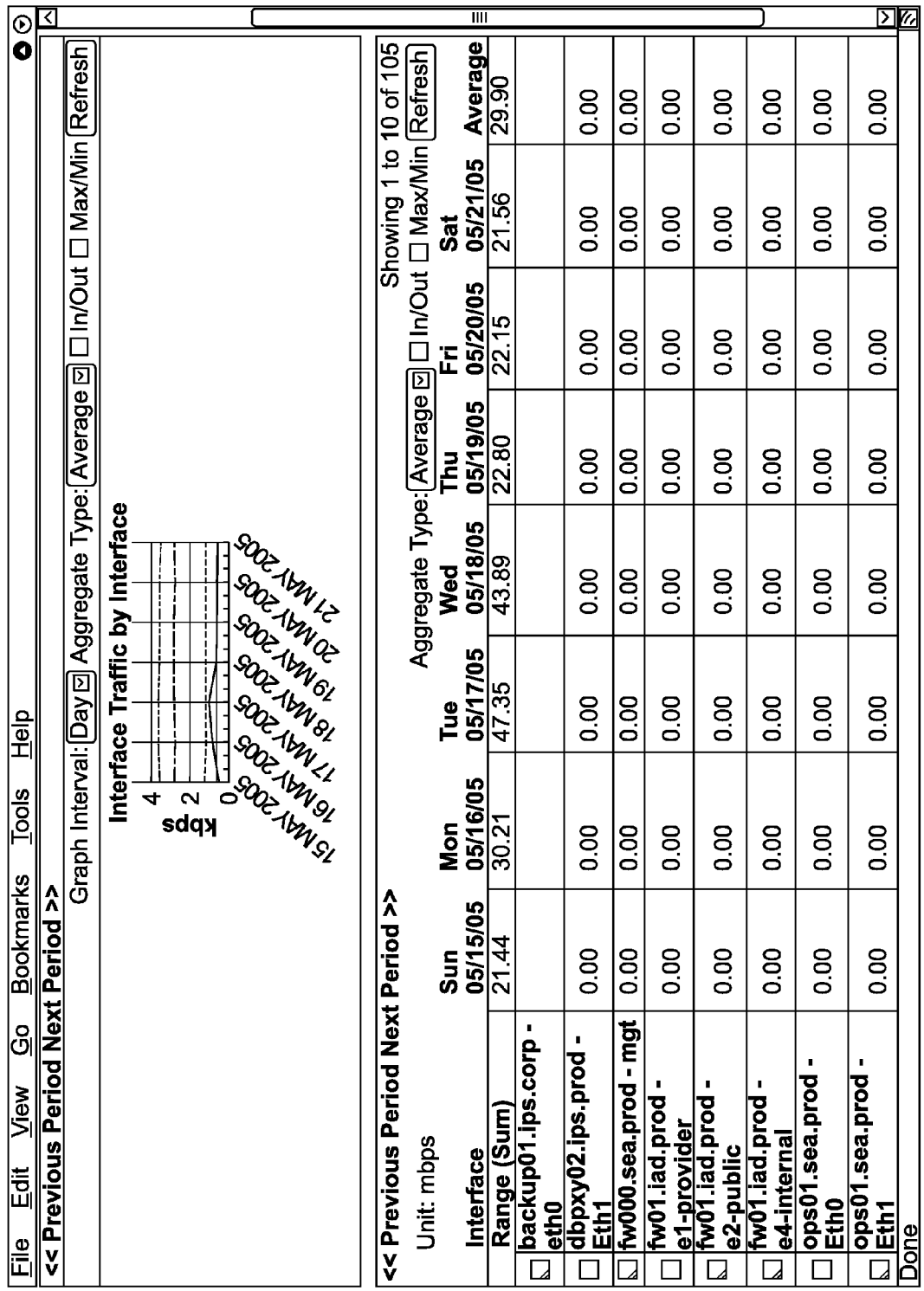
FIG. 33 is a screen display of a report utilizing the Bottom 10 Metric Summary template to convey performance data for a single metric across multiple devices arranged by the "bottom 10" group criteria as selected by the User in an embodiment of the present invention.

Referring to FIGS. 31, 32, and 33, in another embodiment of the invention, Metric Summary, Top 10 Metric Summary or Bottom 10 Metric Summary interfaces are shown. The user is presented with every available metric under each Device and Interface type, the same way the metrics tree is setup in the system today. For each Metric a unique and different report is created based on the respective template selected.

Device/Interface Summary

Referring to FIG. 34, in another embodiment of the invention, the Device/Interface Summary, does not present the user with the metrics tree since the template defines all of the metrics required for the report; the other parts of the parameters tree section (Device/Connection/Location tree and Group Criteria) on the left will still be presented to the user since they are still relevant to this template.

Status Summary

Figure 35:
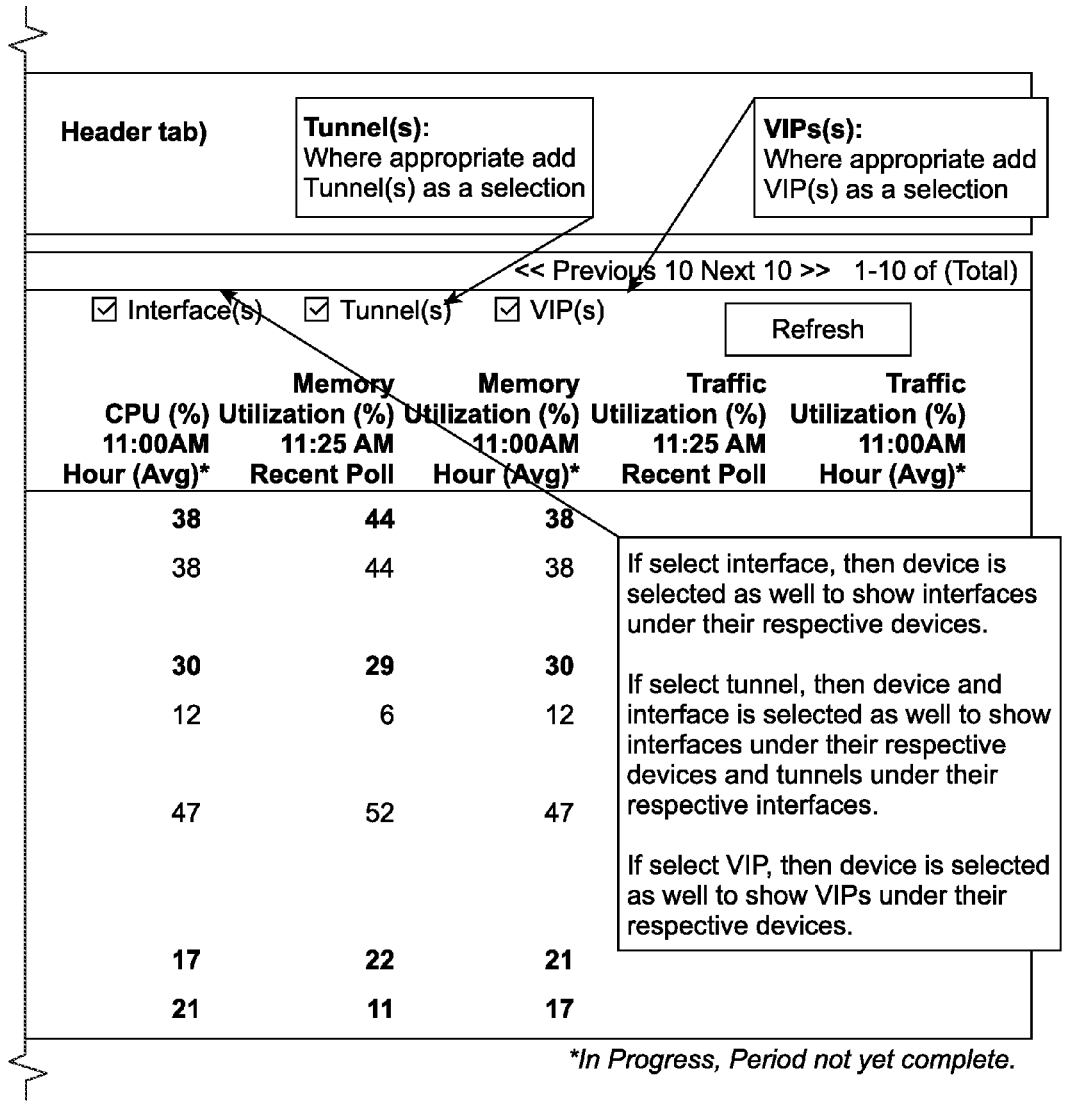
FIG. 35 is a screen display of a report utilizing the Status Summary template to convey summary real-time availability, central processor utilization (CPU), memory utilization, and traffic utilization across multiple devices in an embodiment of the present invention.

Referring to FIG. 35, in another embodiment of the invention, the Status Summary, does not present the user with the metrics tree since the template defines all of the metrics required for the report; the other parts of the parameters tree section (Device/Connection/Location tree and Group Criteria) on the left will still be presented to the user since they are still relevant to this template. All of the metric data is consolidated into a single report based on the Status Summary template for all Devices.

Alert Summary, KPI Summary, cKPI Summary, eKPI Summary

Figure 43:
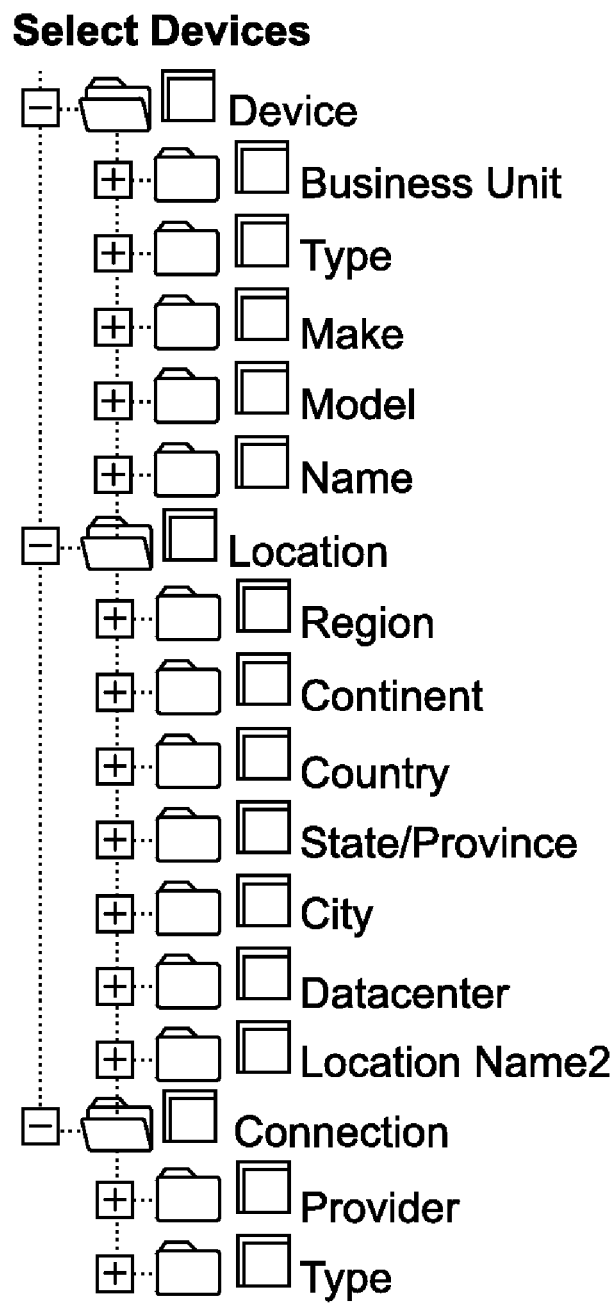
FIG. 43 is a screen display of Device Tree options that a user may select to limit data based on the attributes selected by the user in an embodiment of the present invention.
Figure 51:
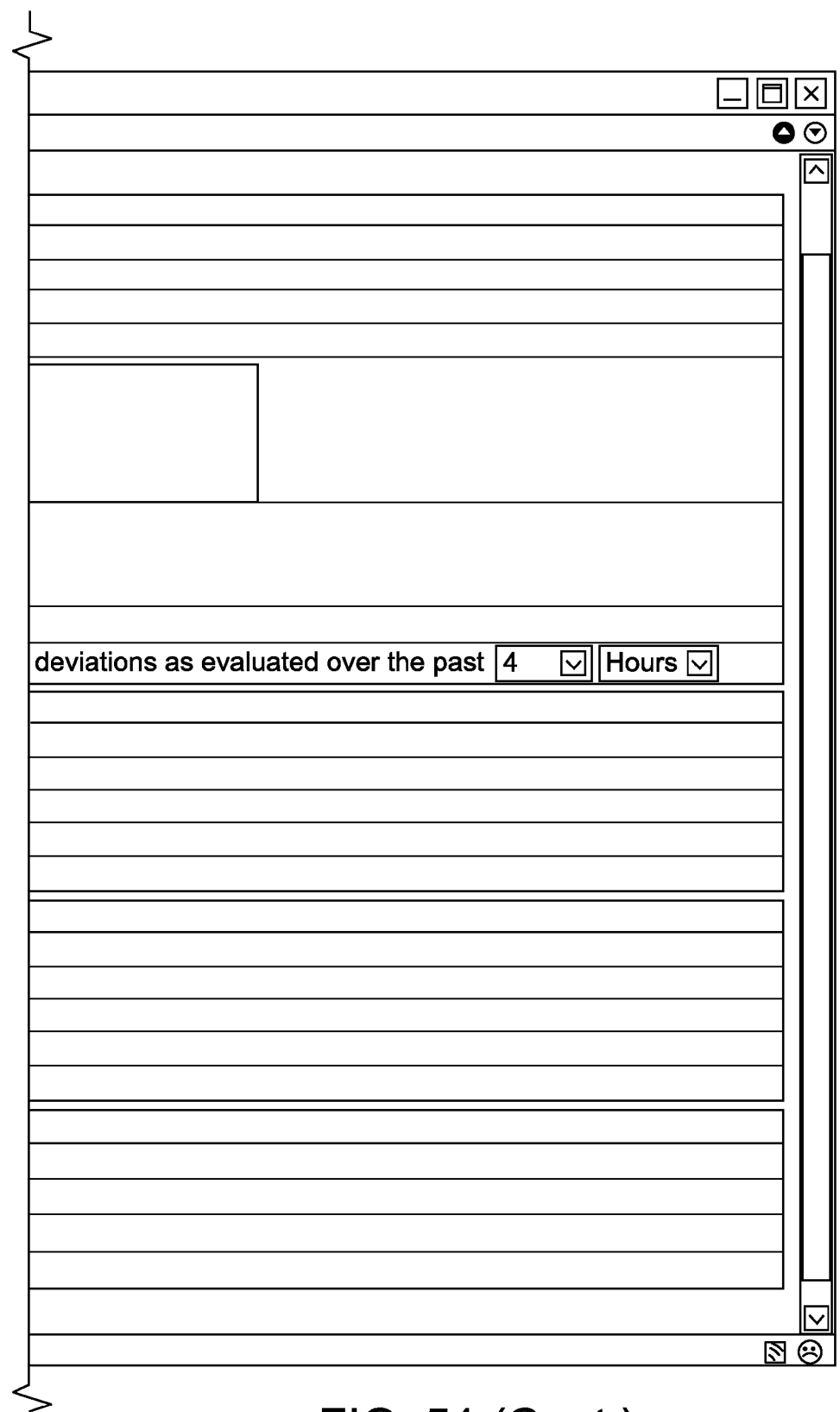
FIG. 51 is a screen display of a format of configuring primary, secondary and tertiary alert escalation of Alerts under the Configure Alert Settings GUI that a user may select to manage alerts in an embodiment of the present invention.

Referring to FIGS. 36-39, in another embodiment of the invention, Alert Summary (FIG. 36), KPI Summary (FIG. 39), cKPI Summary (FIG. 37) and eKPI Summary (FIG. 38) are shown. The user is not presented with the metrics tree in these views since the templates define all of the metrics required for the report; the other parts of the parameters tree section (Device/Connection/Location tree and Group Criteria) on the left are presented to the user since they are still relevant to this template Select Devices Referring to FIG. 43, in another embodiment of the invention, upon selecting a metric above (or if no metrics are required) the Device/Connection/Location tree is automatically populated with the relevant information based on the selected metric.

Devices/Connection/Location Tree

Group Criteria

Referring again to FIG. 12, in another embodiment of the invention, after selecting the (a) Template, (b) Metrics and (c) Device/Connection/Location parameters, the user may select (d) the Group Criteria by which to sort the data. The Group Criteria is a drop down box that will allow the user to determine how the information is organized and presented within the report structure. The Group Criteria includes a comprehensive list of every attribute retained by. As a result, the user is able sort report data based on any specific Group Criteria. The default Group Criteria selection is Device.

Group Criteria Selector and Device Tree Matrix

Referring to FIG. 40, in another embodiment of the invention, the values for the Group Criteria selector drop-down box are provide on the given user interfaces. An "x" in Table 1 below indicates Group Criteria attributes that do not apply for the given user interface:

TABLE 1

|  | Reports | Config | Alert Config - Device | Alert Config - Interface | Alert Config - Tunnel | Alert Config - VIP |
|---|---|---|---|---|---|---|
| Group Criteria |  |  |  |  |  |  |
| Account (Super User only) |  | x |  |  |  |  |
| Device |  |  |  |  |  |  |
| Device Type |  |  |  |  |  |  |
| Make |  |  |  |  |  |  |
| Model |  |  |  |  |  |  |
| Business Unit |  |  |  |  |  |  |
| Region |  |  |  |  |  |  |
| Continent |  |  |  |  |  |  |
| Country |  |  |  |  |  |  |
| State |  |  |  |  |  |  |
| City |  |  |  |  |  |  |
| Location Name 1 |  |  |  |  |  |  |
| Location Name 2 |  |  |  |  |  |  |
| Interface |  | x | x |  |  | x |
| VIP |  | x | x | x | x |  |
| Provider |  | x | x |  |  | x |
| Connection Type |  |  | x |  |  | x |
| Listed below are the values for the Device tree on the given user interfaces. |  |  |  |  |  |  |
| An x below indicates tree nodes that do not apply for the given user interface. |  |  |  |  |  |  |
| Device Tree |  |  |  |  | n/a |  |
| Account (Super-User only) |  | x |  |  |  |  |
| Device |  |  |  |  |  |  |
|   Business Unit |  |  |  |  |  |  |
|   Type |  |  |  |  |  |  |
|   Make |  |  |  |  |  |  |
|   Model |  |  |  |  |  |  |
|   Name |  |  |  |  |  |  |

TABLE 1-continued

| | |
|---|---|
| Location | |
|   Region | |
|   Continent | |
|   Country | |
|   State | |
|   City | |
|   Loc Name 1 | |
|   Loc Name 2 | |
| Connection | |
|   Provider | X |
|   Type | |

Display Options

Referring to FIGS. 41 and 42, in another embodiment of the invention, display options available to the user are Aggregate Type, Graph Interval and Time Zone.

Aggregate Type

Referring again to FIG. 12, in another embodiment of the invention, the aggregate type selections are Average and Sum. Average is the default selection for the user. Also, Sum will not appear as an option for metrics where Sum isn't valid (e.g. % Utilization metrics).

Graph Interval

In another embodiment of the invention, with reference to FIG. 81, the Time Standard and Custom View ranges provides a listing of option selections for Graph Interval.

Time Zone

Referring to FIG. 42, in another embodiment of the invention, The Time Zone selections are 'Device (local)' and 'User (GMT-8)'. Default selection is 'Device (local)'. 'Device (local)' is the only available option for graphs displaying Daily or Weekly aggregated data since those aggregations are based on Device (local) time.

Create Report

Referring to FIG. 12, in another embodiment of the invention, upon selecting the (a) Template, (b) Metrics and (c) Device/Connection/Location parameters, the user can then click the "Generate Report" button below to display the report (regardless of whether or not the user modifies the Group Criteria selection). The user uses the Generate Report button, which will automatically open a new window with a New Report based on the parameters selected by the user.

Report Structure

The report structure is based on the Templates set forth below in this specification.

Saving and Regular Emailing of Reports

Figure 70:
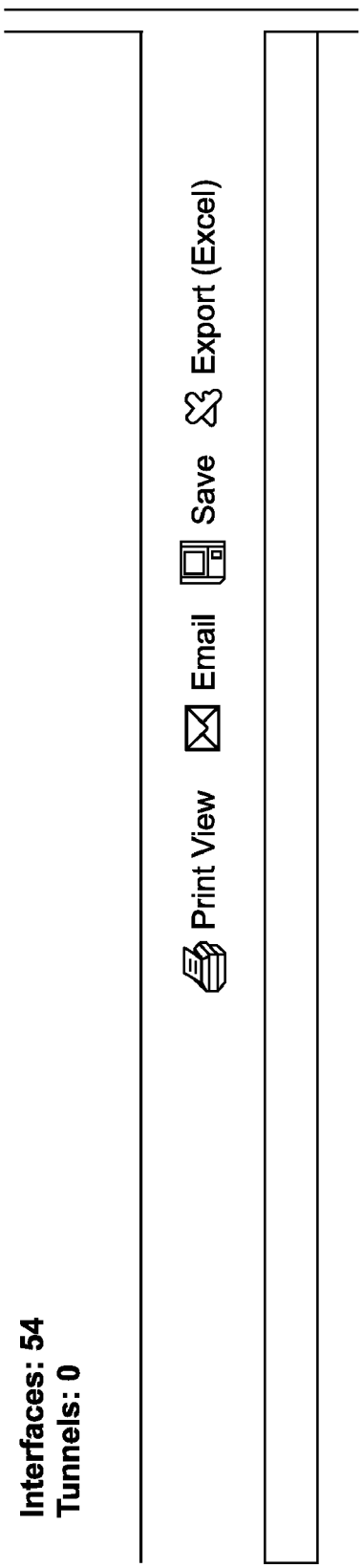
FIG. 70 is a screen display of the functions within a report in an embodiment of the present invention.

Referring to FIG. 70, in another embodiment of the invention, a set of Icons just below the report header presents the user with the ability to Print View, Save, Email, Export (Excel) a report. A new report created by a user may be saved via the save icon under the header. Only newly generated reports can be saved this way; the Edit button on the Reports UI must be used to edit previously saved reports and the save option is not valid once a user has drilled down into a newly generated report or navigated back and forth over time via Prev/Next Period. If Save is selected, the user is presented with a small Window requesting a "Report Name" (validation is performed to ensure 1) the user can't save the report with the same name as an existing report (a user's saved reports must all have unique names) and 2) the user doesn't leave the report name blank); the user may also enter a "Distribution" list for the report (email addresses) and the "Frequency" for delivery. The default "Frequency" selection is none, with the Distribution list field empty when this is selected. If the user chooses to have the report emailed to them by selecting a Frequency, then they is allowed to enter a Distribution for the report (we will perform validation to ensure 1) the user enters a Distribution of valid email address(es), 2) the string of email addresses is limited to 255 characters and 3) the user doesn't leave this entry blank after choosing a Frequency to have the report emailed).

Referring to FIG. 41, in another embodiment of the invention, The View Range for the report must be one of the following Standard View Ranges [Current|Previous] [Day|Week|Month] to be able to be setup for regular distribution (it doesn't make sense to have a report emailed to a user on a regular basis that wouldn't be changing if it has a Custom View range set with static from and to dates). Reports are, for example, emailed at Midnight of the latest time zone of all the devices across the Account to ensure that all polling has completed for any of the Account's devices that could be included in the report. For example, if an Account had devices in New York, Seattle and Hawaii, reports would be emailed at Midnight Hawaii time. If the report is not configured for a View Range of [Current|Previous] [Day|Week|Month] then the user will not be presented with the options to setup email Distribution and Frequency for the report. Saved reports with a Custom View Range from some static point X in the past to some static later point Y, also in the past, can be displayed in the Dashboard, although this graph will not be changing over time as the Dashboard updates itself. All that is required is "Report Name" to save the report. Report email distribution options remain Daily, Weekly and Monthly as it exists in the system today.

Alert Settings

Referring to FIG. 15, in another embodiment of the invention, an Alert Settings interface provides a list of Saved Alerts sortable by the configured information. The Alert Settings page will operate much the same as today (requiring minimal modifications). However, no Report data is included (given such information has been moved to the Reports interface).

The Saved Alert Settings page includes a table of existing Alerts, identifying the Alert Name, Group Criteria, Group Selection(s), Metric, Day(s), Time Frame, Threshold Type and Threshold (all terms defined below). The Alert Settings table is arranged in alphabetical order by Alert Name (default), but allows the user to sort (forward/reverse), the contents of the Alert table by clicking on the column header.

The Alert table includes a radio button selector along the left hand side of each Alert. At the bottom of the table, three (3) buttons are arranged from left to right: "Add", "Edit" and "Delete". If the user presses the "Add" button they will go to the Alert Configuration interface where they can create a new alert. See below. If the user clicks on an Alert row, or selects an Alert and then presses the "Edit" button, they will go to the Alert Configuration interface where they can edit the settings for the Alert. If the user selects an Alert and then presses "Delete", the user is presented with a pop-up window to confirm deletion. If affirmed, the selected Alert is deleted. Since the values in the Group Selection(s) and Threshold fields could potentially be much longer than is possible to show in the cell, the values is truncated if the values to be displayed are greater than the space available in the cell and ' . . . ' is added to the end to indicate the value has been truncated; the user is able to mouse-over these values and have a tool-tip display the full value for the cell.

Alert Configuration

Figure 16:
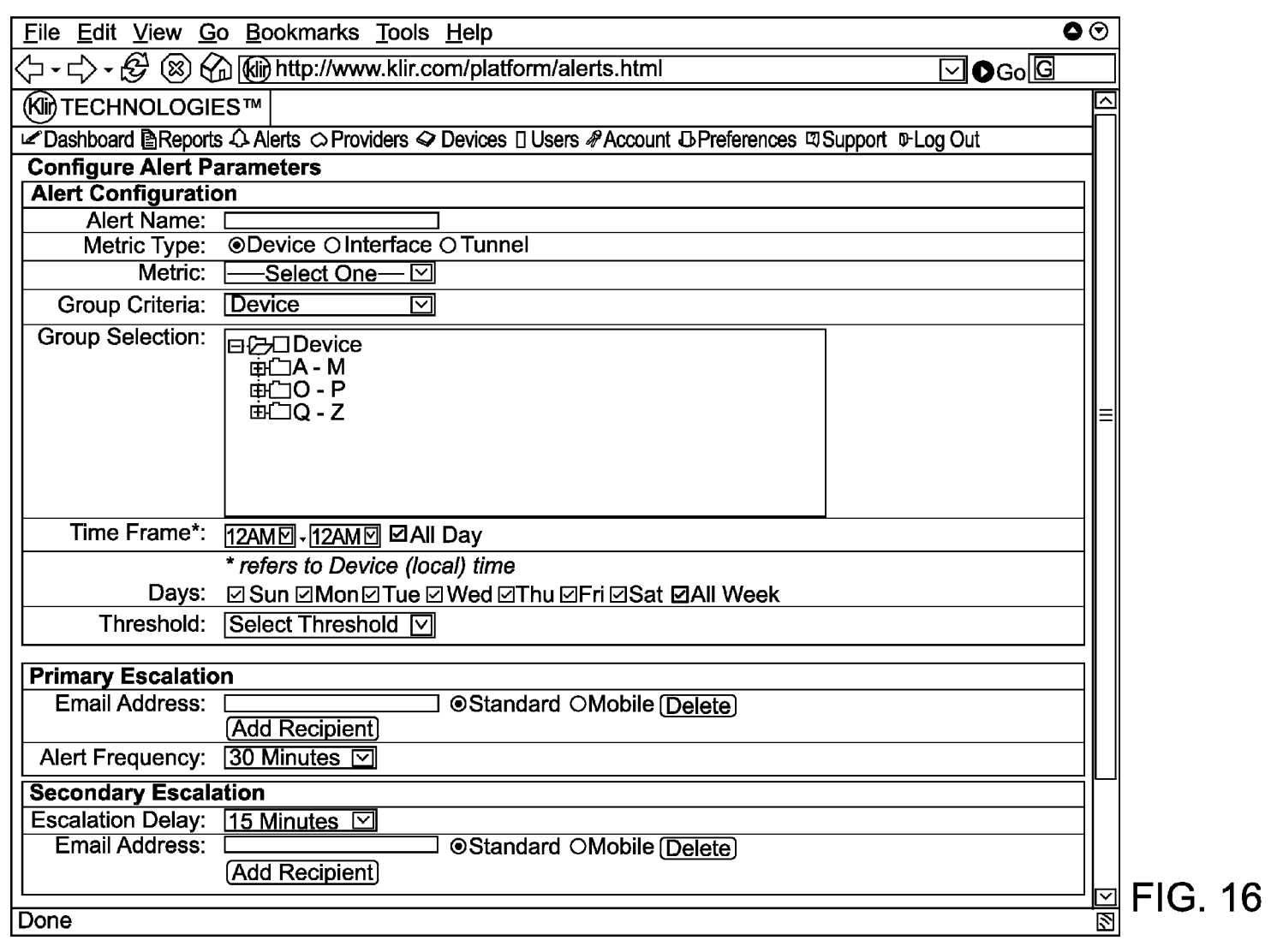

Referring to FIG. 16, in another embodiment of the invention, the user is presented with a Alert Configuration window to configure Alerts. The Alert Configuration window provides the user with the ability to select: (a) Alert Name, (b) Group Criteria, (c) Group Selection(s), (d) Metric, (e) Time Frame, (f) Day(s), (g) Threshold, and (h) Escalation recipients.

With continuing reference to FIG. 16, in another embodiment of the invention, The Alert Name is a free form text field. The Group Criteria is a drop down box with all the attributes listed (default is Device). Group Selection(s) is a multi-line selector with select-all check box below it that is automatically populated with the domain of values for the Group Criteria attribute selected (default is none selected). Metric is populated based on the metric attributes of the defined Group Criteria and Group Selection(s). The Time Frame allows the user to set the applicable times for the alert—same as current {default: All Day}. The Days field allows the user to select the applicable days of the week an alert will operate—same as current {default: All Week}. The Threshold field will present the user with a drop-down box listing the different types of Alerts: Cumulative, Standard Deviation, Static and Variable—same as current {no default}. Based on the selected Threshold, the user is automatically presented with unique variables to be selected by the user—same as current.

In another embodiment of the invention, upon completing the Threshold entries, the user enters Escalation recipient(s) (primary, secondary and tertiary), with delayed time frames between escalations. The user may enter one or more recipients for each level of alert distribution (we will perform validation to ensure 1) the user enters a Distribution of valid email address(es), 2) the string of email addresses is limited to 255 characters, 3) the user must enter a primary escalation email and/or mobile email, and 4) the user cannot enter a tertiary escalation email and/or mobile email without entering a secondary escalation email and/or mobile email. The escalation delay is modified slightly from how it works currently in the system. The escalation delay below tertiary is removed. The escalation delay between primary and secondary will indicate how long after the alert is initially triggered that the secondary escalation starts being notified. The primary escalation will always be alerted as soon as an alert is triggered. The escalation delay between secondary and tertiary will indicate how long after the alert starts going to secondary that the alert starts going to tertiary. Secondary/Tertiary escalation alerts are in addition to the lower level Primary/Secondary alerts (as opposed to replacing those lower level alerts as takes place in the system today). The domain of values the user can select for escalation timeframe is changed to minutes [5, 10, 15, . . . , 60] or hours [1-24] or days [1-7]; similar to the way threshold timeframes are selected for Cumulative, Variable and Standard Deviation alert in embodiments of the invention.

Group Criteria for Alerts

With continuing reference to FIG. 16, in another embodiment of the invention, the added the user has the ability to configure an alert based on Group Criteria. The alert applies to the Group Criteria selection(s). For example, if the user selects a Group Criteria of Connection Type and a Group Criteria Connection Type selection of T1, and then configures an alert for Throughput Utilization, the alert will apply to all of the individual interfaces with a T1 connection type. This allows the user to quickly and easily configure a single alert that applies to a group of devices, interfaces, tunnels or VIPs.

New Alert Metrics

In addition to supporting Alerts by Group Criteria, new Calculated Metrics (e.g. Throughput Utilization, Memory Utilization, Tunnel/Interface Utilization) can be supported in the Alert Configuration.

Alert Time Frame

In another embodiment of the invention, If the user selects a specific time frame and/or days that an alert are evaluated over, the day and time frame selected is in Device (local) time, not user time.

Form of Alert

The Alert Emails sent to the user when a threshold is triggered are based on the Metrics template in embodiments of the invention.

Email Header

The Alert Email is "Sent From" Support. The Date is the timestamp when Alert Email is sent. The Subject line will indicate {ERROR or OK}—{Alert Name}.

Email Format

The Email Alert is sent in an HTML-enhanced format in embodiments of the invention. At the top of the email, the user is presented with the {Alert Name}, {System Message} and {Date, TimeStamp}. Below, the user is presented a table outlining the scheduled Escalation recipients and the respective timestamps (if sent up the Escalation chain). See FIG. 16 shows the Escalation interface.

Dismiss or Snooze

The first Alert triggered will escalate (by default) to the primary escalation. Each sent alert includes the ability to "Dismiss" or "Snooze." If Dismiss is selected by the primary escalation recipient, it will halt all further alerts to the primary escalation for the Alert rule. If Dismiss is selected by the secondary escalation recipient, it will halt all further alerts to the secondary escalation for the Alert rule. If Dismiss is selected by the tertiary escalation recipient, it will halt all further alerts to the tertiary escalation for the Alert rule. If Snooze is selected by the primary escalation, alerts to the primary is suspended for the Snooze timeframe selected (15 minutes, 30 minutes (default for alerts evaluated off of 5 min data), 1 hour, 2 hours (default for alerts evaluated off of hourly aggregated data), 4 hours, 8 hours, 1 day, 2 days, or 7 days) before the Alert resumes; the same Snooze logic applies for secondary and tertiary alerts. Snooze timeframe pertains to when the user hits Snooze. Despite selecting Dismiss or Snooze, neither will impact the delivery of a Recovery message. A Recovery message will always be sent, regardless of whether Dismiss or Snooze has been selected at any point. Snooze and Dismiss buttons expire seven days after they are sent in the alert email.

Device Settings

Figure 19:
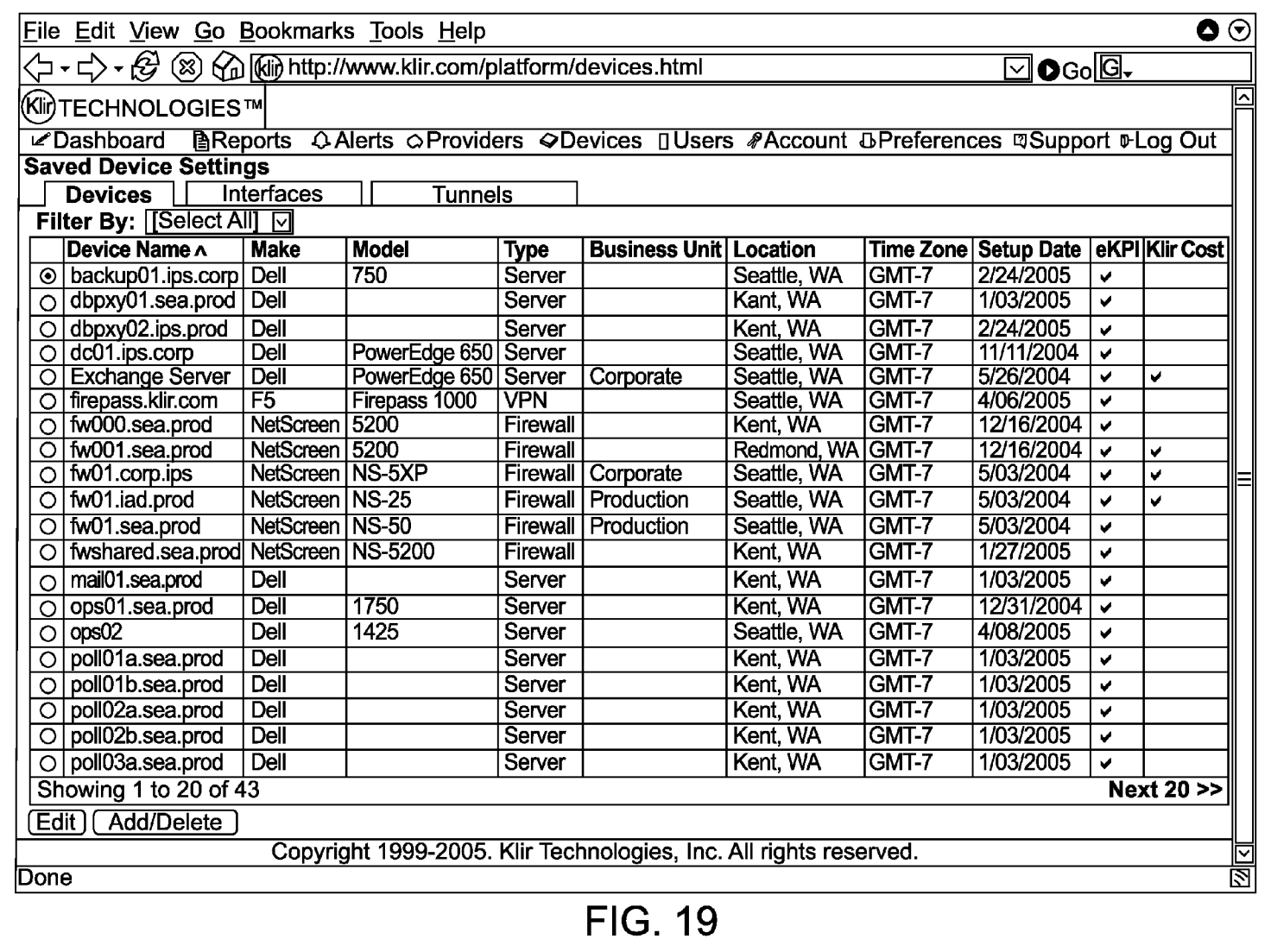

Referring to FIG. 19, in another embodiment of the invention, Device Settings interface is shown. Users with Admin and/or Finance permissions and Super-Users are intended to have access to the Device Settings interface. From the Device Settings interface a user manages all Device-related settings, including (a) device settings pertaining to the hardware; (b) interface settings pertaining to the device (for all types of interfaces: WAN, VPN, Wireless, VoIP); and (c) the eKPI target for equipment performance.

With continuing reference to FIG. 19, in another embodiment of the invention, the Device Settings table contains a radio button selector along the left hand side of each Device, Interface, Tunnel or VIP. At the bottom of the table, two (2) buttons is available: "Add/Delete" and "Edit". If a user selects the "Add/Delete" button for any specific Device, Interface, Tunnel or VIP the user goes to the Add/Delete screen (FIG. 82) where they can submit a request to have a device/interface/tunnel/VIP added or deleted; the request is sent via email to support@klir.com when the user clicks the "Submit Request" button. If the user clicks on a Device, Interface or Tunnel row, or selects a row via its radio button and then presses the "Edit" button, an Edit Device, Interface, Tunnel or VIP Configuration window will open. The user has the ability to edit any of the information populated, including the IP Address. If the user edits the IP address then they is presented with a warning message when pressing save and asking to confirm that they want to continue with the save or cancel.

Device Configuration

Referring to FIG. 20, in another embodiment of the invention, a Device Configuration window is shown when "Edit" is selected from the interface of FIG. 19. The Device Configuration window will present the user with the ability to modify: (a) Device, Interface or Tunnel Name, (b) Type, (c) eKPI Target (only if Device is selected), (d) IP Address (a warning is presented to the user when changing IP Address indicating that the change may impact monitoring and will ask the user to confirm that they wish to change the IP Address before proceeding) and (e) Cost™ data (only if Device is selected and the user has Finance permissions)—otherwise such information will not be visible.

Referring to FIG. 20, in another embodiment of the invention, The Device, Interface, Tunnel or VIP is a free form text field. The Type is a drop down box with pre-defined options. Device Type can be a free form field; but is also possible to be limited to the following domain values [Firewall, Load Balancer, Router, Server, Switch, VPN, Wireless, VoIP, Other]. The eKPI Target is a drop down box with values ranging from 0.05 to 1.00. Cost data is described further below.

Cost Equipment Costs (for Devices)

Referring to FIG. 71, in another embodiment of the invention, Device Configuration window provides Users with Admin/Full, Finance/Admin or Super-User rights the option of entering (a) Purchase Price or Lease Cost; (b) Maintenance contract price; and (c) Labor costs. The user has the ability to enter amount for any single Cost component (e.g. Labor costs only if they already own the equipment outright, and it is fully depreciated).

Purchase Price or Lease Cost

With continuing reference to FIG. 71, in another embodiment of the invention, the user has the option of entering the Procurement Date, the Procurement Method, and the corresponding Purchase Price (plus depreciation rate) or a Lease Cost. The Procurement Date is entered as a month and a year (MM/YYYY). The user is presented with a drop down box with either option Purchase or Lease (Purchase is default). Upon entering the Purchase Price, the user can select a depreciation rate of Straight-line or Accelerated (Straight-line is default). In embodiments, depreciation schedules are set forth in a spreadsheet below the Device Configuration table. If Lease is selected, the user is presented with a free form field to enter Monthly Lease Cost, and the Lease Duration (drop-down range: 12, 18, 24, 36, 48 and 60 months). If no Procurement Date is selected, the commencement of depreciation or the lease duration is based on the current date.

Maintenance Contract

In another embodiment of the invention, still referring to FIG. 71, the user has the option to enter the Contract Cost for a Maintenance Contract, Procurement Date and the Duration of the Contract. The value of the Contract Cost is a free form field. The initial default is for no maintenance contract to exist; in this case Procurement Date, Total Contract Cost and Contract Duration is NULL/Blank. If any one of these three values are set then validation is performed to ensure Total Contract Cost entered is a positive $$$ value, Contract Duration value is selected from one of the drop down values and a date is entered for Procurement Date (Procurement Date must be entered as a month and a year (MM/YYYY)). To clear a Maintenance Contract entry the user has to reset all three values to NULL/Blank. The duration is a drop-down box with values of 12, 18, 24, 36, 48 and 60 months. The cost of the Contract Cost can then be calculated by dividing the cost by the duration, adjusted to a monthly basis.

Labor

In another embodiment of the invention, as shown in FIG. 71, the user has the option of entering the monthly labor hours and hourly labor rate to support a device; each is validated to ensure the user enters a positive number.

Provider Settings

Referring to FIG. 17, in another embodiment of the invention, Provider Settings interface allows Users with Admin and/or Finance permissions and Super-Users access to manage all Provider-related settings, including (a) creating Provider accounts, (b) Provider settings pertaining to the accounts; (c) interfaces associated with the Provider accounts, and (d) the cKPI targets relating to Provider performance. The table includes a list of all Provider Settings in alphabetical order by Provider Account (default). The data in the table is sortable (forward/reverse) by clicking on each column header in the table.

In another embodiment of the invention, The Provider Settings table contains toggles along the left hand side of each Provider Account and each interface thereunder. At the bottom of the table, three (3) buttons is arranged from left to right: "Add", "Edit" and "Delete". If the user selects the "Add" button, a new Provider Account Config window will open, allowing the user to create a new Provider Account. See below. If the user selects a Provider Account and then selects the "Edit" button, the Provider Account will open a new Provider Accounts Config window automatically populating the Provider Account parameters. If the user toggles a Provider Account then selects "Delete", the user is presented with a pop-up window to confirm deletion. If affirmed, the selected Provider Account is deleted. A user may only modify the interfaces (Edit or Delete) by selecting the parent Provider Account.

Provider Account Configuration

Figure 18:
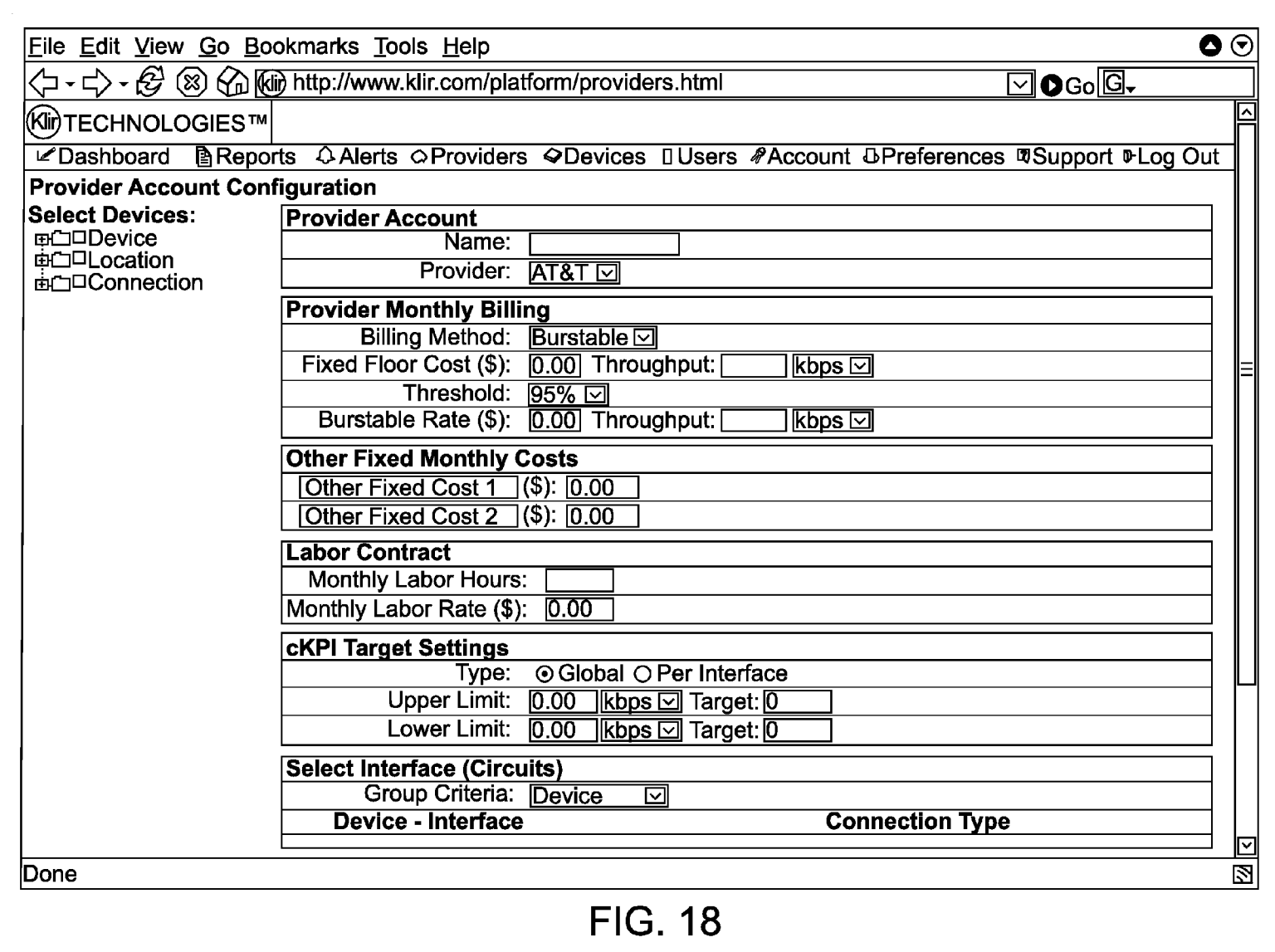

Referring to FIG. 18, in another embodiment of the invention, a Provider Configuration window allows a user to add a new Provider Account or editing an existing Provider Account. The Provider Account Configuration window presents the user with the ability to view the: (a) Provider Account Name, (b) Provider, (c) Group Criteria, (d) cKPI Target (Global or Per Interface), and (e) cKPI Targets Low and High.

In another embodiment of the invention, the user can enter a Provider Account Name in free form text, select the Provider and Group Criteria from drop-down boxes and select interfaces (all, or multiple individual interfaces). The cKPI Targets Low and High are calculated (independently) based on the selected Billing Method and associated targets input by the user. A "Global" cKPI Target can be set for the Provider Account, applies the target to all of the interfaces included in the Provider Account, or cKPI Targets can be set 'Per Interface' which would allow a unique cKPI Target to be set for each interface in the Provider Account.

With continuing reference to FIG. 18, in another embodiment of the invention, Provider Account Configuration window pre-populates with all the appropriate information. If the user makes changes, the user simply selects the "Save" at the bottom of the window to update the account.

A Provider Account is a scenario where the data for each of the selected interfaces are calculated independently but applied to a negotiated Provider Account and Billing Method (burstable, variable or cumulative). For instance, a user may have 15 separate branch offices, each with a separate T3. The calculation of the Billing Methods is applied to each T3 individually (based on Independent performance), but then summed together in a single bill.

Cost Billing Methods (for Providers)

In another embodiment of the invention shown in FIG. 18, includes authorized Cost Users wherein the Provider Account Configuration window provides the user with the option of configuring (a) Billing Method, (b) Other Fixed Monthly Costs; and (c) Labor Costs. Burstable, Variable and Cumulative Billing Methods The user has the option of selecting one of three monthly Billing methods: Burstable, Variable or Cumulative (at this time quarterly billing is eliminated). The user may only select one Billing Method Type (radio buttons). Burstable and Cumulative billing methods will continue to operate the same. Variable billing is slightly modified to eliminate variables of scaled pricing as volume increases.

Target Throughput Upper Limit and Lower Limit

Still referring to FIG. 18, in another embodiment of the invention, an additional variable is receive from each user called Throughput Target, with an Upper Limit and Lower Limit. These targets is utilized to calculate the cKPI Targets. A user will not typically be allowed to Save Settings for the Cost data without entering Throughput Targets.

Calculating the cKPI

In another embodiment of the invention, the cKPI Targets are calculated based on the Throughput Targets input by the user, normalizing the average of High and Low to a scale of 1.0. Utilize the following equations:

$$cKPI\ Low = Lower\ Limit/Average\ of\ Upper\ Limit\ \&\ Lower\ Limit$$

$$cKPI\ High = Upper\ Limit/Average\ of\ Upper\ Limit\ \&\ Lower\ Limit$$

For instance, if the user has set a Lower limit of 6 mbps, and an Upper limit of 10 mbps, the values would be as follows:

$$cKPI\ Low: 6/((6+10)/2) = 0.75$$

$$cKPI\ High: 10/((6+10)/2) = 1.25$$

Other Fixed Monthly Costs

In another embodiment of the invention, shown in FIG. 18, the user has the option to enter two Other Fixed Monthly Costs—Custom Names for the Provider Account, and costs. The Names are a free form text box. The Cost is a free form text box (validate as a positive number).

Labor

In another embodiment of the invention, the user has the option of entering the monthly hours and hourly labor rate to support an Provider Account. The number of monthly hours is a free form text box (validate as a positive number). The labor rates are a free form text box (validate as a positive number).

Users

Only Users with Admin and/or Finance permissions have access to the Users interfaces. The user interface includes a table displaying all Users for a particular account. The table includes a list of all Users in alphabetical order (default), with separate columns for Finance Rights, Admin Rights, Time Zone, Saved Reports (#) and Saved Alerts (#). The data in the table is sortable (forward/reverse) by clicking on each column header in the table. The Users table will contain a radio button selector along the left hand side. At the bottom of the table, three (3) buttons is arranged from left to right: "Add", "Edit" and "Delete". Refer to subsequent discussion of user permissions.

User Deletes

When deleting a user, a pop-up window to confirm deletion is presented. If affirmed, the selected user is deleted. Validation is performed to prevent a user from deleting their account.

Account Settings

Figure 27:
FIG. 27 is a GUI showing the Configure Account Parameters interface selected from the toolbar menu in an embodiment of the present invention.

Referring to FIG. 27, in another embodiment of the invention, Only Users with Admin and/or Finance permissions and Super-Users have access to the Account Settings interface.

The Account Summary includes summaries of pertinent account information, including Account Name, Contract Date, Expiration Date, Number of Users, Number of Saved Reports, Number of Saved Alerts, Number of Devices, Number of Interfaces, and Number of Tunnels. The sum data for the Account is all inclusive (not limited to the specific Admin/Finance user), such that tallies for the entire account are shown. Account Global Preferences is also included on the Account Settings Page.

Preferences

Figure 28:
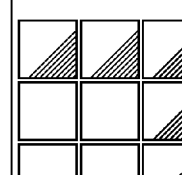
FIG. 28 is a GUI showing the Preferences interface selected from the toolbar menu in an embodiment of the present invention.

Referring to FIG. 28, in another embodiment of the invention, the Preferences interface will remain fairly consistent with how it currently exists in the system. When the user clicks 'Save' button the preferences is saved and the user is taken back to the Dashboard interface. When the user clicks 'Cancel' the page will revert back the original preferences and will cancel any preference changes the user may have made prior to clicking 'Save'. The following preferences is included on this page:

(Dashboard Refresh (On/Off)

Dashboard Layout to allow the user to change the layout of their dashboard from 1-3 rows and 1-3 columns (the default for all users is 2 rows by 2 columns).

Grid Lines, X-Axis and Y-Axis (On/Off)

Plot Watermarks (On/Off)

Graph Size (Small, Medium, Large, Extra-Large)

User Time Zone

Password Reset (Current Password, New Password, Confirm New Password)

Support

Referring to FIG. 29, in another embodiment of the invention, the Support section provides a pop-out to a new browser window to save screen space when viewing support content. The text throughout the Support section provides "Help" and assistance to the user.

Login/Log Out

Figure 30:
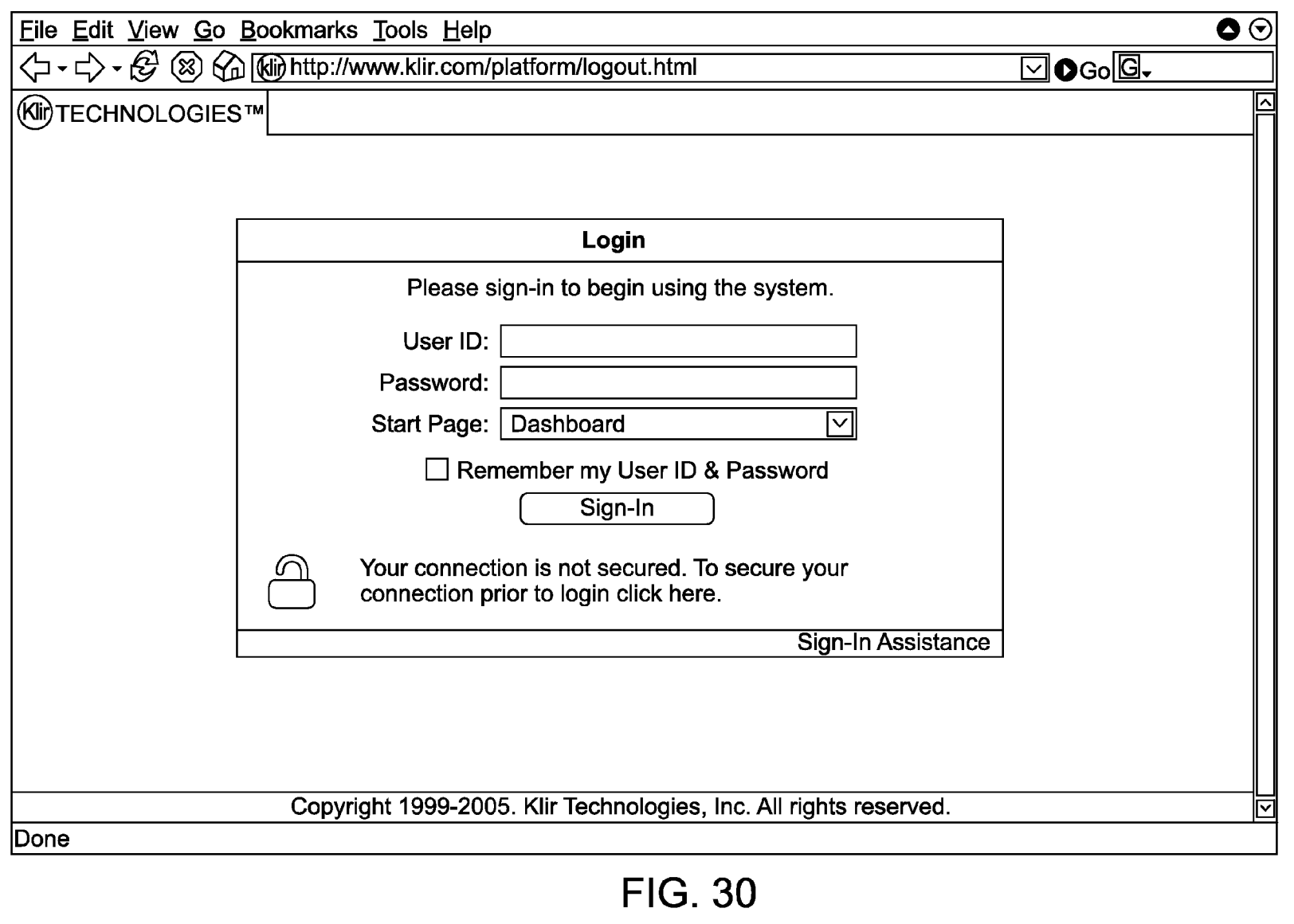

Referring to FIG. 30, in another embodiment of the invention, a Login screen is shown. In other embodiments a Log Out button is provided (not shown); and logins will not expire and a user will only be logged out if they select the log out button. If the Internet Browser remains open, the user session will remain active and continue to refresh the Dashboard every 5 minutes (on the $4^{th}$ minute after each polling cycle begins—e.g. on the H:M4 and H:M9 intervals since polling occurs on the H:M0 and H:M5 intervals), given that a NOC user may open the Platform and make it available indefinitely to their Operations team (in which case a time-out would be frustrating). A "Remember my ID & Password" checkbox may be provided in the login screen (default is unchecked). If the user selects this checkbox when logging in then their login will not expire (the same way logins currently do not expire in the system). If the user logs in without this option selected then their login will expire after 30 minutes of no activity on the site (Dashboard refreshes constitute activity on the site for the user which would reset the 30 minute expiration count down).

Report Conventions

Header

Referring to FIG. 35 (top), in another embodiment of the invention, all reports, alerts and notification can use a Standard Header. This format is used for all auto-generated reports delivered by email.

Standard Header

All Standard Headers can be equitably distributed in two columns.

Dashboard Headers

Referring to FIG. 11, in another embodiment of the invention, Each Dashboard view includes display abbreviated information to the user regarding the Saved Report.

Report Name, Date Prepared, Template

Referring to FIG. 35 (top), in another embodiment of the invention, Above the Header table, the user is presented with the Report Name, Date Prepared and Template. The Report Name is the Name saved by the user. If the user has not Saved the Report, then the Name is {Group Criteria} {Metric} {Time Period}. The Report Name is clear and legible (at least 14 pt. Bold); the Date Prepared includes the Date, Time Stamp and Time Zone of the user (at least 12 pt. Bold); the Template displays the base Template used to create the report (obscure, suggest 10 pt. regular font or smaller).

Time Period

Referring to another embodiment of the invention, The Time Period sets forth the time frame selected by the user, identifying the selected range {Hour, Eight Hour, Day, Week, Month, Quarter, Year or Custom}, and the dates and hours of the report. Dates are displayed in English format—{Jan. 14, 2004}. If the range includes the current date, it is displayed as {Current} {Time Period range}, {Dates}, {Hour}. For example, Current Week, Jan. 18, 2004-Jan. 23, 2004, 12:00 AM-09:55 PM.

Account

The Account list the Account Name. For Super-Accounts, the Account may list multiple Account Names.

Device, Location and Connection

With continuing reference to FIG. 35, in another embodiment of the invention, the Device, Location and Connection field displays the lowest attribute name. If multiple items are selected in a particular attribute, then the name of the attribute items is displayed (e.g. if State is selected, but the user selects three individual states—ID, OR, WA—then those names is displayed). However, the attribute items is limited to 2 lines (wrapped). If the Device, Location or Connection attribute items exceed 2 lines, then the number of items will quantified and displayed with the attribute {#} {Attribute} (e.g. if State is selected, but the user select 37 individual states, then the number and attribute is display as follows—{37 States}).

Metric

The Metric field displays the specific metric selected by the user.

Time Zone

The Time Zone displays the time zone selected by the user, either the default value "Device (local)", or "User (GMT-#)". If the user select his/her own time zone, the Header will reflect the user's preference, time zone and GMT adjustment (e.g. "User (GMT-#)").

Group Criteria, Graph Interval, Aggregate Type

Referring to FIG. 31 (top), in another embodiment of the invention, Group Criteria, Graph Interval and Aggregate Type displays the selection of the user. The Group Criteria may be any one of the Device, Location or Connection attributes selected by the user from a drop-down box on the Reports interface. The values for Graph Interval are based on the Time Period selected by the user and is automatically populated in a drop-down box on the Reports interface. A selection interface for Graph Intervals is shown in FIG. 14. The Aggregate Type is limited to "Average (default)" and "Sum" per the selection of the user from a drop-down box on the Reports interface.

Device(s), Interface(s), Tunnel(s)

Referring to FIG. 35, in another embodiment of the invention, the Device(s), Interface(s) and Tunnel(s) fields quantify the number of items in the particular range selected by the user, and then present the number in the Header accordingly.

Graphs

Each report includes two graphs that depict the information selected by the user. Notwithstanding specific exceptions set forth in Templates, the default graphs are a Pie Graph (summary) and a Line Graph (time-series data). In some instances a Gauge is utilized instead of a Pie Graph, depending on the type of Metric and the specific Template. See Templates for specific requirements of each Template.

Pie Chart

Figure 74:
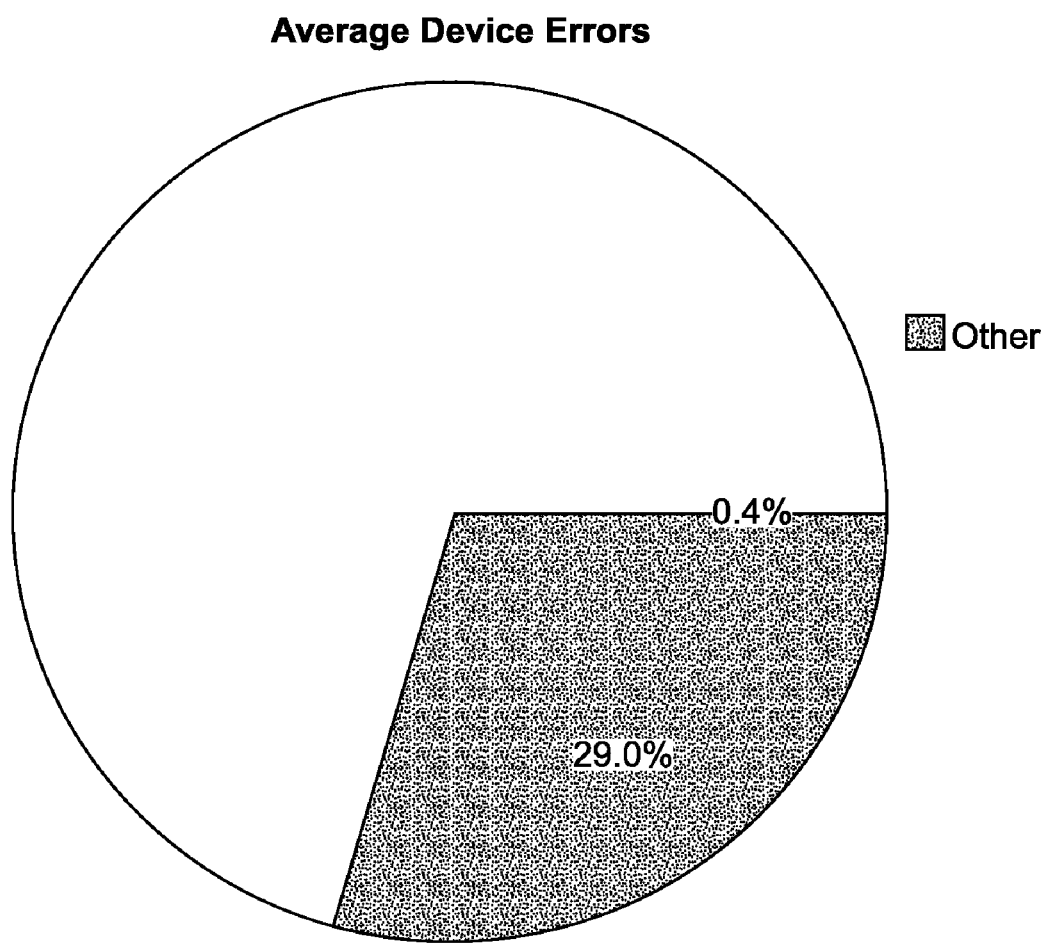
FIG. 74 is a screen display of a plotted pie chart within a report in an embodiment of the present invention.

Referring to FIG. 74, in another embodiment of the invention, a Pie Graph is located just below the Header, including Group Criteria summary information based on the selected Time Period and Aggregate Type. For instance if the user selects the Throughput {Metric} Average {Aggregate Type} by Business Unit for a week {Time Period}, then the Pie Chart would display the Average Throughput (total) for the entire Week (FIG. 19). Only items that are 5% or more of the total is shown in the pie chart. All items below 5% of the total is lumped together into an "Other" category in the pie chart; if the "Other" category only contains one item then the value for that item is displayed instead of changing the label to "Other." If no item is 5% or more of the total then the pie chart will not be shown. If there is only one item then the pie chart will also not be shown.

Pie Chart Title

The Pie Chart title reflects the information presented. {Aggregate Type} {Group Criteria} {Metric}. Examples include 'Average Business Unit Thoughput', 'Average Device Errors' and 'Sum Device Discards'.

Pie Chart Legend

The Pie Chart has a legend located to the right of the Pie chart and contains up to all 20 Group Criteria (in alphabetical order).

Gauges

Figure 72:
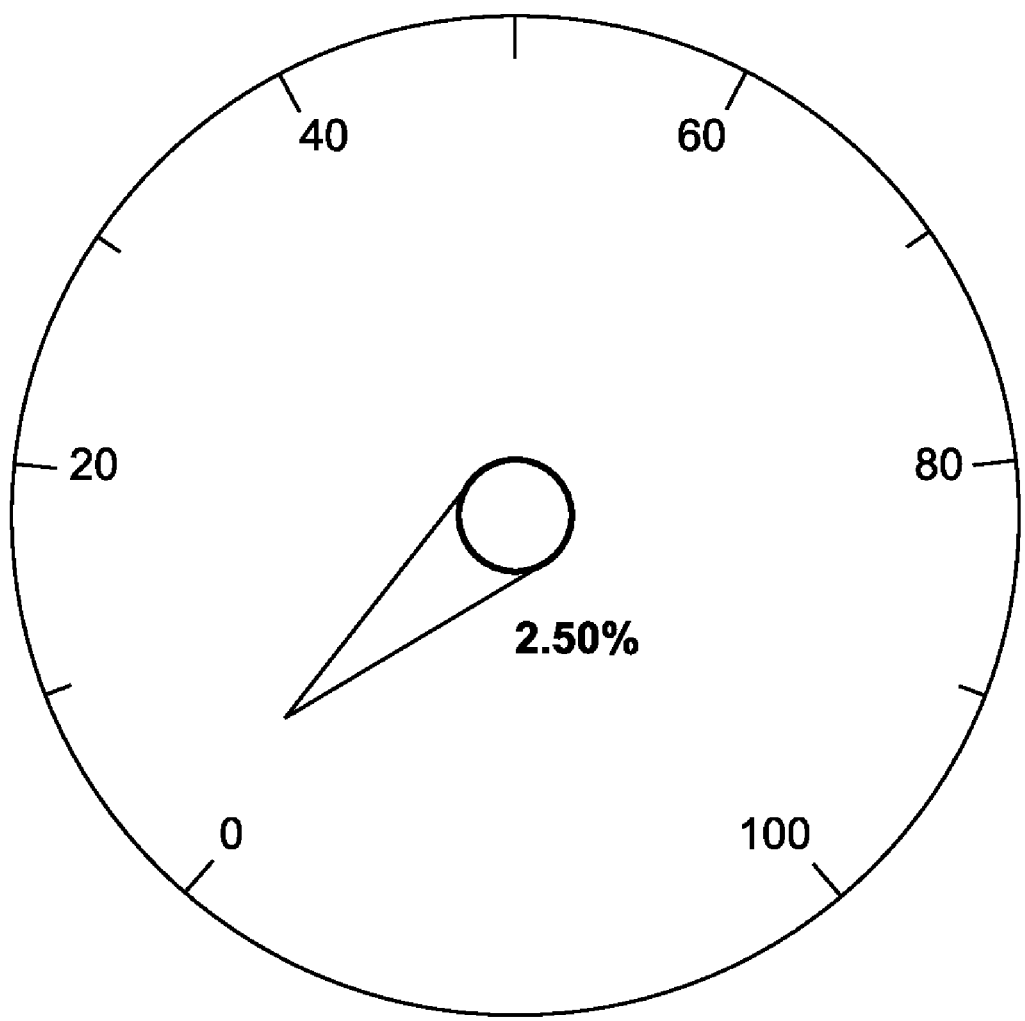
FIG. 72 is a screen display of a plotted gauge within a report in an embodiment of the present invention.

Referring to FIG. 72, in another embodiment of the invention, Gauges may replace a Pie Graph when the metric selected by the user is a percentage value, regardless of the type of Group Criteria. For instance, if the user selects the CPU {Metric} Average {Aggregate Type} by Business Unit for a week {Time Period}, then the Gauge would display the Combined Average CPU utilization for the entire Week for all selected Business Units combined. The Gauge is NOT limited to a maximum number based on Group Criteria (unlike the Pie Chart). Similarly, no legend is required for a Gauge.

Gauge Title

The Gauge has a title that reflects the information presented. The Title will always indicated "Combined" at the beginning of the title. The format is "Combined" {Group Criteria} {Metric}. Examples include 'Combined Business Unit CPU %, and 'Combined Device Memory Utilization'.

Line Graphs

Figure 73:
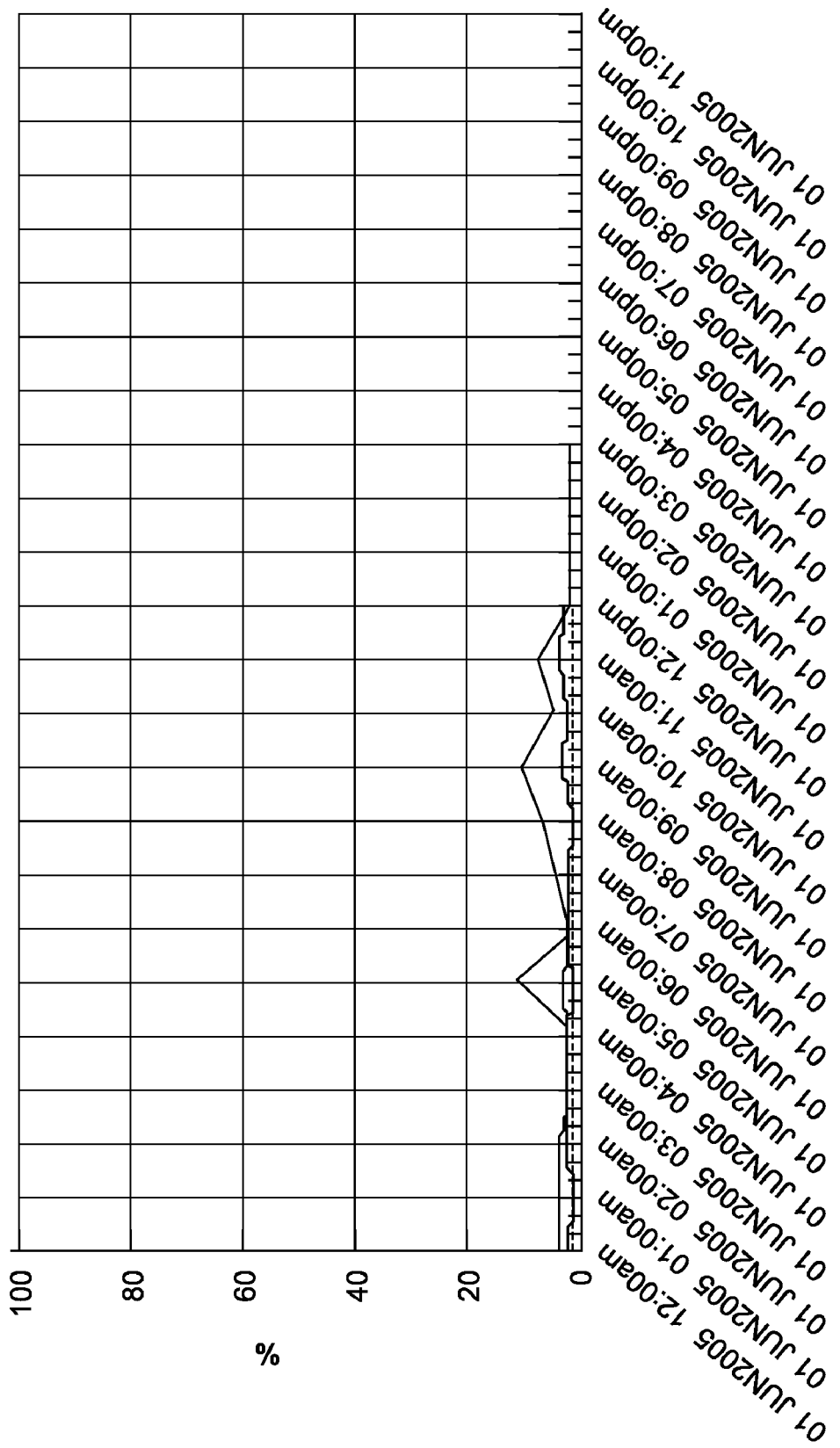
FIG. 73 is a screen display of a plotted line graph within a report in an embodiment of the present invention.

Referring to FIG. 73, in another embodiment of the invention, The Line Graph is located just below Pie Chart or Gauge, but above the Table. The Line Graph depicts the Group Criteria data over the selected Time Period (over a time-series), and graphed based on the Graph Interval selected by the user. For instance if the user selects the Throughput {Metric} Average {Aggregate Type} by Business Unit {Group Criteria} for a week {Time Period} based on Daily intervals {Graph Interval}, then the Line Graph would display the Average Throughput for each day for the entire week.

On a line graph, each Group Criteria is a separate line. The line for each Group Criteria can be broken into sub-categories based on user manipulation of the Table data (discussed below). The Line Graph is always limited to the information available in the Table data below the Graph. Line graphs do not represent the information for the entire Group Criteria (e.g. only 10 of the 50 States data will ever be depicted by the line graph at a time). Since Tables are limited to a maximum of 10 Group Criteria (discussed below), a line graph will generally consist of just 10 lines (exception noted below for In and Out).

Line Graphs are for the full time span selected and only show data that has been collected so far. For example, if the user selects 'Current Day' View range at 7:47 pm, the line graph has an X-axis that spans the entire day; however, only data that has been gathered so far displays on the graph and the graph lines will end at the time where data has yet to be collected for that day. Consider another example where a user selects a custom view range of Wed Oct. 15, 2003 to Sat Jan. 31, 2004. Since that selection exceeds 44 days the template/graph interval is Month/Month (default) and the data for the graph and table in the report is for the full months of October, November, December and January (the data in the graph/table for October is for the entire month of October, not just for October 15-31).

The one exception to this is when viewing the Current Month or Previous Month view range for a KPI report. The week template with a day graph precision should only include data for the month selected and not include data before or after the month to make a complete week to avoid including data outside the selected month within a KPI report.

Line Graph Title

The Line Graph has a title that reflects the information presented. {Group Criteria} {Metric}—{Time Period}. Examples include 'Business Unit Traffic—Week', and 'California Availability—Quarter'.

Line Graph Legend

The color used for each line is displayed as a color box next to each line item in the table below the line graph.

In/Out

Referring to FIG. 75, in another embodiment of the invention, for certain metrics that are calculated based on the sum of In and Out values (e.g. Traffic, Errors, Discards), the Table includes an option to display the In/Out values. Default is to NOT show In/Out values, only the Total values of a metric. When the In/Out option is selected and the 'Refresh' button is pressed, the Report is redisplayed to include the In/Out Metrics on the Line Graph and in the Table data.

For Metrics that are not calculated based on the sum of In and Out values (e.g. CPU, Memory Utilization, Availability), the In/Out option does not appear.

Max/Min (Candlesticks)

Figure 76:
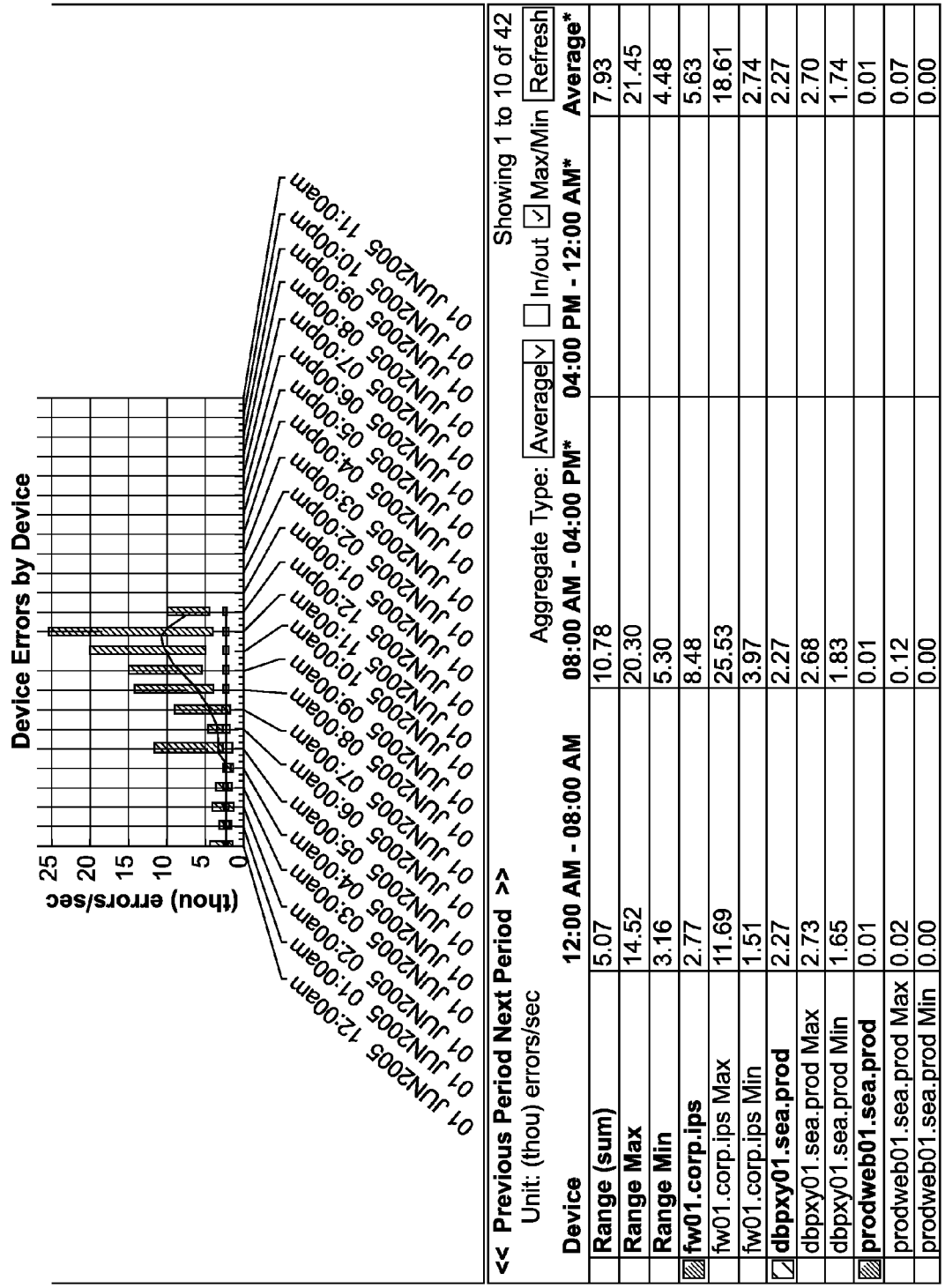
FIG. 76 is a screen display of a data grid table and line plot w/candlestick max/min values of a report in an embodiment of the present invention.

Referring to FIG. 76, in another embodiment of the invention, Provided the data granularity is greater than 5 minute polled values, the Max/Min toggle is an option for all metrics (except Availability as subsequently described). Default is not to show Max/Min. However, if a user selects Max/Min, then selects the 'Refresh' button, the Report is redisplayed to include Max/Min values (in a Candlestick format over a line graph) for each time interval. Max/Min data will also be displayed in the Table (below the Group Criteria values—similar to display for In/Out).

For availability line graphs the Max/Min candlesticks are not shown since the Min will always be 0 and the Max will always be 100, or the Max and the Min could be the same in which case no candlestick would be visible anyway.

Tables

Referring to FIG. 77, in another embodiment of the invention, Tables are based on a series of standard formats to ensure consistent presentation of data, and ease of manipulation and familiarity for the user.

Tables are for the full time span selected and only show data that has been collected so far. For example, if the user selects 'Current Day' View range at 7:47 pm, the table has columns that span the entire day; however, only data that has been gathered so far displays in the table and some sections of the table is blank or incomplete where data has yet to be collected for that day. Consider another example where a user selects a custom view range of Wed Oct. 15, 2003 to Sat Jan. 31, 2004. Since that selection exceeds 44 days, the template/graph interval is Month/Month (default) and the data for the graph and table in the report is for the full months of October, November, December and January (the data in the graph/table for October is for the entire month of October, not just for October 15-31).

The one exception to this is when viewing the Current Month or Previous Month view range for a KPI report. The week template with a day graph precision should only include data for the month selected and not include data before or after the month to make a complete week to avoid including data outside the selected month within a KPI report.

Table General Header

Each Table includes a standard 50% Gray Header that contains scrolling tools applicable to generally all tables. Notwithstanding exceptions set forth in Section 4.0 Templates.

Previous Period, Next Period

Referring to FIG. 77, in another embodiment of the invention, in the upper left hand corner of the Table Header, the user has two scrolling options to easily manipulate the data based on the "Previous" or "Next" time period. The user is presented with two alternatives {<<Previous Period, Next Period >>}. Clicking Previous Period or Next Period will proceed to the next full set of time divisions relative to what's currently being shown. For example, if Current Hour view range is selected and the 12 five-minute polling periods for the current hour are being displayed, then clicking previous period will change the graph/table to show the 12 five-minute polling periods for the previous hour. If data does not yet exist for Next Period the link is grayed out and disabled.

Note, this feature will not be displayed on any of the Consolidated Dashboard displays. Rather, it will only be available in full-scaled Reports.

Previous 10, Next 10, Totals

Referring to FIG. 78, in another embodiment of the invention, in the upper right hand corner of the Table Header, the user has two scrolling options to easily manipulate the data based on the "Previous" or "Next" group of 10 times in the Group Criteria. The user is presented with two alternatives and a total for the Group Criteria Range. {<<Previous 10, Next 10 >>, 1-10 of (Total)}. If the user is viewing either the first or last 10 in a Group Criteria Range, the appropriate link is grayed out and disabled accordingly. The user will also be presented with a Range count to inform the user of the totals for the Range.

Table Detail Header

Referring to FIG. 78, in another embodiment of the invention, each Table includes detail that provides the user with the appropriate framework to interpret the assembled data, and some limited abilities to manipulate data. The table detail header includes Toggles as outlined below, and a Refresh button to update selected changes by the user. FIG. 78 provides a sample of layout and design of the Table Detail Header.

Name, Units, Timestamp

The Name is the Report Name created by the user. If the user has not Saved the Report, then the Name is {Group Criteria} {Metric} {Time Period}. Units is displayed accordingly based on the selected Metric. In some instance no units may be displayed (e.g. Availability). Timestamps is displayed above each column in the Table, however such data is adjusted accordingly for the Time Period (e.g. an Hourly detail displays each hour, but not the date above each column; similarly, a week graph displays the dates for the week above each column, but not the hours).

Last Period "In Progress"

Referring to FIG. 79, in another embodiment of the invention, for any report that includes Current information, and any interval that is greater than 5 minutes, the last period for each Group Criteria item is noted as "In Progress" (unless, of course, the period just completed). Each column that has "In Progress" information is noted with an asterisk (*). A note is displayed below the table, indicating "In Progress. Period not yet complete."

Toggles

Referring to FIGS. 77 and 78, in another embodiment of the invention, subject to the Type of Template and the Metrics selected, certain Toggles are made available to the user to manipulate the Table data and graph in the Table Detail Header. Upon selecting or deselecting the check-box, then hitting the Refresh button, the information in the tables and graphs is adjusted accordingly. Set forth below is the list of the toggles that may be made available to a user, subject to the type of template.

Total, in, Out

For metrics that are calculated based on In and Out metrics, the user is presented with selections for Total, In and Out. Default is to display Total only. Default is to NOT display In and Out.

Max/Min (Candlesticks)

For Average metrics only (Max/Min is not valid for Sum) displayed over a time period that exceeds 5 minutes, the user is presented with a Max/Min toggle. The Max/Min toggle displays the metrics on the line graph as a candlestick. The Max/Min values will also be displayed in the table below the Group Criteria values (similar to In and Out values). Default is to NOT display Max/Min values.

Device(s), Interface(s), Tunnel(s)

Figure 26:
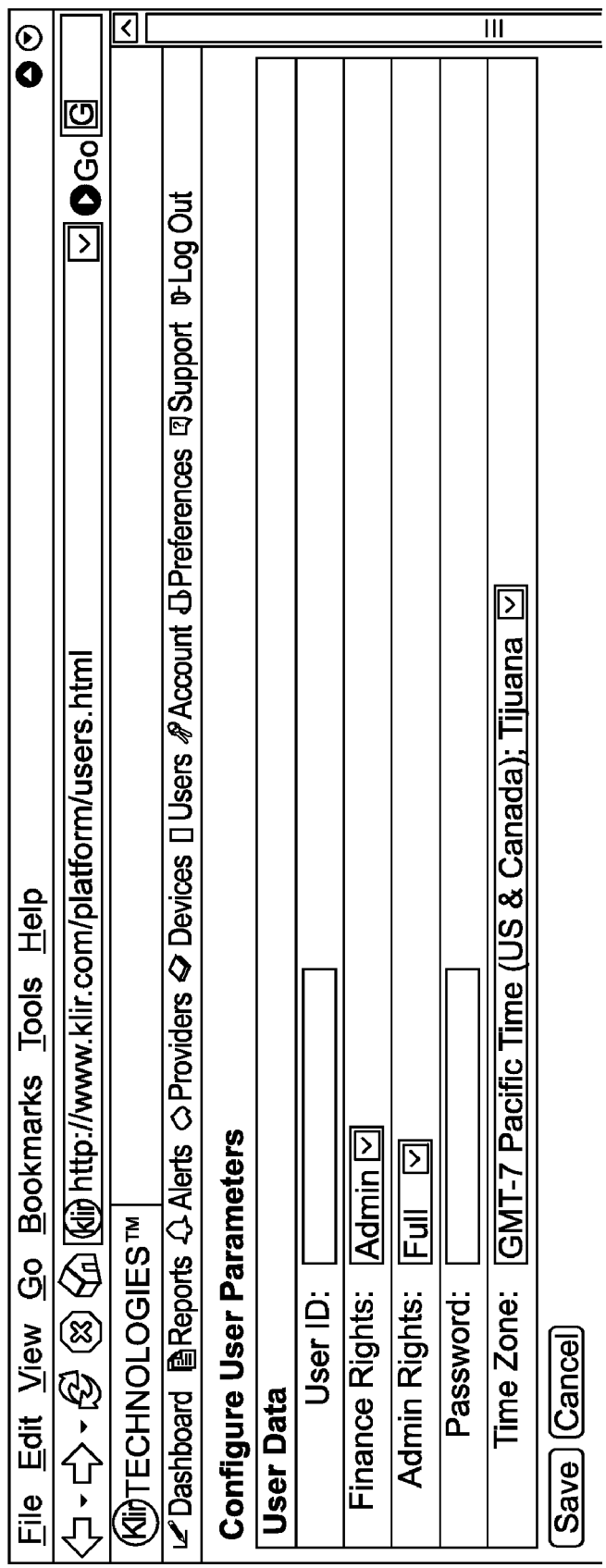
FIG. 26 is a GUI showing the Configure User interface selected from the toolbar menu in an embodiment of the present invention.

For the Device, Interface, Tunnel Template (See FIG. 26) and the Status Template (See FIG. 35) the user is presented with three check-boxes—one each for Device, Interface and Tunnel. Default is to display ALL information for Device, Interfaces, and Tunnels.

Account Detail, KPI Targets

Referring to FIGS. 37-40, in another embodiment of the invention, for the KPI Report Templates, the user is presented with check-boxes for Account Detail and KPI Targets that will enable the user to display information that pertains to each Group Criteria. Default is to NOT to display Account Detail or KPI Targets.

Error(s), Recovery

For the Alert Summary Template (See FIG. 36), the user is presented with check-boxes for Error(s) and Recovery(s). Default is to display ALL errors and recoveries.

Table Data Detail

Each table provides data in a format that is consistent in format. Range Totals

At the top of each table, the user is presented with a summary of the Range Total for the selected Group Criteria. If the Aggregate Type is Average (default), then the Range Total displays the Average for the entire Range. If the Aggregate Type is Sum, then the Range Total displays the Sum for the entire Range.

Group Criteria

In the Table, data is summarized by Group Criteria. Tables is limited to displaying just 10 Group Criteria values at a time.

Table Sorting

Referring to FIGS. 77 and 78, in another embodiment of the invention, all Table data for standardized Templates is sorted in alphabetical order based on Item name, with the exception of Alerts, Status and Top-10/Bottom-10 templates. All data within the Table will contain Forward and Reverse sort capabilities by clicking on the Column Title. If a client selects to Sort Data in a column, it applies to the entire range (not just the information in the table). For instance, if a table displays the first 10 of 29 business units, then the user selects sort by a particular column, then all the data and graphs is adjust accordingly. When the user sorts data by a clicking on a column header, the report will automatically refresh. Note, sort capabilities are limited specifically to the column header, not the data in the column (which is linked to drill down capabilities, discussed below).

Alerts

Table Data for Alert Templates, has a default sort of reverse chronological order based on time stamp (e.g. most recent event listed first).

Status

Table Data for Status Templates, is based on Device/Interface/Tunnel/VIP Status, where Red is 1, Yellow is 2 and Green is 3 (e.g. Red alarms are list first, followed by Yellow, then Green). See below for more detailed information.

Top-10/Bottom-10

Table Data for Top-10 or Bottom-10 Metric Templates, is based on the Highest or Lowest performance (respectively) for the selected metric criteria (e.g. Top-10 Memory Utilization is listed in descending order from the greatest to least Memory Use). See Section 4.2 for more detailed information.

Information Options

Referring to FIG. 70, in another embodiment of the invention, users have 5 icons available to them on a report below the header: Print View, Email, Save, and Export (such as Excel) as also shown in FIG. 35.

Print View

When selecting the Print View option the report displays in a new window without the form elements (e.g. Previous/Next, Max/Min, In/Out, Graph Interval, Refresh Button, and Print View, Email, Save, Export (Excel) options/icons. The header row (Logo, etc) will not be displayed in the Print View. Reports will only display a single column of graphs in Print View.

Save

Refer to Saving and Regular Emailing of Reports.

Email

Referring to FIG. 44, in another embodiment of the invention, when selecting the Email option, the user is presented with a small pop-up window with three input fields: (a) Email address (comma delimited), (b) Subject, and (c) Message (limited to 255 characters). The email is sent in an HTML-enhanced format from the system (in the same manner as the current Alerts). Note, when emailing a report it is sent with the same data set that is being viewed at the time (e.g. paging items 11-20 of 75), not all of the items that can be paged through in the report is included in the emailed report.

Export (Excel)

The user can select the Export icon to export a report such as in Excel format.

Drill Down

All Tables are interactive allowing the user to click directly on a particular item in the Table to get more drill-down information. Depending on where a user clicks on the Table, a new browser window will open and the detailed view of the report is displayed. Drill down tool tip text will state the level at which the end user is drilling down to when clicking on the corresponding text link. For example, one presently in a report with a listing of metrics that is drilled down to devices may mouse over a device and see a tool tip indicating that the corresponding link will allow me to drill down to interfaces for that device.

Group Criteria Hierarchy Drill Down (the Item Column)

If a user clicks on the name of a particular Item in a Group Criteria, then the user is presented with more detailed information about the selected Item (the next rung lower in the Hierarchy of Items). Hierarchy is based on a logical drill down of the selected Group Criteria. See Table 2 below illustrating Hierarchy drill down.

TABLE 2

Group Hierarchy

| Rank | Device | Connection | Location |
|---|---|---|---|
| Highest Order | Business Unit {Type} {Make} | Provider Name Connection Type (Go to Top of Devices) | Continent Country ~Region~ |
| | {Model} Device Name | | State City (Go to Top of Devices) |
| Lowest Order | Interface Name | | |

Regardless of the Item selected for a Group Criteria, in one embodiment, the user is always looped back to Devices as the lowest level of drill down. In one embodiment, Type, Make and Model are always SKIPPED in drill down, given that most Users will prefer to drill down directly from Business Unit, to Device Name, to Interface. For instance, if a user selected a Group Criteria of State, the order of drill down would be State, City, Business Unit, {skip Type, Make, Model}, Device Name, then Interface Name.

In one embodiment, the only instance where [Type/Make/Model] would not be skipped is if a user selects a Group Criteria of Type or Make, the Hierarchy of drill down would NOT skip Make/Model. In all other instances, the Type, Make and Model attributes is skipped in drill down.

Region is a dynamic location attribute, subject to the hierarchy created by the User. For instance, Region can be created at the country, state or city level (or any combination thereof). An example might include Mid-Atlantic Region and Western Europe Region; domestically "Mid-Atlantic" includes specific states, internationally "Western Europe" includes specific countries. As a result, drill down for Region should start at the highest order of common attributes. In the prior example, Region would fall between Continent and Country, since "Western Europe" includes multiple countries. Once a User has selected a specific Region, all other drill down functionality is based on the logical hierarchy set forth above.

For Loc Name 1 and Loc Name 2, drill down should go directly to the Top of Device (Business Unit).

If an attribute is not filled in for an Account, then that attribute are skipped in the drill down. For example, an account may fill in State for all/some of their devices, but they may choose not to fill in City for any of their devices. In this case, drill down would go directly from State to the Top of Device. If an account had City filled in for some of its devices, but not for all, then the City listed for the devices where it was not filled in are "Unknown."

Time Period Drill Down (the individual Time Period columns)

If a user clicks on any individual Time Period column within the user defined View Range, the user is presented with more detailed information about the selected Time Period (the next rung lower in the Hierarchy of Time). Hierarchy is based on a logical drill down of the selected Time Period based on View Range Time Standards shown in FIG. 81 See Table 3 below for Time Period drill down.

TABLE 3

Time Period Drill Down

| Rank | View Range | Template/Graph Interval |
|---|---|---|
| Highest Order | Year or Quarter * | Month |
| | Month | Week |
| | Week | Day |
| | Day | 8 Hour |
| | 8 Hour | Hour |
| Lowest Order | Hour | 5 Minute |

In one embodiment, the user always has the ability to drill down to the 5 Minute intervals, regardless of what Time Period is initially displayed. For instance, if Week is initially selected, the user may drill down on each Time Period column to open a new report window for Day, 8 Hour, Hour. FIG. 21 provides a sample of granular detail for each View Range.

Report Templates

Referring to FIG. 12, in another embodiment of the invention, contains a list of pre-defined Templates that is made available to the user in the Reports interface to generate and save user-defined reports. The report templates available to Users (Standard, Admin and Finance) are set forth in Table 4. A description is also displayed in the Reports Interface to provide the user with a brief overview of the functionality of the Template:

TABLE 4

| Template | Description |
|---|---|
| Metric Summary | Performance across multiple Devices for a single Metric type |
| Top 10 Metric Summary | Performance across multiple Devices for a single Metric type (Top 10 by Group Criteria) |
| Bottom 10 Metric Summary | Performance across multiple Devices for a single Metric type (Bottom 10 by Group Criteria) |
| Device.Interface.Tunnel Summary | Multiple Metrics on a single Device Interface or Tunnel |
| Status Summary | Current Availability, CPU and Throughput metrics across multiple Devices |
| Alert Summary | Alerts by Group Criteria |
| KPI Summary | Consolidated eKPI and cKPI report |

TABLE 4-continued

| Template | Description |
|---|---|
| eKPI Summary | Equipment Key Performance Indicators (eKPI) |
| cKPI Summary | Internet Service Provider Key Performance Indicators (cKPI) |

Cost Data in the KPI Summary, eKPI Summary and cKPI Summary is only be visible to those Users with Finance Rights in certain embodiments of the invention.

Templates follow the Report Conventions set forth previously. Variations to the Reporting Conventions are set forth below.

Metric Template

Referring to FIG. 31, in another embodiment of the invention, the Metric Template is designed to provide the user with overall performance data for a single Metric over a user-defined Time Period. The Metric Template is arranged based on the Group Criteria selected by the user. Users is given the option to view Total, In, Out and Max/Min data (where appropriate). Default view is to provide Total only by Group Criteria. No other selections is made available in the Metric Template (FIG. 19).

When a user selects a Metric Template in the Reports interface all the Metrics are displayed to the user in the Metrics Tree like it does in the system today. However, the Metrics tree will now have a radio button selector to allow the user to only choose a single metric. The report will come up in a new window. If the user wants to create another report with all the same parameters, except for a different metric, they can go back to the Reports interface where they created the previous report, select a different metric and then create the report. The second report will come up in a new window and if the user hasn't closed the window containing the first report then they has both reports available in separate windows. Data in the Metrics template is sorted in Alphabetical order (by default) based on the Group Criteria Item Name.

Dashboard View

The Dashboard view of the Metric Template displays only the Cumulative Data for the selected Time Period for the first 10 Group Criteria as selected by the user.

Top 10, Bottom 10 Metric Template

Referring to FIGS. 32 and 33, in another embodiment of the invention, the Top 10 Metric Template, and Bottom 10 Metric Template follow the exact criteria and parameters of the Metric Template (above), with the exception that Data is presorted based on the selected Metric performance (either Top 10 or Bottom 10).

Device/Interface Template

Referring to FIG. 34, in another embodiment of the invention, The Device/Interface Template is designed to provide the user with status information and performance data for multiple Metrics for a selected Device (including all Interfaces and Tunnels associated therewith). The Device/Interface Template is NOT subject to any other Group Criteria except Device. Users are given check-box options to view Device, Interface, Tunnel, VIP, In/Out and Max/Min data (where appropriate). Default selections view is to provide all Device, Interface, Tunnel and VIP detail information. No other selections are made available in the Device/Interface Template.

With continuing reference to FIG. 34, in another embodiment of the invention, when a user selects a Device/Interface Template in the Reports interface, the Metrics Tree is not made available to the user to make any selection, and the Group Criteria is limited only to Device (default). If the user selects the Device/Interface Template, and limits the Device to NetScreen, Connection to MCI, and Location to Seattle, then the user is presented with the first Device/Interface Reports based on the selected criteria. Based on the prior example, a user (such as itself) may have 3 different NetScreen devices that fit the criteria. The user would be presented with the first Report based on the alphabetical sort of Device names.

Since the Device/Interface Template is displayed for each Device individually, the Table Header includes a Paging Option to let the user choose between previous/next device {<<Previous Next>>}. A count total {1 of (Total)} will also be listed in the Table Header to provide the user with the Scope of the Report request.

Status is displayed in the Template for the Device, Interface(s), Tunnel(s) and VIP(s) individually.

Graphs

The Device/Interface Template contains the most comprehensive set of Graphs.

Line Graphs

The Line Graphs are displayed for all the "like" metrics across the interfaces on the Devices, based on the time frame selected by the user (e.g. all WAN, VPN and Wireless throughput is displayed on the same Throughput Line Graph). At a minimum, Line Graphs includes Throughput (xbps), Memory (xbytes), Errors and Discards. Other Line Graphs that may also be displayed depending on the type of interfaces monitored and information available includes unique Tunnel and Wireless related data.

Dashboard View

The Dashboard view of the Device.Interface.Metrics Template will show only Overall Status and the Cumulative Data for the selected Time Period rolled up by metric across all interfaces on the Device as selected by the user.

Alert Template

Figure 36:
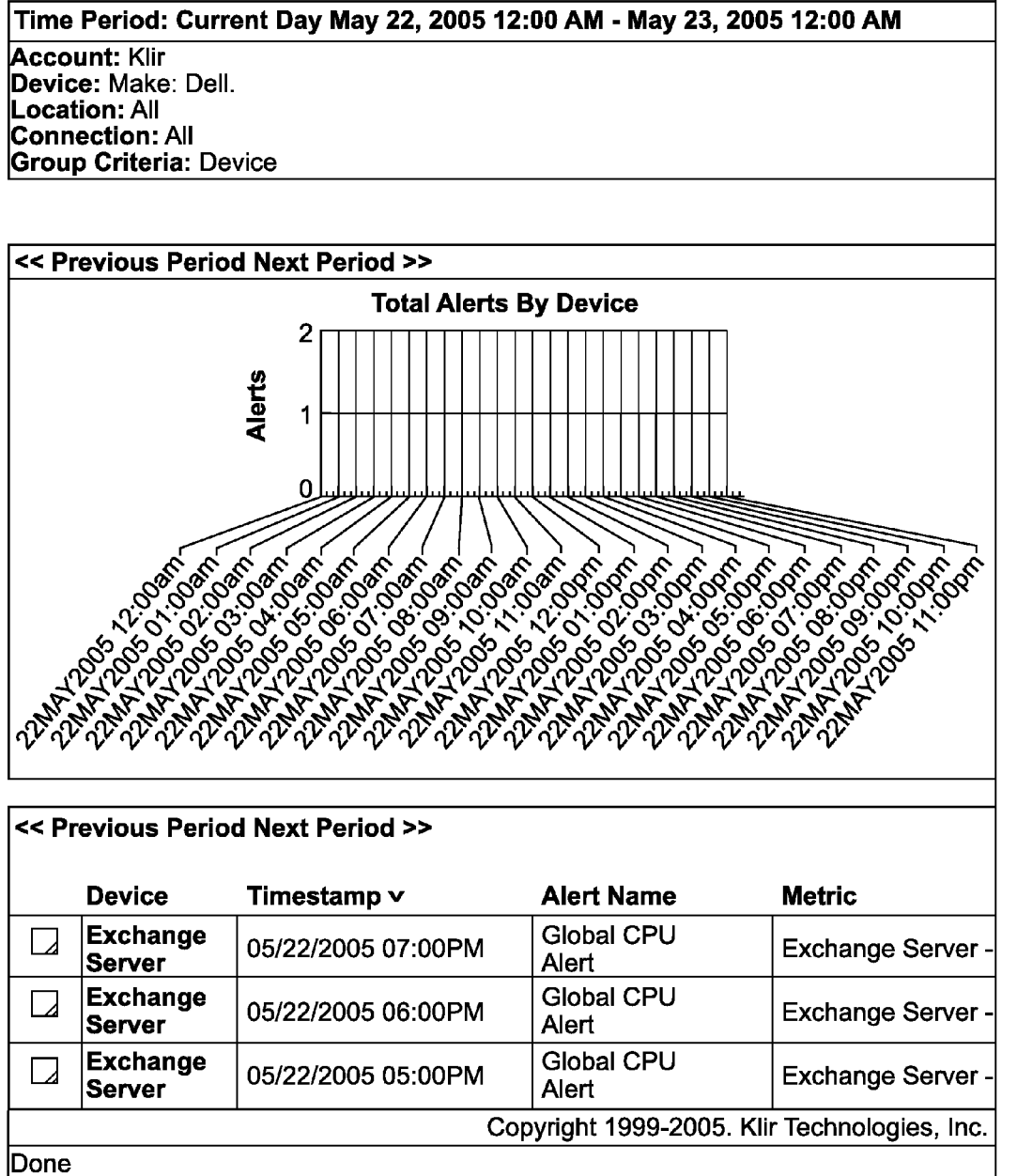
FIG. 36 is a screen display of a report utilizing the Alert Summary template to convey total alerts by device, and faults and recoveries across multiple devices in an embodiment of the present invention.
Figure 36:
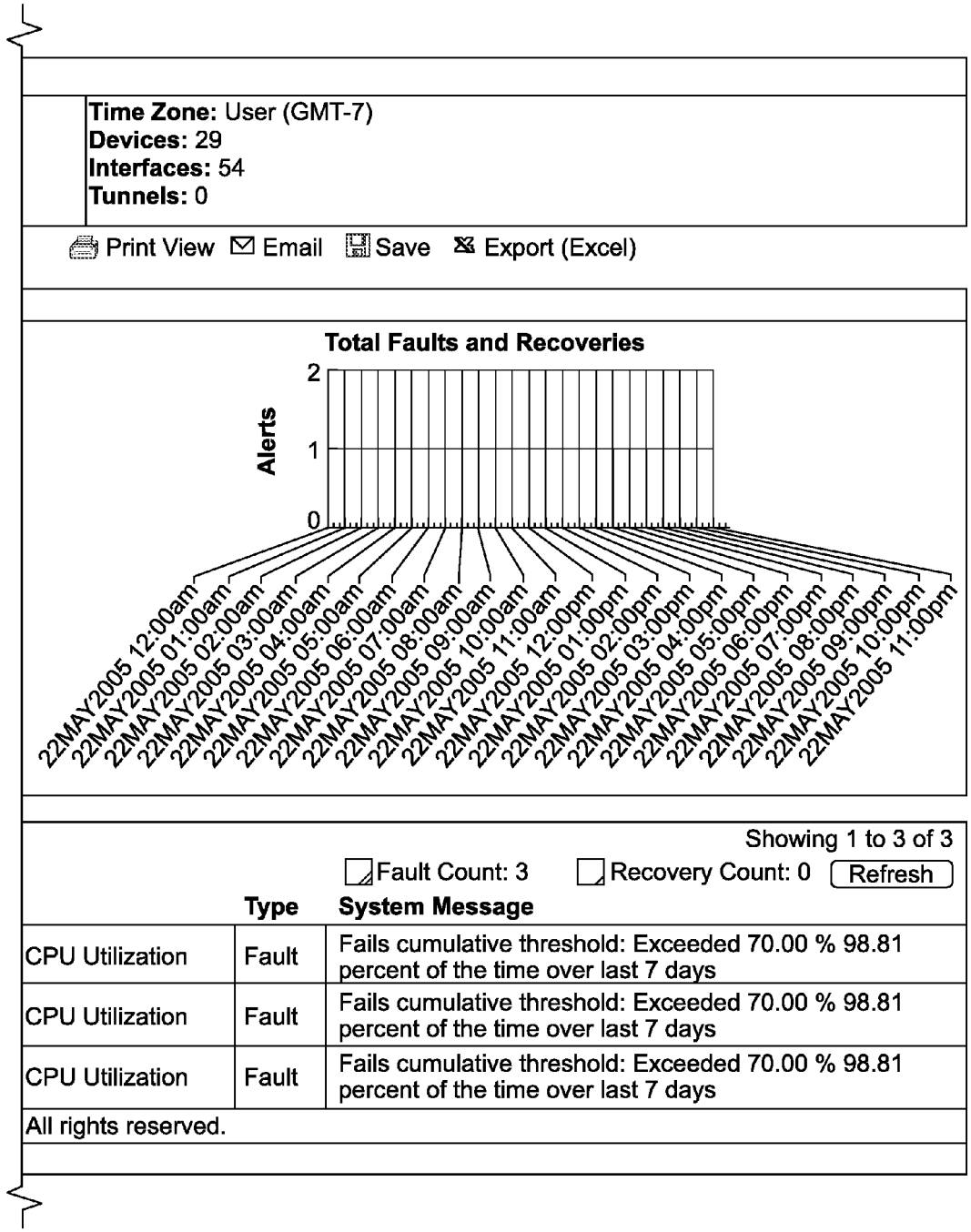

Referring to FIG. 36, in another embodiment of the invention, the Alert Template is designed to provide the user with a summary of Alerts over a user-defined Time Period. A Count of Errors and Recoveries for the entire range (not just the possible subset of 20 currently being viewed) is displayed in the Table Detail Header.

When a user selects an Alert Template in the Reports interface, the Metrics Tree is not made available to the user to make any selections. However, a user may still select any other limitations in the Device/Connection/Location tree, and a Group Criteria.

Notwithstanding the Group Criteria selected by the user, data in the Alerts table will always be sorted in reverse chronological order by timestamp (by default). If a user chooses to sort the Table after it is created (e.g. by Hitting Group Criteria, the Refresh), the data in the Alert table will conduct a two step sort, first by the selected sort criteria, then reverse chronological order.

Graphs

In addition to the standard Pie and Line Graphs that assemble data based on Group Criteria, the Alerts Template also includes an additional Line Graphs that compares Total Errors v. Total Recoveries over the time frame selected by the user. This allows the user to quickly scan if Alerts and Recoveries are following each other closely.

Dashboard View

The Dashboard view of the Alert Template displays only the most recent 10 alerts, and the unique Line Graphs (Total Errors v. Total Recoveries) described above.

Template Alert Logs (Future)

A consolidated Alert Log is produced below each of the other Templates described herein. Information is sorted in reverse chronological order based on the Time Stamp of the Alert. The Alert Log will contain information based on the Group Criteria and Time Period for the selected Template.

Status Template

Referring to FIG. 35, in another embodiment of the invention, the Status Template is designed to provide the user with a Status summary for multiple Devices, Interfaces and Tunnels through the Current Hour. A user may not select a time frame in the past for the Status Template, thus Date/Time controls will not be displayed if selected by the user. The Status Template is arranged based on the Group Criteria selected by the user. Users are given toggle options to view information for Devices, Interface or Tunnels pertaining to the selected Group Criteria. Default view is to display only the Group Criteria and Devices, with no Interfaces, VIPs or Tunnel information available.

When a user selects the Status Template in the Reports interface, the Metrics Tree is not made available to the user to make any selections. However, a user may still select any other limitations in the Device/Connection/Location tree, and a Group Criteria.

Notwithstanding the Group Criteria selected by the user, data in the Status table will always be sorted in reverse chronological order by existing Status. If all Devices, Interfaces and Tunnels are Green, then the sort is alphabetical order (automatically refreshed).

Standards for Status (Red, Yellow, Green Light)

Still referring to FIG. 35, in another embodiment of the invention, whenever Status is displayed, whether for a Device or Interface, a series of three balls arranged horizontally are presented to the user. The position and color will immediately identify the status of the object much like a traffic light. The three states are Up (available) shown by a green ball, Down (unavailable) shown by a red ball, and Alert (an alert is active, not recovered) shown by a yellow ball.

Graphs

There are no graphs or gauges included on the Status Template in an embodiment of the invention.

Dashboard View

The Dashboard view of the Status Template displays only the Group Criteria Status. If any Device, Interface or Tunnel within a Group Criteria is experiencing a Yellow or Red Alert, the Status of the entire Group Criteria will turn Yellow (not Red, unless the Group Criteria consists of only a single Device, Interface or Tunnel). In the Dashboard view, the Group Criteria will not expand to show the detail list of devices, interfaces, tunnels beneath it.

eKPI Report Template

Figure 38:
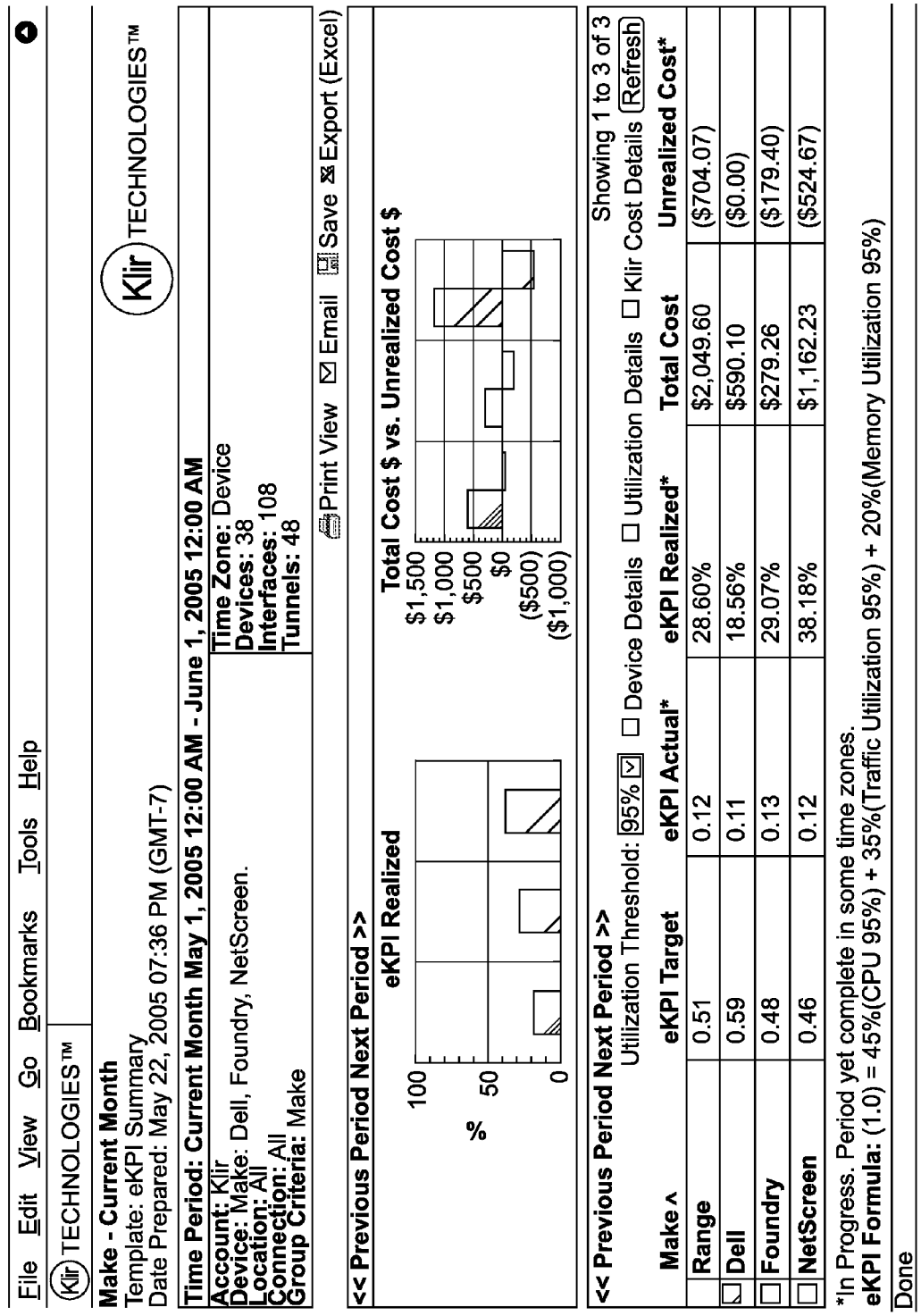
FIG. 38 is a screen display of a report utilizing the eKPI template to convey utilization, key performance indicators, targets and costs of equipment in an embodiment of the present invention.
Figure 39:
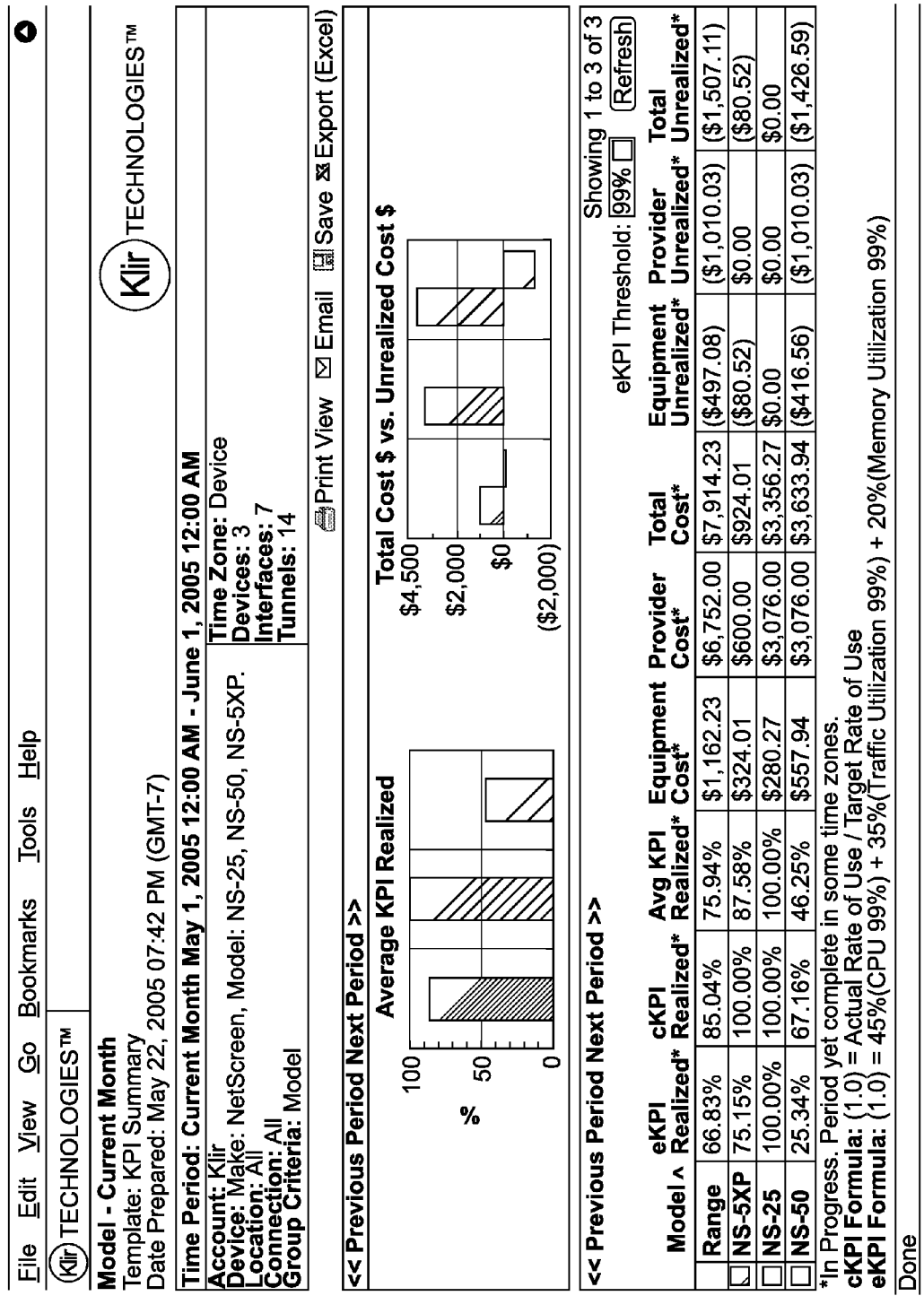
FIG. 39 is a screen display of a report utilizing the KPI Summary template to convey the combined eKPI and cKPI summary values for a selected segment of infrastructure in an embodiment of the present invention.

Referring to FIG. 38, in another embodiment of the invention, The Equipment Key Performance Indicator (eKPI) Template displays summary eKPI data to the user based upon the Group Criteria and user-defined time period. Unlike the standard reporting conventions, eKPI Template may only be produced based on past information. Current views are not available. eKPIs may only be produced for a Day, Week, Month, Quarter, or Year. Custom time periods may be provided in other embodiments. KPI values are calculated and stored on a daily basis by Device (local) time.

The eKPI Report Template displays the following eKPI variables for each Group Criteria item: eKPI Target, eKPI Actual and the eKPI Realized. The calculation of eKPI is subsequently described. Cost data for Equipment is displayed (but only for Users with Finance Rights). Cost data applicable to Equipment includes Depreciation/Lease Cost, Maintenance Cost, Labor Cost, Total Cost and Unrealized Cost for each Group Criteria.

A toggle is made available in the Table for Account Detail. By default, this toggle is unselected. If selected by the user (after hitting Refresh), the Table is expanded to display the individual Devices associated with the Group Criteria.

Graphs

The eKPI Template will not use the standard Pie Graphs or Line Graphs in embodiments of the invention. Rather, the eKPI template displays one or two separate Vertical bar graphs (subject to user rights).

eKPI Realized

An eKPI Realized bar graph displays the percentage of eKPI Realized for each Group Criteria item.

eKPI Actual Costs v. Unrealized Costs

For Users with Finance Rights, a bar graph depicting eKPI Actual Costs v. Unrealized Costs is displayed for each Group Criteria item. The Negative Unrealized dollars associated with the Unrealized Costs will always be displayed in the Red, below the X axis.

Calculating eKPI

Referring to FIG. 38, in another embodiment of the invention, the eKPI is based on a weighted formula of CPU Utilization, Memory Utilization and Throughput Utilization, expressed on a scale of 0.0 to 1.0. The eKPI is calculated based on the following formula, including key performance criteria:

$$eKPI\,(1.0) = 45\%\,(CPU) + 35\%\,(\text{Throughput Utilization}) + 20\%\,(\text{Memory Utilization})$$

CPU Utilization, Throughput Utilization and Memory Utilization are computed based on 95% or 99% threshold calculation over a month, similar to 95% or 99% threshold calculation for cKPI. It is not expected that an eKPI will ever reach 1.0. As such, to gauge realization, the user must define a target eKPI for each Device in the Device Configuration Interface.

Cost™ Data for Equipment

Referring to FIG. 38, in another embodiment of the invention, ror Users with Finance Rights, the Cost Data for Equipment is displayed to the right of the eKPI data for each Group Criteria. Financial variables are required of the user to calculate the Cost Data, including Procurement Cost, Maintenance Cost and Labor Cost.

Procurement Cost

With continuing reference to FIG. 38, in another embodiment of the invention, a user is presented with a Procurement Date and two different Procurement Methods: Purchase or Lease. If Purchase is selected, the user has the ability to enter the Purchase Price, and Depreciation Method. Two depreciation methods are available for equipment pursuant to IRS regulations: Straight-line (default) and Accelerated. These rates represent annual depreciation rates, which can then be calculated and attributed on a monthly basis. Depreciation is calculated from the Procurement date. If Lease is selected, the user has the ability to enter the Monthly Lease Cost and Lease Duration that is calculated from the Procurement Date. If no Procurement Date, assume the Procurement Date is the current date (when Cost data is entered)

Maintenance Contract

The Maintenance Contract is cost of purchased support from the Vendor or Equipment manufacturer. Procurement Date is assumed to be the same as the Equipment Procurement Date (fill in default), but may be adjusted by the user.

Labor Contract

The Labor Contract is the internal support costs associated with owning and maintaining the hardware. The Labor Contract is based on two user fields: Monthly Labor Hours and Hourly rates.

Dashboard View

In the Dashboard View of the interface of FIG. 38, the user is presented with a consolidated table of eKPI data, summarized by Group Criteria (FIG. 31 shows example of "Make" Group Criteria display).

cKPI Report Template

Figure 37:
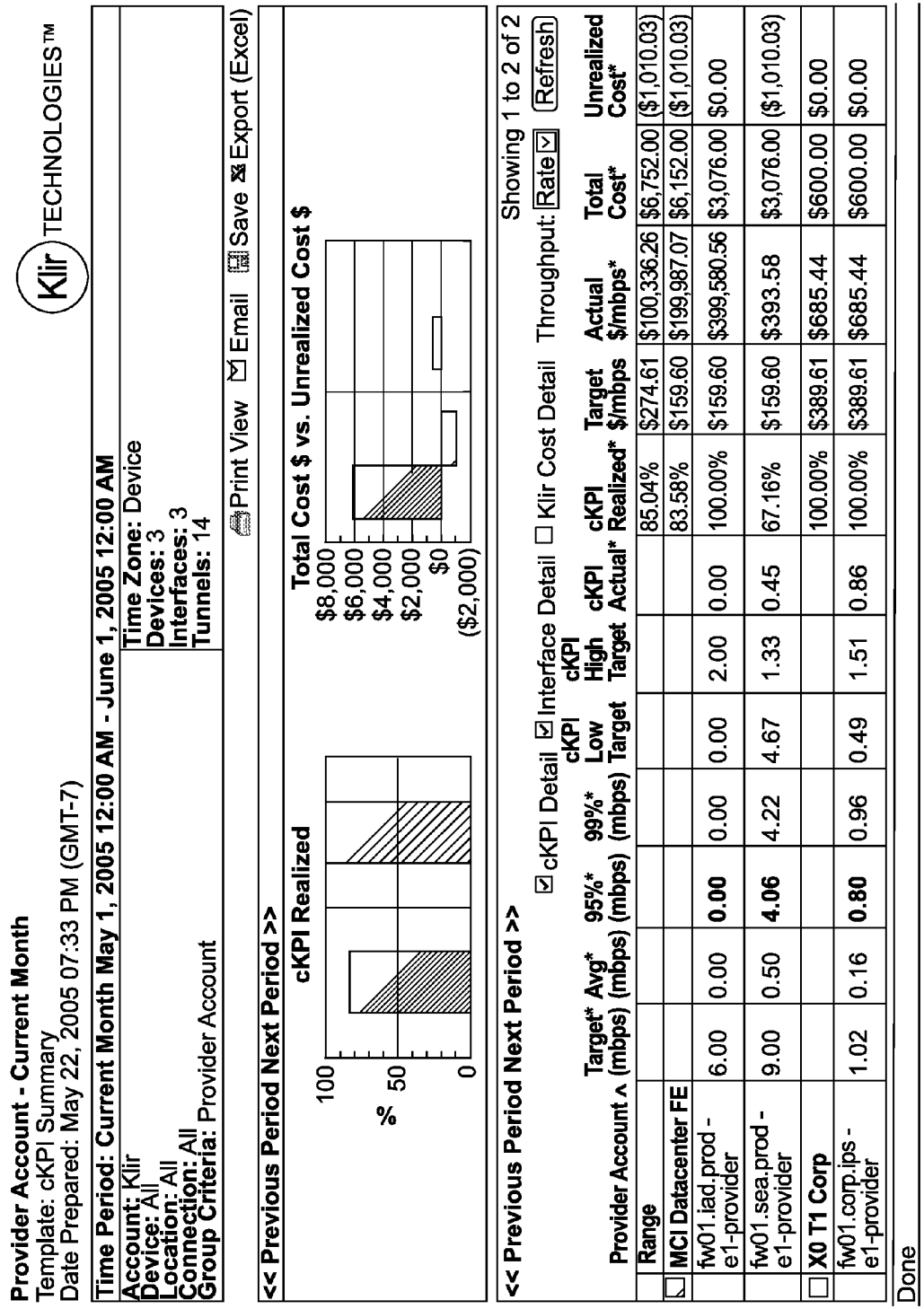
FIG. 37 is a screen display of a report utilizing the cKPI template to convey utilization, key performance indicators, targets and costs of service provider accounts in an embodiment of the present invention.

Referring to FIG. 37, in another embodiment of the invention, the Circuit Key Performance Indicator (cKPI) is based on a simple quotient comparing actual utilization rates versus contracted rates. This data is important for senior managers to understand of costs associated with Provider commitments versus actual utilization rates.

The initial formula suggested for the cKPI is as follows:

$$cKPI\ (1.0) = \text{Actual Rate of Utilization/Target Rate of Utilization}$$

The Circuit Key Performance Indicator (cKPI) Template displays summary cKPI data to the user based upon the Group Criteria and user-defined time period. Similar to the eKPI, the cKPI Template may only be produced based on past information. cKPIs may only be produced for a Day, Week, Month, Quarter, or Year. Custom time periods can be provided in other embodiments.

The cKPI Report Template displays the following cKPI variables for each Group Criteria item: Target Throughput and Actual Throughput, cKPI Actual, cKPI Realized. (See calculation of cKPI below). Cost data for Service Providers is displayed (but only for Users with Finance Rights). Cost data displayed (by default for Finance Users) includes Target Unit Rate, Actual Unit Rate, Subtotal of Costs and Unrealized Costs. A checkbox is available (unselected by default), to display Cost Detail, which includes Provider Fixed Costs, Burstable/Variable Costs, Other Fixed Costs, and Labor Cost).

A checkbox is available (deselected by default) in the Table for Account Detail. If selected by the user (after hitting Refresh), the Table is expanded to display the individual Devices associated with each of the Group Criteria as well as the cKPI Targets High and Low for each Group Criteria Graphs The cKPI Template will not use the standard Pie Graphs or Line Graphs in embodiments of the invention. Rather, the eKPI template displays one, or three separate Vertical bar graphs (subject to user rights) in other embodiments.

cKPI Realized

An cKPI Realized bar graph displays the percentage of cKPI Realized for each Group Criteria item.

cKPI Actual Costs v. Unrealized Costs

For Users with Finance Rights, a bar graph depicting cKPI Actual Costs v. Unrealized Costs is displayed for each Group Criteria item. The Negative Unrealized dollars associated with the Unrealized Costs will always be displayed in the Red, below the X axis.

Calculating cKPI

Referring to FIG. 80, in another embodiment of the invention, The cKPI is based on a formula based on average of Low and High Targets for Provider throughput. The cKPI is calculated based on the following formula:

$$cKPI\ \text{High} = \text{High Target}/[(\text{High Target} + \text{Low Target})/2]$$

$$cKPI\ \text{Low} = \text{Low Target}/[(\text{High Target} + \text{Low Target})/2]$$

$$\text{Average } cKPI\ \text{Target} = 1.0$$

It is expected that an cKPI can exceed 1.0. As such, to gauge realization, the user must define a target for high and low utilization (since some burstable charges may be acceptable) for each Interface in the Provider Account Config Interface.

With continuing reference to FIG. 80 cKPI is an algorithm incorporated into Cost that calculates the realization of Internet Service Provider (ISP) connectivity costs benchmarked against client-specified performance targets (Circuit Key Performance Indicators, or cKPIs). The algorithm supports analyses of the four (4) principle billing methodologies utilized by ISPs to charge customers for services, including: fixed, burstable, variable and cumulative billing. Irrespective of the billing methodology (ies) employed, the algorithm supports high and low cKPIs prescribed by customers to evaluate realization of ISP connectivity costs based on actual utilization data. The algorithm is designed to provide analyses of utilization and costs based on data that is ratable over a monthly period. Most ISPs use a sample data rate every 15 or 30 minutes for Internet circuits to calculate appropriate billing levels (based on a $95^{th}$ or $99^{th}$ threshold); however a few claim to use a 5-minute sample data rate. The algorithm employed by uses a 5-minute sample data rate irrespective of the ISP sample rate to ensure the greatest level of accuracy. The cKPI is normalized to a scale of 1.0 to account for a variety of different rates and targets that vary based on the size of Internet circuits. Detailed descriptions of each billing methodology and the algorithm components are set forth as follows:

i. Fixed Billing Methodology.

This ISP billing methodology calculates costs based on a relatively simple formula. A client agrees to pay a Fixed Cost (C) for a Fixed Floor (B) of bandwidth for a given Circuit Type (A). In the example set forth in FIG. 80, the client has agreed to pay $1,200 per month (C) for 1.54 mbps (B) of bandwidth on a T-1 circuit (A). There are no burstable costs, burstable rates, or thresholds, given that the Circuit Type is either limited by it inherent physical parameters, or the rate of usage is "fixed" by the ISP.

ii. Burstable Billing Methodology

This ISP billing methodology calculates costs based on an analysis of actual customer utilization that bursts above ISP service level commitments. A client agrees to pay a Fixed Cost (C) for a Fixed Floor (B) of bandwidth for a given Circuit Type (A) based on $95^{th}$ or $99^{th}$ percentile actual utilization data (F); provided however that the client further agrees to pay an additional Burstable Cost (E) for each increment of use—the Burstable Rate (D), that exceeds the Fixed Floor (B). In the example set forth in FIG. 80, the client has agreed to pay $2,000 per month (C) for 10 mbps (B) of bandwidth on a Fast-E circuit (A), in addition to another $250 (E) for each 1 mbps (D), where actual use exceeds 10 mbps (F). Actual use is based on 99th percentile (F) utilization.

iii. Variable Billing Methodology

This ISP billing methodology calculates costs based on the variable rate of customer utilization over a given month, versus a fixed service level commitment. A client agrees to pay a variable Incremental Cost (C) for a variable Increment Rate (B) of bandwidth for a given Circuit Type (A) based on $95^{th}$ or $99^{th}$ percentile actual utilization data (F); provided however that the client further agrees to pay an additional Overage Incremental Cost (E) for each increment of use based on the variable Incremental Rate (B) that exceeds the Variable Capacity (D). In the example set forth in FIG. 80, the client has agreed to pay $150 per month (C) for every increment of 256 kbps (B) usage of bandwidth on a Frame Relay circuit (A), in addition to another $200 (E) for variable increment that exceeds a 1024 variable capacity (D). Actual use is based on 95th percentile (F) utilization.

iv. Cumulative Billing Methodology

Unlike burstable or variable billing methodologies that calculates billing based on $95^{th}$ or $99^{th}$ percentile rates of actual usage (e.g. billing based on peak monthly utilization), the cumulative billing methodology simply calculates costs based on the total customer traffic over a given month (e.g. total bytes of traffic). A client agrees to pay a variable Fixed Cost (C) for a Fixed Floor (B) of total traffic for a given Circuit Type (A) based total actual traffic; provided however that the client further agrees to pay an additional Overage Incremental Cost (E) for each increment of use—the Overage Incremental Rate (D) that exceeds the Fixed Floor (B). In the example set forth in FIG. 80, the client has agreed to pay $20,000 per month (C) for up to 150 GB (B) of throughput for a given month on a Gig-E circuit (A), in addition to another $1,000 (E) for each additional 1 GB of throughput (D) that exceeds a 150 GB Fixed Floor (B). There are data usage thresholds, given that the billing is based simply on total throughput rather than billing based on peak monthly utilization.

Algorithm Components include:

Target Rate—I

The target rate of utilization (I) is calculated by averaging high target (G) and low targets (H) input by the user for each interface in the Provider Settings, as set forth in FIG. 18. In the embodiment shown in FIG. 80, the user input targets of 12 mbps (G) and 6 mbps (H), which equates to a [(12+6)/2]=9.

Utilization Rates—U1, U2, U3

Utilization rates are calculated by the system based on the client's actual 5-minute sample data over a given monthly period. The Average Unit (U1) is the average of all 5-minute data for Internet traffic throughput for a given month. The 95% Unit (U2) is computed by sorting all of the 5-minute data for Internet traffic throughput over a given month, from the lowest to highest rate of usage, then selecting the rate at the 95% (highest) sample for the given month. The 99% Unit (U3) is computed by sorting all of the 5-minute data for Internet traffic throughput over a given month, from the lowest to highest rate of usage, then selecting the rate at the 99% (highest) sample for the given month. 95% and 99% are designed to identify peak utilization rates (irrespective of low usage in off hours). In FIG. 80 Example, the utilization rates as calculated were an Average of 4.6 mbps (U1), 95% utilization of 12.7 (U2), and 99% utilization of 14.3 mbps (U3).

cKPI Low—J

The low cKPI target (J) is calculated by dividing the low target (H) by the Target rate (I). In FIG. 80 Example, the low cKPI target based on user-identified targets is 6 (H) divided by 9 (H), which equates to 0.66.

cKPI High—K

The high cKPI target (K) is calculated by dividing the high target (G) by the Target rate (I). In FIG. 80 Example, the low cKPI target based on user-identified targets is 12 (G) divided by 9 (H), which equates to 1.33.

cKPI Actual—L

The cKPI actual (L) is calculated one of three ways, depending on the billing methodology employed. For Burstable or Variable billing methodologies, either the 95% or 99% rate of Utilization (U2 or U3), as prescribed by the customer when setting up Provider Account settings (FIG. 18), is divided by the Target Rate (I). For the Fixed billing methodology, the 95% rate of Utilization (U2) is divided by the Target Rate (I). For the Cumulative billing methodology, the Average rate of Utilization (U1) is divided by the Target Rate (I). In FIG. 80 Example, a Burstable methodology was employed with a 99% utilization rate, or 14.3 (U3), divided by the Target Rate of 9 (I), resulting an cKPI Actual of 1.67.

cKPI Realized—M

The cKPI Realized (M) is calculated based on a conditional statement. If the cKPI Low (J), is less than or equal to the cKPI Actual (L), is less than or equal to cKPI High (K), then the cKPI Realized (M) is 100%. In the alternative, if the cKPI Actual (L), is less than the cKPI Low (J), then the cKPI Realized (M) equals the cKPI Actual (L) divided by the cKPI Low (J) times 100%. In the alternative, if the cKPI Actual (L) is greater than the cKPI High (K), then cKPI Realized (M) equals cKPI Actual (L) divided by cKPI High (K) times 100%. In FIG. 80 Example, the cKPI Actual 1.67 (L) is greater than the cKPI High 1.33, which results in L/K* 100%, which equates to cKPI Realized of 125% (M).

Target Unit Cost—T1

The Target Unit Cost (T1) is calculated by dividing the Fixed Cost (C) by the Fixed Floor (B) based on the appropriate billing methodology. In FIG. 80, the Fixed Cost is $2,000 (C) and the Fixed Floor is 10 mbps, which results in a Target Unit Cost of $200/mbps (T1).

Actual Unit Cost—T2—

The Actual Unit Cost (T2) is calculated by dividing the sum of Fixed Cost (C) plus the Incremental Costs incurred (if any) (E), by the actual Utilization rate (U1, U2, or U3) based on the appropriate billing methodology. In FIG. 80 Example, the Fixed Cost is $2,000 (C), Incremental Costs are $1,250 (E), and the Fixed Floor based on the actual rate of Utilization for the Burstable example is 14.3 mbps (U3), which results in an Actual Unit Cost of $227/mbps (T2).

Fixed Cost—C

The Fixed Cost (C), is based on the appropriate Billing methodology (described above i, ii, iii, or iv). In FIG. 80, the Fixed Cost is $2,000 (C) for the Burstable billing methodology example.

Incremental Costs—E

The Incremental Cost (E), if any, is calculated by the system based on the appropriate Billing methodology (described above i, ii, iii, or iv). In FIG. 80, the Incremental Cost is $1,250 (E) for the Burstable billing methodology example.

Other Fixed Costs—Y1

Figure 59:
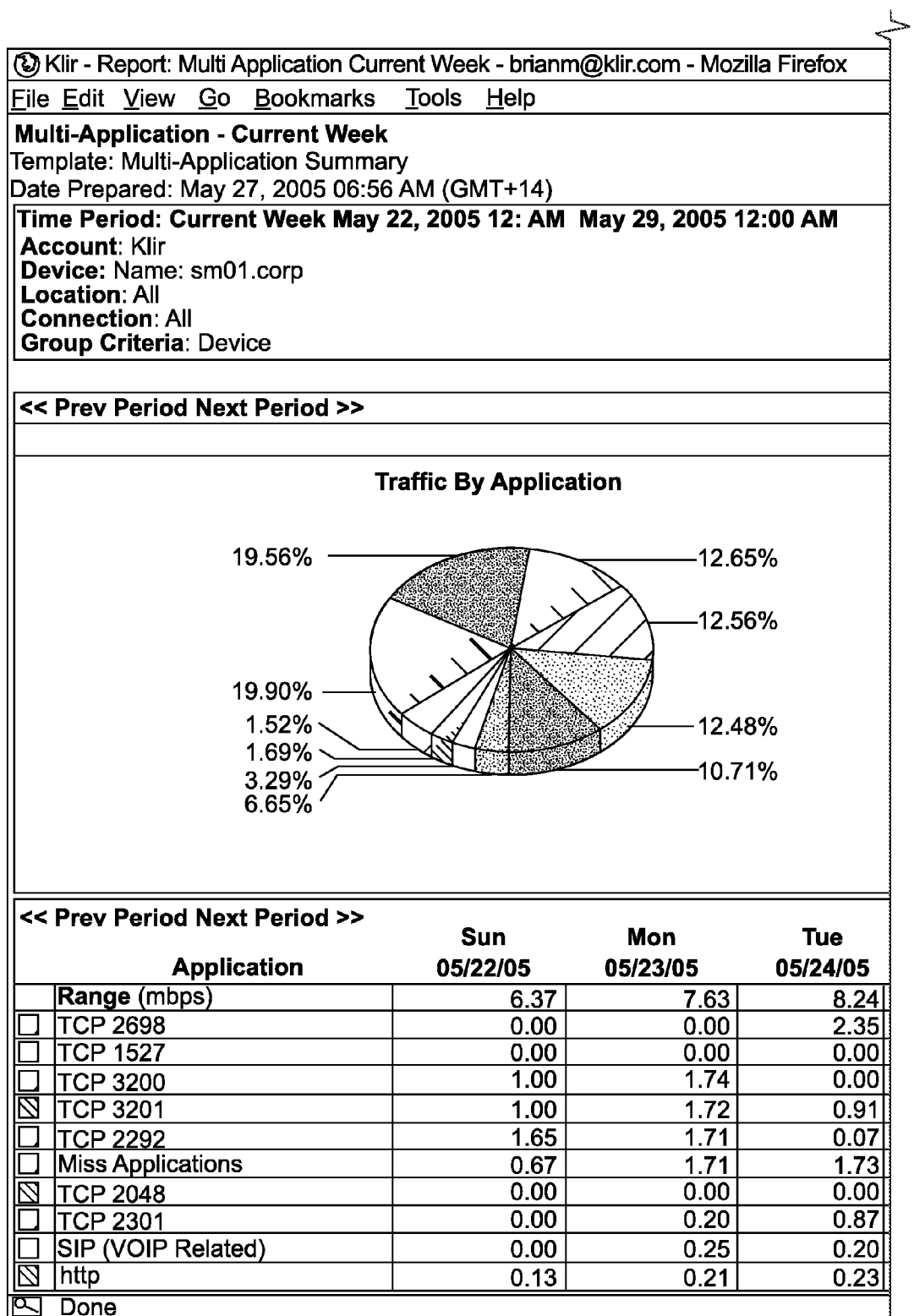
FIG. 59 is a screen display of the Multi Application Summary template in an embodiment of the present invention.
Figure 59:
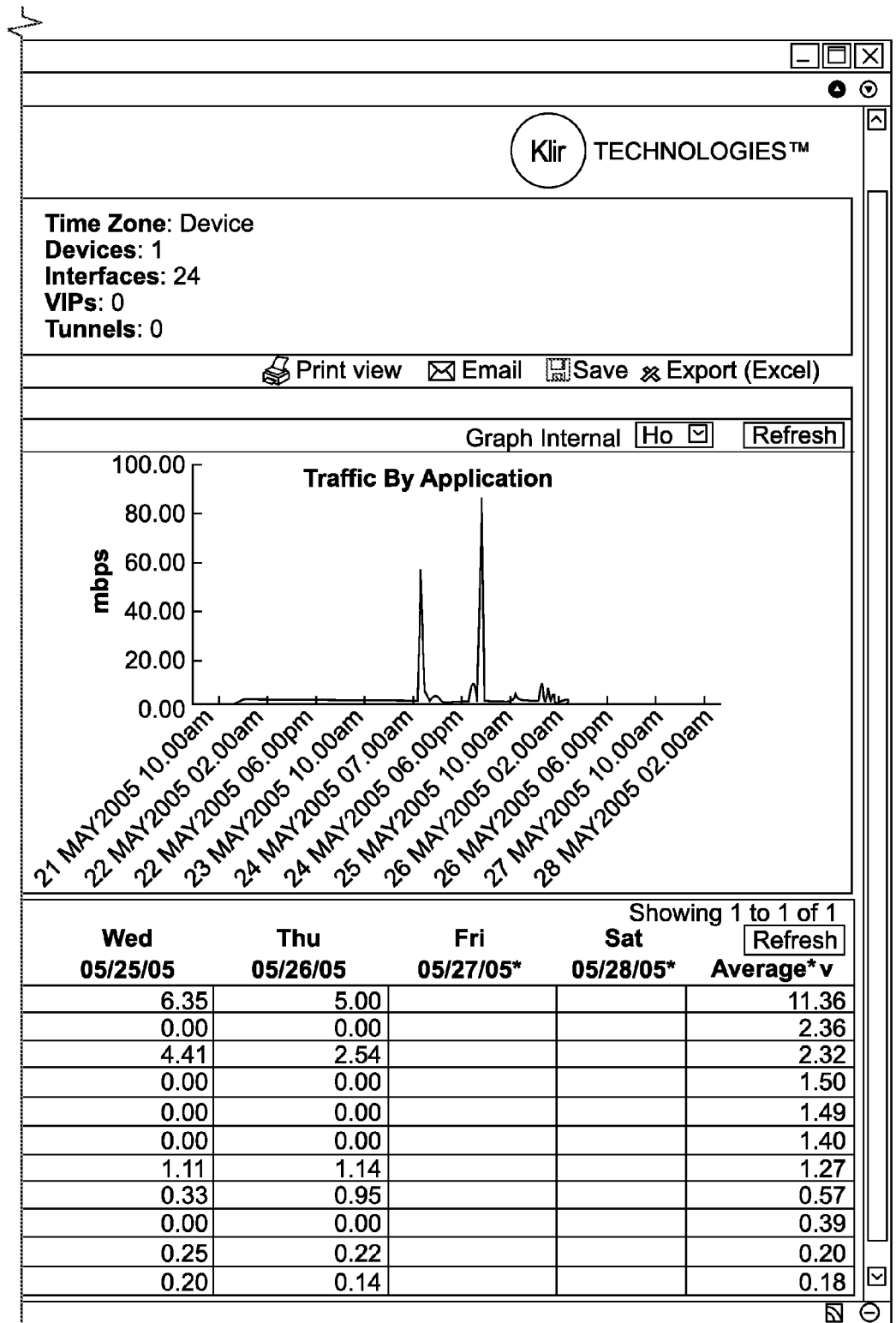

Other Fixed Costs (Y1) is the sum of variables (ratable on a monthly basis) as prescribed by the customer when setting up Provider Account settings (see FIG. 59). Variables include two (2) miscellaneous line items (O1 and O2) which can be described the customer and assigned values. In FIG. 80, the Other Fixed Costs include two Misc Costs of $750 (O1) and $250 (O2), for a total of $1,000 in Other Fixed Costs (Y1). The purpose of the Misc Costs is to account for additional contracted time such as "On-site Hands Support" or "Data Center Racks".

Labor—Y2

Labor (Y2) is the product of the Labor Rate (O3) times the Labor Hours (O4) as prescribed by the customer when setting up Provider Account settings (see FIG. 18). In FIG. 80 Example, the Labor Rate is $50/hour (O3), the Labor Hours are 10 (O4), resulting in $500 of Labor per month (Y2).

Total Cost—Z

The Total Cost (Z) is the sum of Fixed Cost (C), Incremental Costs (E), Other Fixed Costs (Y1) and Labor (Y2). In FIG. 80 Example, the Fixed Cost is $2,000 (C), Incremental Costs are $1,250 (E), Other Fixed Costs are $1,000 (Y1), and Labor is $500 (Y2), for a Total Cost of $4,750 (Z).

Unrealized Cost—R

The Unrealized Cost (R) is calculated based on a conditional statement. If the cKPI Realized (M) is less than 100%, then the Unrealized Cost (R) equals 100% minus the cKPI Realized (M) times the Total Cost (Z) times negative one. In the alternative, if the cKPI Realized (M) is greater than 100%, then the Unrealized Cost (R) equals the Total Cost (Z) minus the sum of Fixed Cost (C), plus the difference of Target High (G) minus Fixed Floor (B) times the Burst Rate (E), plus Other Fixed Costs (Y1) plus Labor Costs (Y2), times negative one. In the alternative, if cKPI Realized (M) is 100%, then Unrealized Cost (R) is zero. In FIG. 80 Example, the cKPI Realized (M) is greater than 100%; as a result the Total Cost of $4750 (Z) minus the sum of the Fixed Cost of $2,000 (C), plus the difference of the Target High 12 (G) minus Fixed Floor 10 (B) times the Burst Rate of $250(E), plus Other Fixed Costs of $1,000 (Y1) plus Labor Costs of $500 (Y2), times negative one, equals —$750 in Unrealized Costs (R).

Cost Data for Providers

Figure 52:
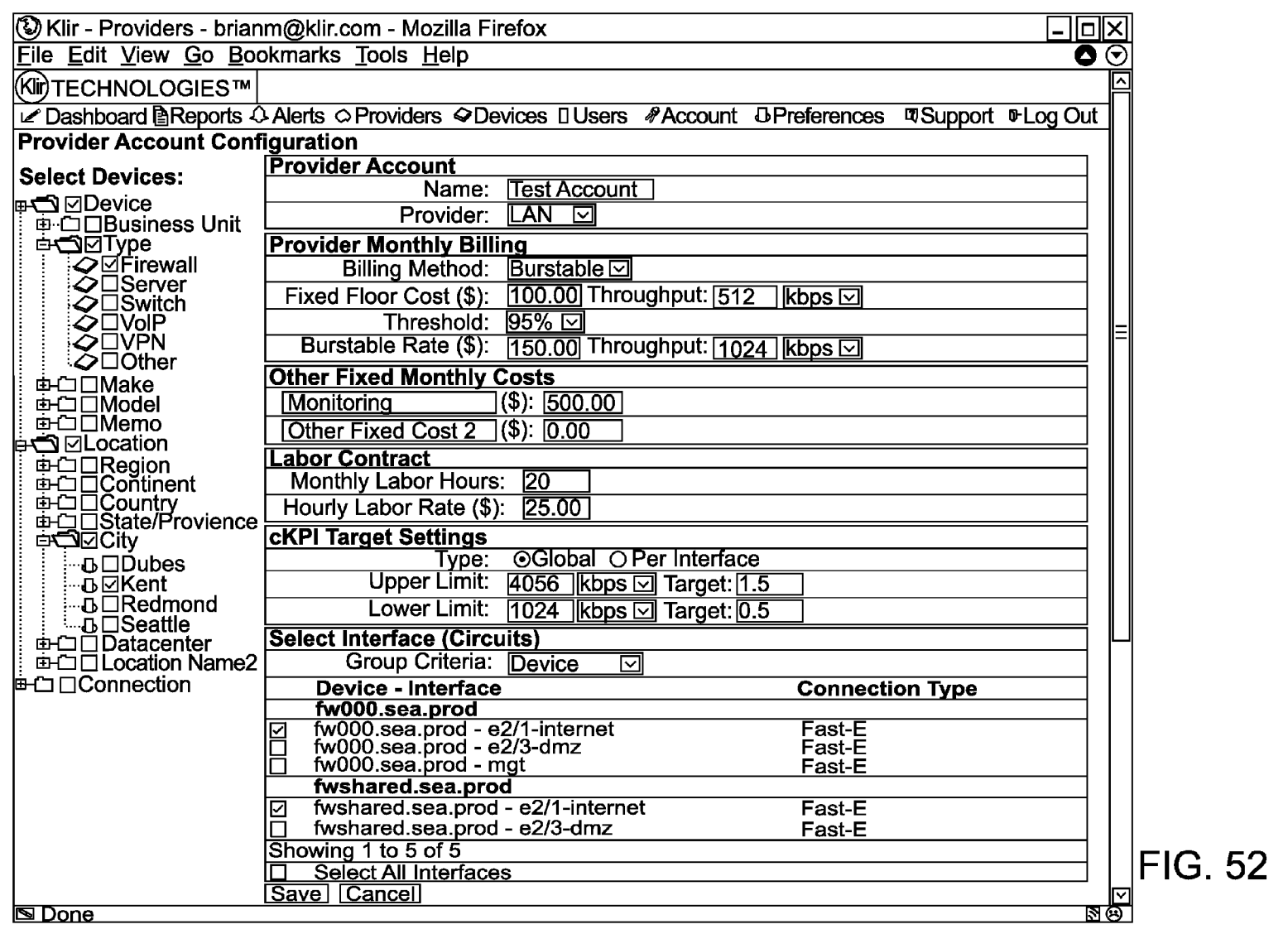

Referring to FIG. 37, in another embodiment of the invention, for Users with finance Rights, the Cost Data for Providers is displayed to the right of the cKPI data for each Group Criteria. Financial variables are required of the user to calculate the Cost Data, including Billing Method, Maintenance Cost and Labor Cost (FIG. 52).

Billing Method

FIG. 80 lists the various billing methods and the methodology associated with each. These billing methods are calculated based on the same formula in the current system, with a minor adjustment in the Variable rate, limiting upper usage to a single Volume price.

Other Fixed Costs

Other Fixed Costs include other monthly service fees (e.g. Hand Support), that can be customized by the user.

Labor Contract

The Labor Contract is the internal support costs associated with owning and maintaining the hardware. The Labor Contract is based on two user fields: Monthly Labor Hours and Hourly rates.

Dashboard View

In the Dashboard View, the user is presented with a consolidated table of cKPI data, summarized by Group Criteria such as shown in the eKPI table of FIG. 38.

KPI Report Template

Referring to FIG. 80, in another embodiment of the invention, This release shall include three different types of Key Performance Indicators: (1) Equipment (eKPI); (2) Internet Service Providers (cKPI); and (3) an overall KPI Summary (which is an average between eKPI and cKPI). The Overall KPI Summary for the network is based on the Combined Average of eKPI and cKPI. The KPI Report Summary will simply include rolled up totals from the eKPI and cKPI reports to provide a complete view of the Total Infrastructure Subtotal and Unrealized Costs.

This section describes the time standards used for polling and reports along with FIG. 17.

DEFINITIONS

As shown in the interface of FIG. 17 (fixed/burstable billing selections) and throughout this spec and the Metric and UI mockups, Template in the context of time indicates which template are used for a report, etc., this refers primarily to the time increments displayed in the data table below the graph.

Graph Interval indicates what granularity of data is being used for the graph only within a report (the granularity of the columns in the tables always remains the same within a template (e.g. 5 Min, Hour, Eight Hour, Day, Week, etc.).

Time Zones

Time Zone is an field for each device (see FIG. 14). Polling will continue to occur in GMT time from the polling server. However, each device has a time zone setting to facilitate daily and weekly aggregations in Device (local) time for improved performance of long time span reports that will utilize these aggregations.

Report Time

Display

The timeframes of data displayed in the graph(s) and table within reports displays in either "Device (local)" (default) or User (GMT-#) time (sometimes an option), based on the preference of the individual user. For "Device (local)" time the information in a report is based on the local time relative the time zone set for the device. For "User (GMT-#)" time the information in a report is based on the respective time zone of the user; this option is not available for aggregated data that is stored in Device time (e.g. day and week granularity). In such an instance where "User (GMT-#)" is selected, the Graph and Table data must rely upon 5 minute polled data or Hour granularity aggregated data, given that Day and Week aggregated data cannot be accurately adjusted to reflect adjustments for the user's time zone.

Stored Time Based Data Aggregations

The back-end database is extended to store aggregate data to optimize speed and graphical presentation to Users through the web interface, especially for reports spanning longer time periods (e.g. Week(s), Month(s), etc.).

Aggregation Granularity and Type

Polled metrics data is aggregated and stored in the database at the following granularity and in the time reference indicated for each:

Hour—GMT
  Day—Device (local) time
  Week—Device (local) time
  Month—Device (local) time The aggregate types stored at each level of granularity include:

Average
  Maximum
  Minimum

Accounts, Users and Permissions

This section describes the features for different types of accounts, users and user permissions.

Accounts/Users and Super-Accounts/Super-Users

Account

An Account is the standard account that exists in the system today. A user is the Standard user that exists in the system today. A Standard user is associated to only one Account and can only see the data for their Account. To allow the Account Filter selector to be limited to alphanumeric values (A-Z, 0-9), validation is implemented in the Admin tool to ensure all Account names start with an alphanumeric value (A-Z, 0-9), no other characters (e.g. '+', '.', etc) is allowed in an Account name.

Super-Account

A Super-Account has one or more Accounts associated to it. Users may be associated to a Super-Account, giving them access to individual accounts thereunder. A Super-Account user can work with the data for all of the Accounts under the Super-Account as though it were one large, single account. A Super-Account is always displayed in the UI along with its sub-Accounts, but with '(Super)' appended to the Account Name to indicate that it is the Super-Account [e.g. 'ABCCorp (Super)']. The Admin tool is extended so that it can create Super-Accounts and associate Accounts under Super-Accounts in addition to creating regular Accounts that aren't under a Super-Account. A Super-Account can have one or more Accounts. An Account can be under one or zero Super-Accounts.

When a user is logged in the Super-Account level in the Device/Location/Connection tree will allow them to filter data by Account(s). When a user is logged in and viewing the user page, they has an Account selector to choose whether they want to see/manage Users within an Account of if they want to see/manage individual account users by selecting the Super-Account in the Account selector.

User Permissions
Standard

All Users are considered standard users with the basic set of permissions that standard users have in the system today. With this release we will add two distinct and independent sets of permissions: Admin and Finance. A user can be granted one of both of these sets of permissions.

Admin

There are two types of Admin permissions a user can have: None and Full. Only Users with Admin/Full permissions are allowed to:
1) grant/remove Admin permissions for another user,
2) delete a user with Admin/Full permissions,
3) reset the password for a user with Admin/Full permissions,
4) access the Add/Delete button on the Device Settings interface,
5) edit/configure the Device settings data on the Device Configuration interface,
6) access the Interface Configuration, Tunnels Configuration and VIP Configuration interfaces.

Finance (Admin/Read)

There are three types of Finance permissions a user can have: None, Read and Admin. Only Users with Finance/Admin permissions are allowed to:
1) grant/remove Finance permissions for another user,
2) delete a user with Finance/Admin or Finance/Read permissions,
3) reset the password for a user with Finance permissions,
4) configure/edit the Cost Equipment Costs data on the Device Configuration interface.

Only users with Finance permissions (Admin or Read) have access to view Cost data in reports.

A user with Admin/None permissions and Finance/Read permissions is able to view Cost data in reports, but will not be able to access any of the interfaces that require Finance/Admin or Admin/Full permissions.

Super-User

Super-Users have full control (Admin & Finance) within their Super-Account and the Accounts under the Super-Account.

User Names

User names need to be unique within the system. One of the ways we will ensure user names are unique across multiple customer accounts is by requiring user names to be fully-qualified email addresses. Validation needs to be performed when creating/editing user logins in the Admin Tool and the User Configuration interface (FIG. 25) to ensure that the user name is a fully-qualified email addresses and that duplicate user names aren't entered across the system.

Polling and Metrics

This section describes additional metrics in embodiments of the invention:

Calculated Metrics

The following metrics is calculated at polling time and then stored and made available in the system in the same manner as the existing metrics:

Device Metrics

Device Memory Utilization (%) (Memory Used/Memory Installed)

Device Traffic Utilization (%) (Sum of Interface Traffic/Sum of Interface Capacity)

Device Traffic (Total=Inbound+Outbound)

Device Inbound Traffic (Sum of Interface Inbound Traffic for the device)

Device Outbound Traffic (Sum of Interface Outbound Traffic for the device)

Device Packets/Sec (Total=Inbound+Outbound)

Device Inbound Packets/Sec (Sum of Inbound Packets/Sec for the device)

Device Outbound Packets/Sec (Sum of Outbound Packets/Sec for the device)

Device Errors (Total=Inbound+Outbound)

Device Inbound Errors (Sum of Interface Inbound Errors for the device)

Device Outbound Errors (Sum of Interface Outbound Errors for the device)

Device Discards (Total=Inbound+Outbound)

Device Inbound Discards (Sum of Interface Inbound Discards for the device)

Device Outbound Discards (Sum of Interface Outbound Discards for the device)

Interface Metrics

Interface Traffic (Total=Inbound+Outbound)

Interface Traffic Utilization (%) (Interface Traffic/Interface Capacity)

Interface Packets/Sec (Total=Inbound+Outbound)

Interface Inbound Packets/Sec (Sum of Inbound Packets/Sec (Unicast and Non-Unicast))

Interface Outbound Packets/Sec (Sum of Outbound Packets/Sec (Unicast and Non-Unicast))

Interface Errors (Total=Inbound+Outbound)

Interface Discards (Total=Inbound+Outbound)

Tunnel/Interface Utilization (%) (Sum of Tunnel Traffic for all Tunnels on Interface/Interface Traffic)

Tunnel Metrics

Tunnel Traffic (Total=Inbound+Outbound)

VIP Metrics

VIP Traffic (Total=Inbound+Outbound)

For the computed total metrics, only the total metric is shown on the metric tree; the inbound and outbound metrics will no longer be displayed in the tree as they are currently in the system (e.g. only Interface Traffic displays in the metric tree and Interface Inbound Traffic and Interface Outbound Traffic will not display in the metrics tree.

Polled Metrics

The following SNMP polled metrics (non-calculated) are included in embodiments of the system. These metrics will not be displayed in the metrics tree, but are used to compute calculated packets/sec metrics.

Interface Inbound Unicast Packets/Sec

Interface Outbound Unicast Packets/Sec

Interface Inbound Non-Unicast Packets/Sec

Interface Outbound Non-Unicast Packets/Sec In a further embodiment of the invention, and with reference to FIG. 9 the following description is provided:

Overview of Apps

The primary purpose of this description/embodiment of Apps is to provide users with a better understanding of application usage over critical infrastructure. Ultimately, users should have insight to application performance and its impact on costs and infrastructure requirements.

Referring to FIG. 9, in another embodiment of the invention, Apps is a co-source solution—meaning that it will leverage a collector on the client premises (CPE—client premise equipment), and a fully-managed cluster in 's hosted environment (host). Unlike our current solutions, Apps will necessitate several architectural and security enhancements to facilitate a successful co-source deployment.

Similar to Cost, Apps is available as an add-on to Platform accounts.

Goals of Manipulation

In another embodiment of the invention, Apps will enable users to simply access (a) application performance and (b) subnet utilization through the Platform Portal. Ideally, Apps should allow users to point, click and drill-down to application and subnet details in a simple and intuitive format (masking the complexity of the system, which are transparent to the user). Similarly, templates should enable users to generate reports that depict application data and subnet utilization in a variety of formats.

Application Usage Data

In another embodiment of the invention, Apps leverages packet-sampling technologies to capture port and protocol data, which can be translated into application usage. Apps gathers data through a CPE residing inside the user's internal network (behind the firewall or DMZ). Data collected on the CPE is analyzed based on user defined parameters, then transported securely to the hosted datacenter environment.

Subnet Usage

Apps includes the ability to create and define subnets through the Platform to manipulate, view and analyze application data based on user-defined port and protocol combinations.

Information

In another embodiment of the invention, to develop the features and functionality described herein, Apps collect and synthesize packet-sampling data. The two principle packet sampling technologies are NetFlow (a proprietary Cisco sampling technology), and sFlow (an open source sampling technology—RFC 3176—leveraged by several hardware makers). Irrespective of packet-sampling methods, raw data synthesized by Apps includes the following information:

Application-Level: Port, Protocol, From, To

In another embodiment of the invention, Flow samples include the Port, Protocol and the From/To route addressing. This data can then be associated with a particular user-defined application and subnet.

Value: Bytes, Packets Per Second

The values collected for the above information are bytes per second (bps), and packets per second (pps). This data can then be used to analyze flow samples by application or subnet.

Web User Interfaces

Figure 50:
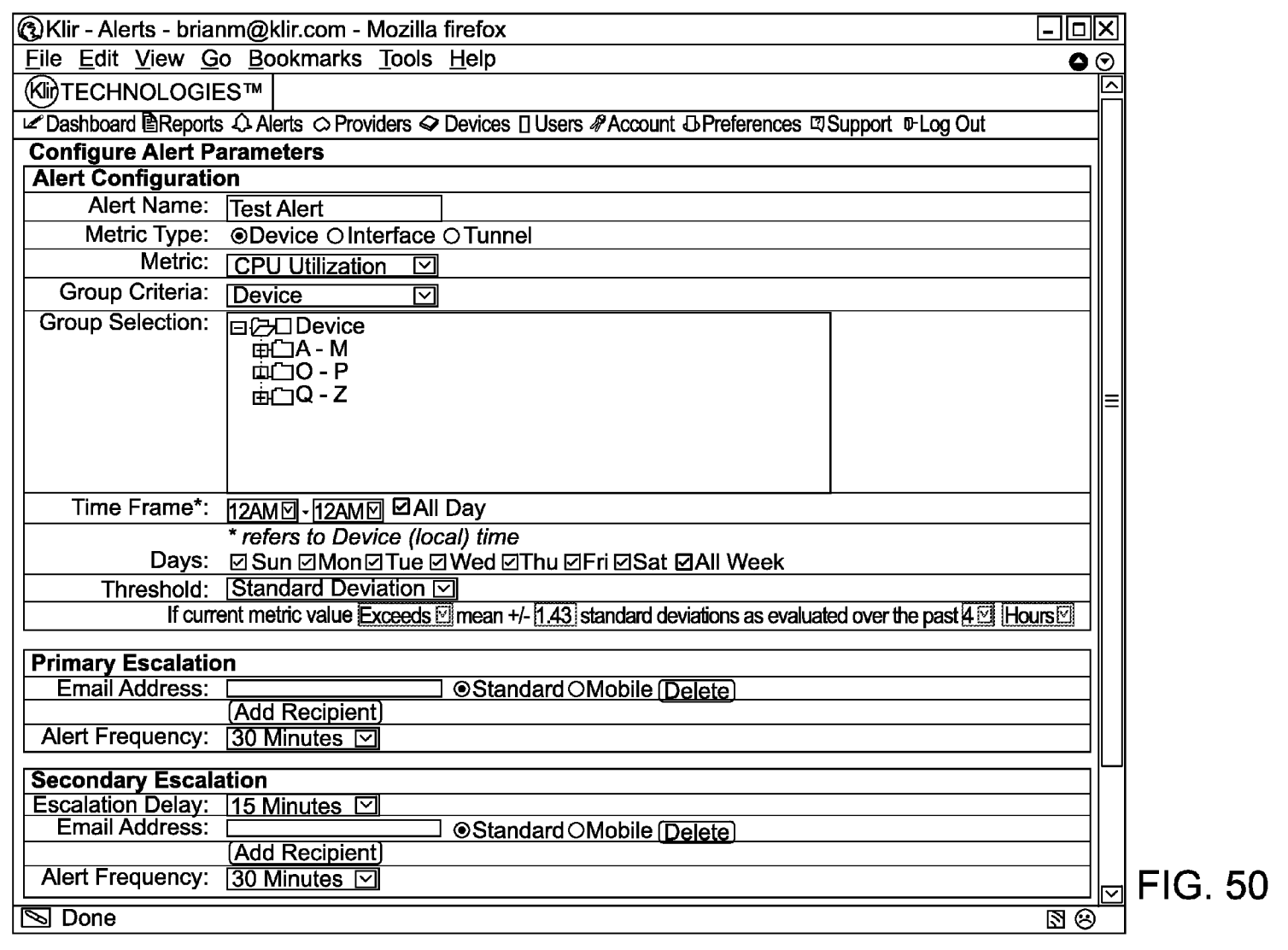

Referring to FIGS. 64-67, in another embodiment of the invention, through the Platform (FIG. 50), the user is able view and edit (a) flow settings; (b) port application settings; and (c) subnet settings. All client manipulation of Apps is through the Platform; the CPE is a hardened box inside the user's network (that cannot be manipulated by the user).

Updates to the Devices (Table)

The Devices table under the Platform Device.Interface UI are updated to include new fields that identify flow devices and attributes.

Basic Information

The Devices table, in various embodiments, includes the following additional attributes in a table format: flow data (check mark), collector (alias), and flow from IP (value). Elimination of the model and business unit from the Devices table are considered to accommodate additional width. The edit button located below the table should only include the ability to redirect flows to a different collector (if more than one). The user should have no other ability to modify flow settings.

Updates to the Interfaces (Table)

The Interfaces table under the Platform Device.Interface UI are updated to include new fields that identify flow interfaces and attributes.

Basic Information

The Interfaces table should include the following additional attributes in a table format: flow data (check mark), and collector (alias), and flow from IP (value). The flow from IP should have a default value the same as the Interface IP. However, given that flow samples can be sent from a different IP, the CPE application are configured to receive flows from different IP addresses.

The edit button located below the table should include the ability to only: (a) modify the flow from IP; or (b) redirect flows to a different collector (if more than one). The user should have no other ability to modify flow settings.

Port Application Settings/Configuration

Figure 64:
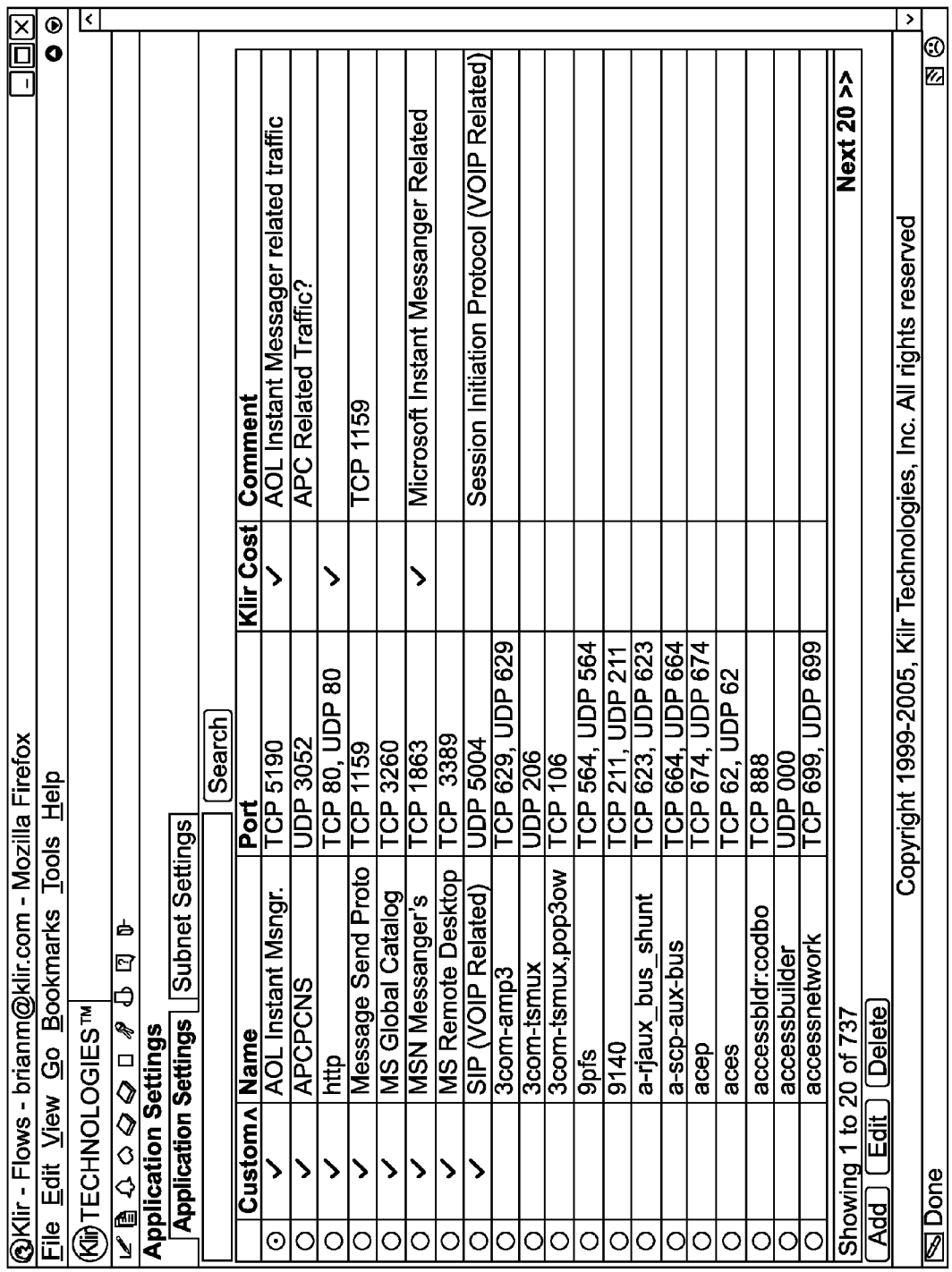
FIG. 64 is a screen display of the Application Settings page, a listing of custom (user-defined) and standard (IANA) applications for the account in an embodiment of the present invention.

Referring to FIG. 64, in another embodiment of the invention, the Port Application Settings UI and Port Application Configuration UI should enable the user to identify and configure port and protocol relationships to analyze flow data gathered by the collector.

Port/Application Settings UI

With continuing reference to FIG. 64, in another embodiment of the invention, the Port/Application Settings UI comprises a table that sets forth the parameters of port and protocol relationships to specified applications. The table should include the following fields: radio buttons, port (1-65535), protocol (TCP, UDP, ICMP, IPSec), application name (free form), IANA standard (check mark), application group (check mark), Cost (check mark) and comment (free form). Add, Edit and Delete buttons are below each table.

IANA Standard Port and Protocols

With further reference to FIG. 64, in another embodiment of the invention, Port and protocol standards established by IANA, which are assigned to pre-defined applications and limited to port numbers 0 to 1023 (validate), are identified as Standard under the Port/Application Settings table. Port and protocol relationships established by IANA may not be modified, however, a user should have the ability to edit the application name, and/or add it to an application group.

New Port and Protocols

A user can create any unique port and protocol relationships for an application, provided it is limited to port numbers 1024 to 65535 (validate). Protocols are limited to TCP, UDP, ICMP and IPSec. A user should have the ability to create multiple port and protocol relationships for a single application as an application group.

Application Groups

Referring to FIG. 66, in another embodiment of the invention, a user can automatically create an application group by two methods. One, a user can modify IANA Standard application names to share exactly the same name (in which case the data will now be stored as an application group). Second, a user can configure multiple port and protocol relationships when adding or editing a port and protocols via the Port/Application Configuration UI.

If multiple ports and protocols are assigned to a single application, then they is displayed and stored as an application group. Data will not be stored for individual ports of an application group.

Port/Application Configuration UI

Referring to FIG. 66, in another embodiment of the invention, the Port/Application Configuration UI should allow a user to configure port and protocol associations with a particular application, visible in a table format.

Custom Port/Application Configuration

If a user selects to add or edit a port and protocol relationship, the user are presented with a custom application name field (free form), application comment (free form), and a table identifying the appropriate attributes: port (free form; validate 1-65535), protocol (drop down: TCP (default) or UDP—when configuring ports, it only makes sense to specify TCP or UDP—the other IP protocols don't have useful port information), comment and delete button. All edits are available in-line in the table. Users are able to add multiple port and protocol combinations for a single application.

Both UDP and TCP have standard ports (1-1023) defined—it's not an either-or situation. If multiple port and protocol combinations have been entered for a single application, then, it are displayed (check mark) as an application group in the Port/Application Settings table.

Application Costs (Cost)

If Cost has been purchased, then a user with Admin or Finance permissions should have the ability to enter application costs. Costs should include: procurement, maintenance, and labor. Application Costs should operate in the exactly the same fashion as Equipment costs in the current Platform 4.0.

Referring to FIG. 66, in another embodiment of the invention, Application Costs may be entered for an individual port and protocol, or for an application group (but not both). If data has been entered for an individual port and protocol, that is later added to an application group, then such Cost data is deleted (note: send Warning! message).

Unlike equipment or circuits, the user may not set a target or Key Performance Indicator for an application.

Subnet Settings/Configuration

Figure 67:
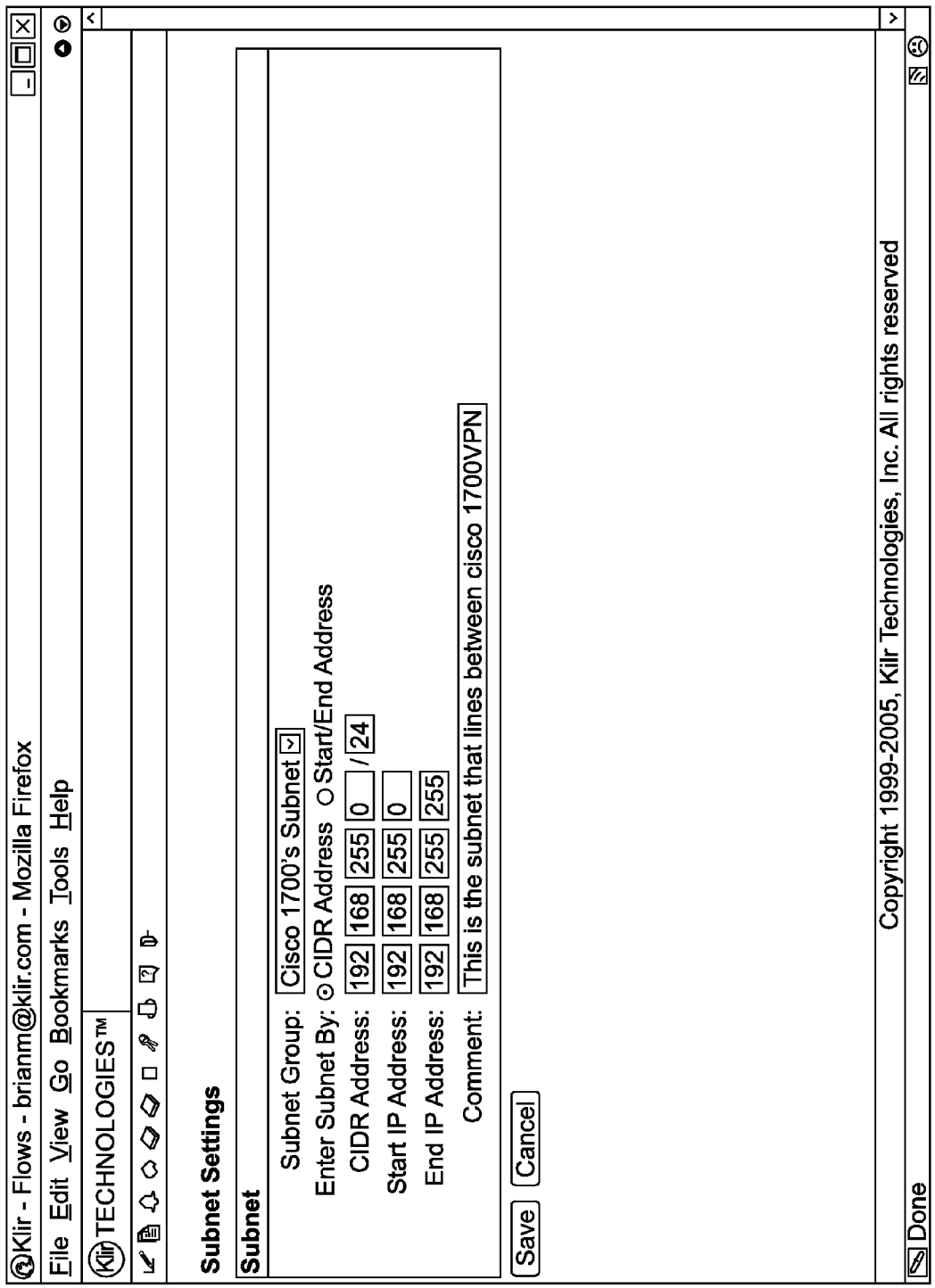
FIG. 67 is a screen display of the Subnet Configuration page for custom subnet grouping where a user may indicate one or more subnets that belong to a named group in an embodiment of the present invention.

Referring to FIG. 67, in another embodiment of the invention, The Subnet Settings UI and Subnet Configuration UI should enable the user to identify and configure subnets to analyze flow data gathered by the collector.

Subnet Settings UI

Referring to FIG. 65, in another embodiment of the invention, the Subnet Settings UI should consist of a table that displays the various subnets and attributes. The table should includes: radio buttons, CIDR address, start IP address, end IP address, subnet name, and comment. Add, edit and delete buttons are below the table. Default sort are by CIDR address in ascending numerical order.

Subnet Config UI

Referring to FIG. 67, in another embodiment of the invention, if a user selects to add or edit a subnet, the user are presented with a custom subnet name field (free form), and a table identifying the appropriate attributes: CIDR address (free form/auto; validate), start IP address (free form/auto; validate), end IP address (free form/auto; validate), comment and delete button. All edits are available in-line in the table. Users are able to add IP address ranges for a single subnet.

When entering IP address ranges, the user should have option of entering a CIDR range, in which case the start and end IP addresses should automatically populate. Alternatively, if a user enters a start and end IP address, the CIDR address should automatically populate. IP Address ranges will need to be validated to ensure accurate ranges based on CIDR standards, and no overlap with other subnets configured on the system.

If a user selects to delete a subnet, a Warning! Message should confirm deletion before proceeding.

Report Templates

Referring to FIG. 68, in another embodiment of the invention, through the Platform, users should have access to a variety of templates for purposes of reporting on application and subnet usage. Client manipulation of data through the Platform will operate on the same premises and assumptions as the current system (e.g. saving, email, dashboard, time display/drilldown), unless otherwise noted.

Multi Application Template Features

Referring to FIG. 59, in another embodiment of the invention, the Multi Application template should sort data by the throughput of the top applications. Beneath the range row of applications, the individual group criteria items may be displayed by selecting the Details toggle option.

Multi Application Template Graph

The Multi Application template graph displays a line graph of the top applications (listed below the Range row) within the datagrid. Furthermore, a pie chart is provided to show the overall average by percentage comparison against each other.

Multi Application Drilldown

The Multi Application template provides drilldown by group criteria within the template. Single Application template drilldown is provided within each individual range application and group criteria application listed in this template.

Single Application Template

Figure 60:
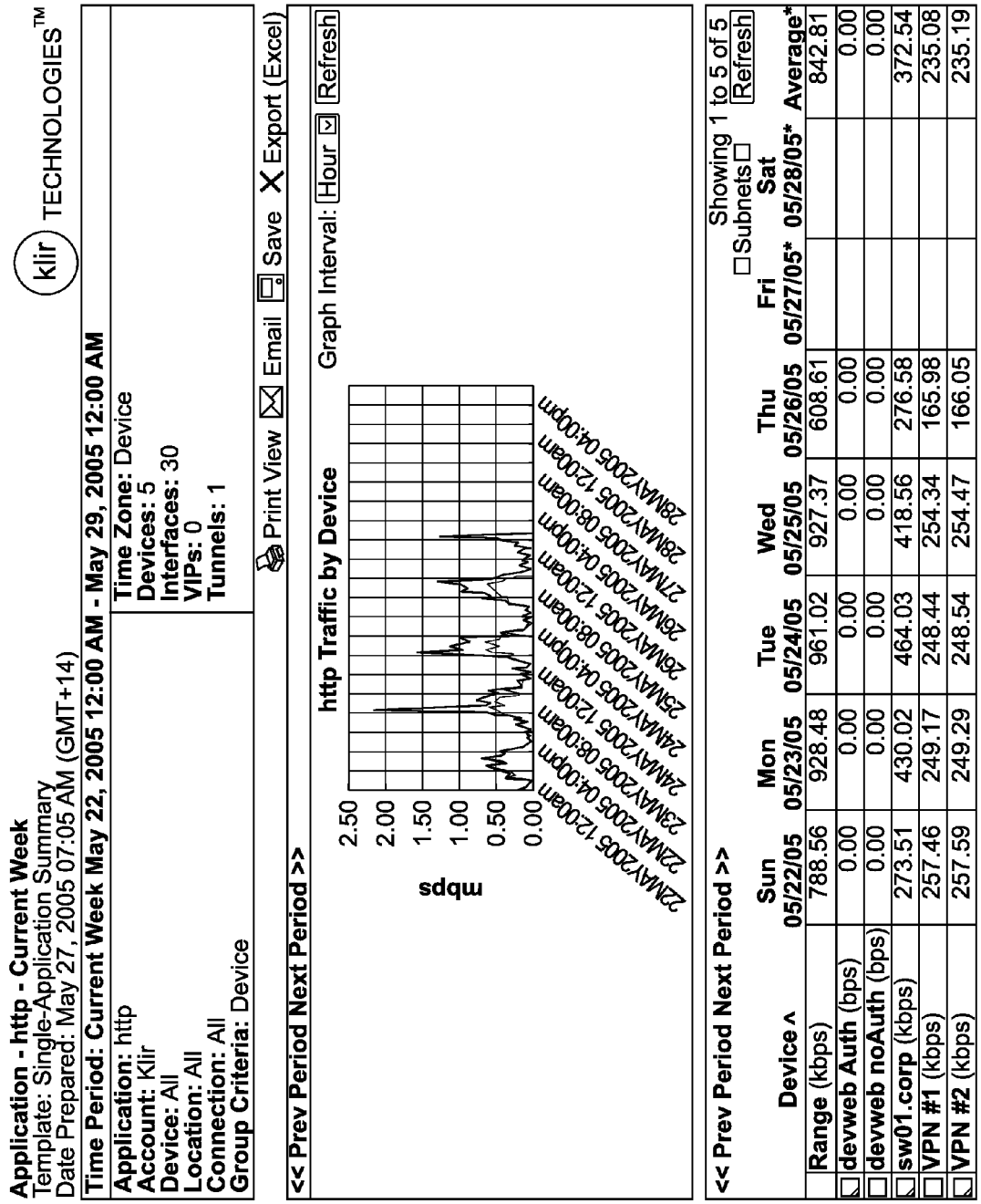
FIG. 60 is a screen display of the Single Application Summary template in an embodiment of the present invention.

Referring to FIG. 60, in another embodiment of the invention, the Single Application template is designed to provide detailed usage information about a single application by a selected group criteria.

Single Application Template Create Report

Referring to FIG. 69, in another embodiment of the invention, after the Single Applications template is selected in the Create Report UI, the user are presented with an option to Select Application. Under Select Application, three folders are available to the user: custom applications, standard applications, unidentified applications. A user may only select one/application for purpose of generating a report.

Once an application has been selected by the user, the Select Devices Tree should populate (Devices, Connections, Locations), in addition to default selections for group criteria and display options.

Custom Applications

Referring to FIG. 69, in another embodiment of the invention, the custom applications folder presents the user with all unique applications in alphabetical order configured by the user for ports (1024-65535). If no name has been assigned by the user, then it should list the application by port number (protocol). In addition to individual custom applications, application groups should also be listed under the custom applications folder.

Standard Applications

Referring to FIG. 69, in another embodiment of the invention, the standard applications folder should present the user with all IANA standardized applications in alphabetical order. Given the immense number of IANA applications, we should consider either or both: (a) listing only IANA applications for which data has been gathered; or (b) creating subfolders by letters A to Z.

Custom Applications

With continuing reference to FIG. 69, in another embodiment of the invention, the custom applications folder presents the user with all custom applications (shared at an account's level), a grouping of port/protocol assignment based off both IANA standardized applications and unidentified applications. Costs may also be associated with custom applications.

Unidentified Applications

The unidentified applications are displayed as individual port/protocol (e.g. TCP 5430) entries within the templates. They may be included and grouped together within custom applications at a later time by the end user.

Single Application Template Features

Referring to FIG. 60, in another embodiment of the invention, the Single Application template should sort data by the selected group criteria in alphabetical order. Beneath the group criteria, three different toggle options can provide further detail to the user: Subnets and From/To.

A user may always select the Subnets toggle. However, a user may only select from/to if only the Subnets toggle is selected. Range totals should sum up usage across the entire group criteria, and for each detail item (subject to the toggle selection).

Subnet Toggle

If the subnet toggle is selected, application usage by subnet are displayed underneath each group criteria item. Subnet data are sorted in descending order. Subtotals of all subnet usage across all group criteria are displayed in the Range totals in descending order.

If user also selects the from/to, then the appropriate source and destination data will populate beneath each subnet.

From/To

If the from/to toggle is selected, from and to data are displayed underneath each group criteria item. Subtotals of from and to usage across all group criteria are displayed in the Range totals.

If the user also selects the subnets toggle, then the from and to data are displayed underneath each subnet item.

Single Application Template Graph

The Single Application template should graphically represent data in a form of line graph for each Group Criteria row in the table (not including subnet and from/to values).

Single Application Template Drill-Down.

The user should have the ability to drill down to a single group criteria (spawning another single application report window), or to a specific subnet (spawning a Subnet report window). T Subnet Template Referring to FIG. 61, in another embodiment of the invention, the Subnet template is designed to provide detailed usage information about a single application for a specific subnet.

Subnet Template Create Report

The Subnet Template is accessible by drilling down on an subnet within the Single Application Once a subnet and application have been selected, the Select Devices Tree should populate (Devices, Connections, Locations), in addition to default display options. Note: default for Group Criteria are set to subnet (with no ability to manipulate).

Subnet Template Features]

The Subnet template sorts data by From (Source) and To (Destination). Underneath from and to, data are sorted by subnet or CIDR address utilization in descending order. Aggregation for CIDR address roll-up rules. Range totals should sum up total From and To usage. No toggle options are made available to the user.

Subnet Template Graphs

Figure 61:
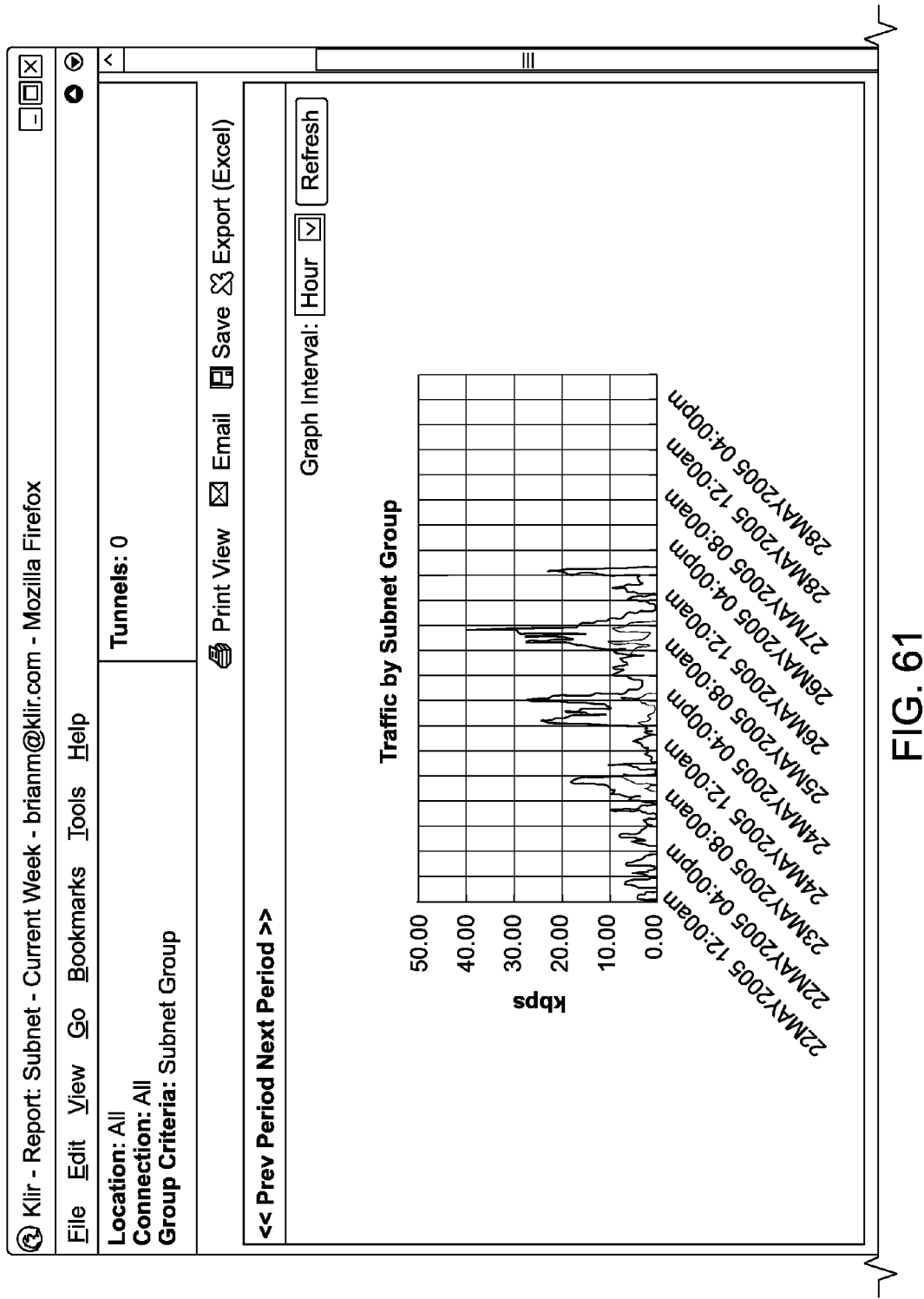
FIG. 61 is a screen display of the Subnet Summary template in an embodiment of the present invention.

Referring to FIG. 61, in another embodiment of the invention, the Subnet template should graphically represent data in two (2) separate line plots within the same graph; one for From (and each row thereunder), a second for To (and each row thereunder).

Subnet Template Drill-Down

The user should have the ability to drill down from the Subnet template to specific From/To utilization data (spawning a From/To template report window). However, if an item in the Subnet Template is a CIDR Roll-up (e.g. 10.10.1.1/24) or a specific IP address (16.256.44.78), then there is no drilldown to the From/To Template for that item only.

Application Costs Template

Figure 63:
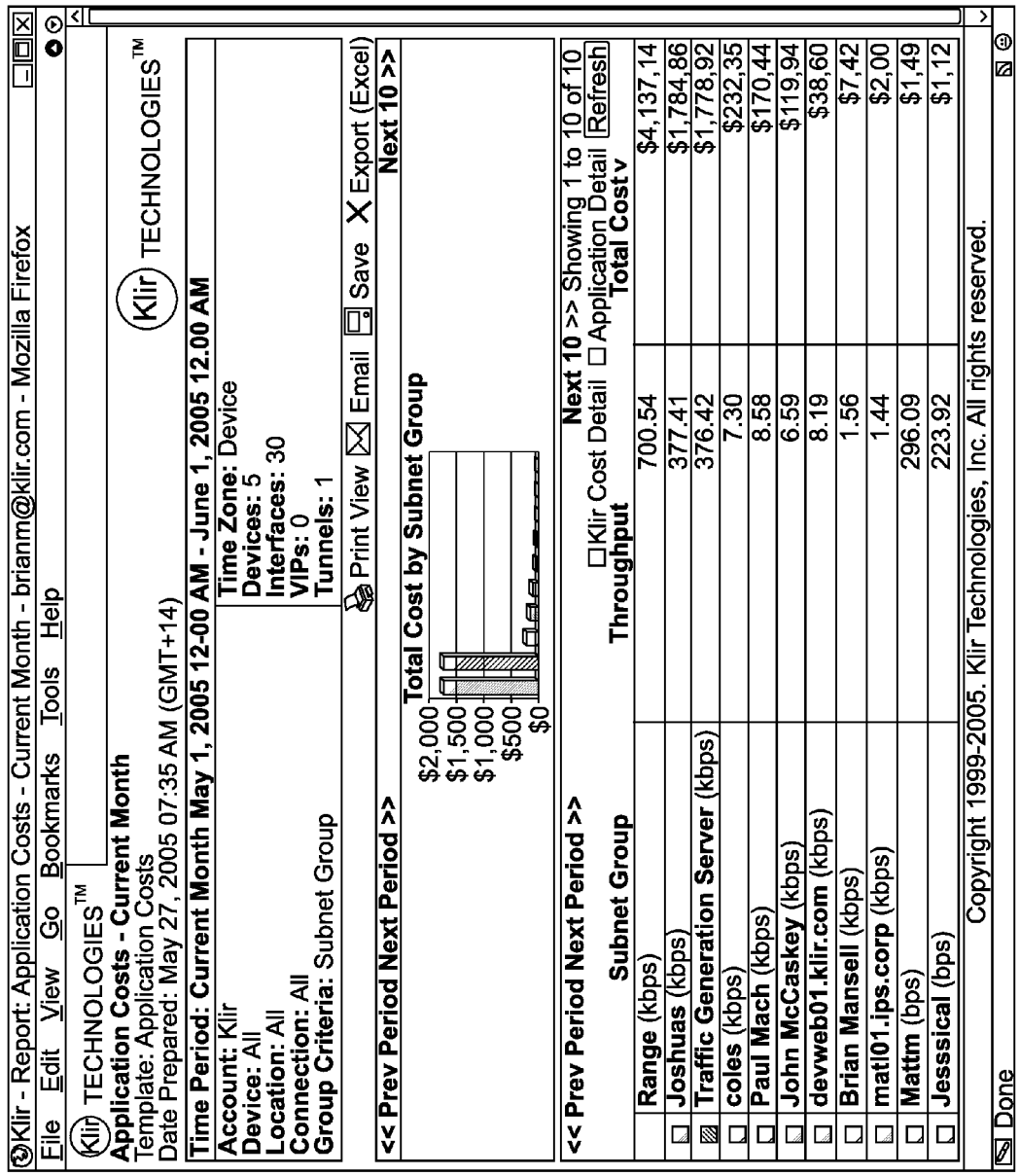
FIG. 63 is a screen display of the Application Costs Summary template in an embodiment of the present invention.

Referring to FIG. 63, in another embodiment of the invention, the Applications Cost template is a summary of costs across custom applications established by the end user. It provides the flexibility to display costs per subnet group or per application. As far as graphing is concerned, this template displays a bar chart of the costs by the selected group criteria (either application or subnet group). The costs for each application is allocated by a percentage of the average throughput of each identified subnet group for the selected view range.

By clicking on the Cost detail toggle, the user is presented with an itemized summary of maintenance, labor, purchase/lease costs pertaining to each application. Application/Subnet detail shows granular detail below the group criteria rows of the template.

Drilldown capabilities within the template allow the end user to drilldown to the Single Applications and Subnet templates.

Top Talkers Template

Figure 62:
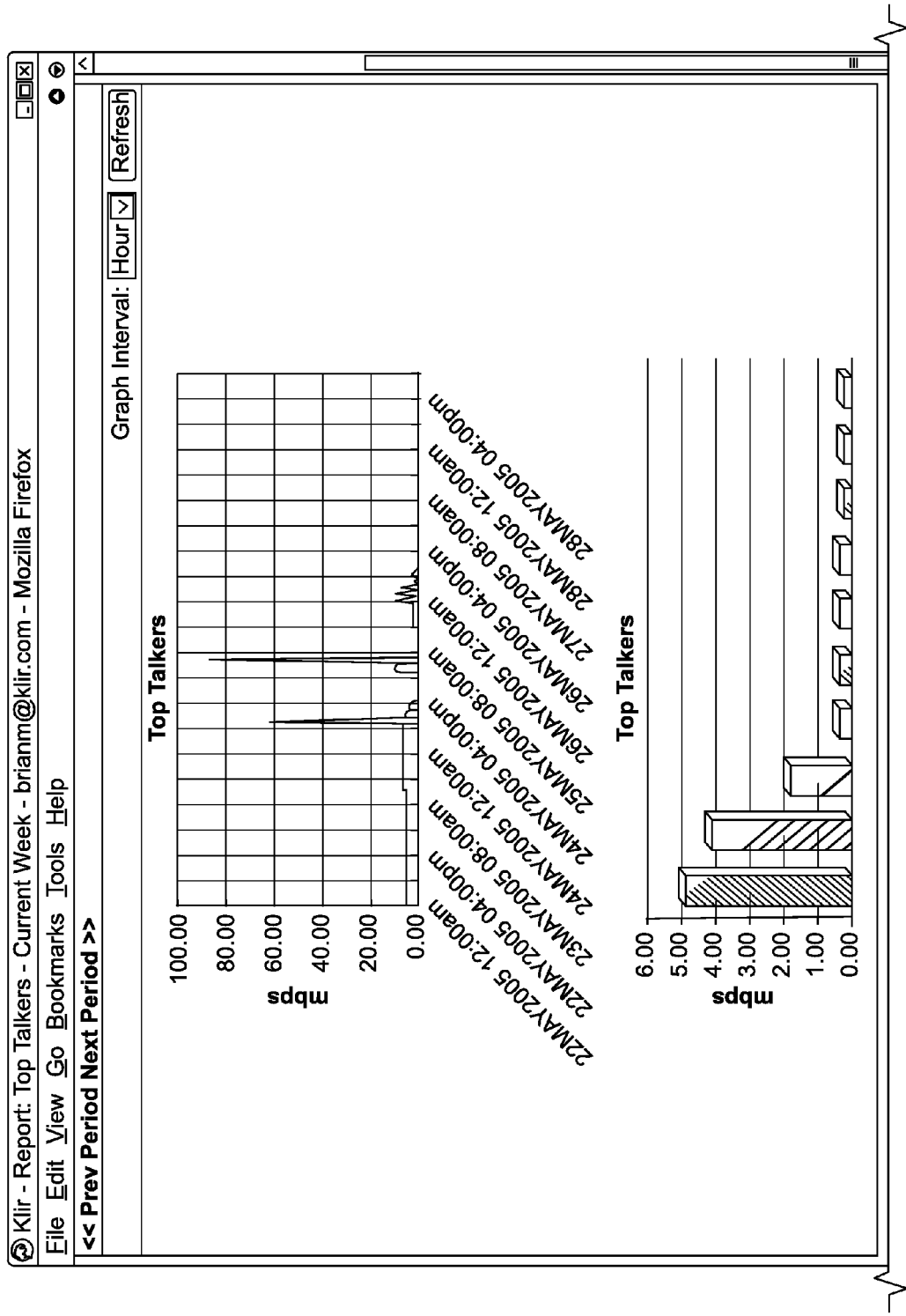
FIG. 62 is a screen display of the Top Talkers Summary template in an embodiment of the present invention.
Figure 62:
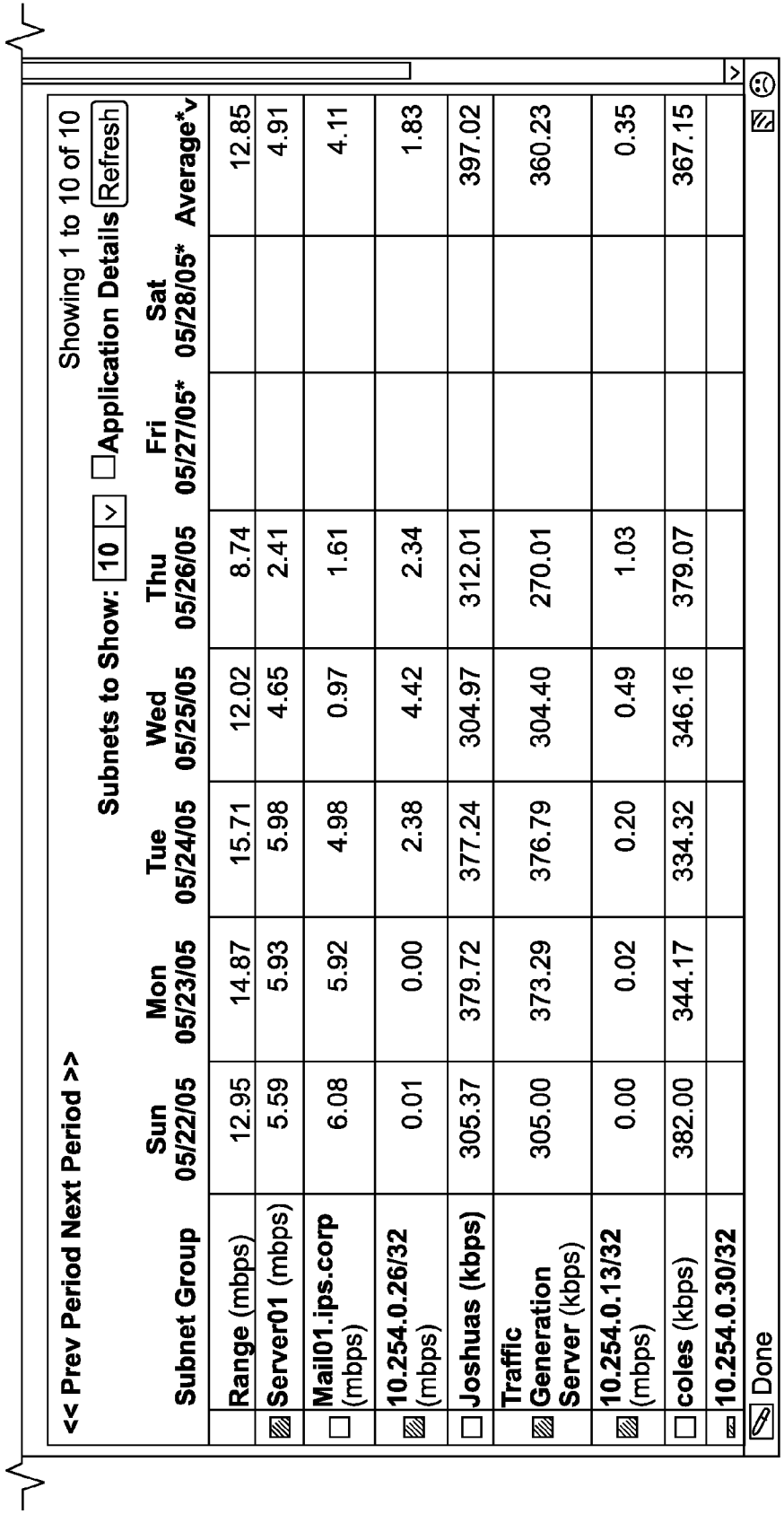

Referring to FIG. 62, in another embodiment of the invention, the Top Talkers template is a summary of the top subnets by throughput for a given view range. By default only 10 subnets are shown, but a selector for Subnets to Show provides expansion beyond this. Also, the Application Details toggle allows the end user to display the individual application traffic for each subnet listed in this template.

Drilldown capabilities within this template allow the end user to drilldown to the Subnet template.

Collector/CPE Application

The Collector are an off-the-shelf server that can be preconfigured and drop-shipped directly from the manufacturer to a user. The Collector's primary function is to support Apps'CPE Application, designed to receive sampled flow data from inside a user network, then analyze, filter and securely transmit summary data to data-center.

Securing the Connection

The CPE Collector will establish a secure connection to the proxy server in the datacenter using SSLv3 or TLS v1.0. Both the Collector and the Proxy is assigned public key x509 certificates signed by the Internal Certificate Authority. Before any data is communicated the SSL code in the Proxy and Collector will handshake to determine the authenticity of the remote side and establish and encrypted transport using AES256 bit encryption and SHAT hashing. All data passed will thus be encrypted and trusted based on the SSL/TLS encryption handshake.

Synchronize Configuration (of CPE Application)

Prior to analyzing flow data, the CPE Application must synchronize its configuration with those defined by the user through the Platform and stored in the hosted proxy server.

Check for Config Changes

Roughly corresponding to each 5-minute interval, the CPE application should attempt, using the secure connection to the host, to confirm if the port and protocol definitions have been updated by the user, or if additional flow devices have been added to the account. See Transport for secure transport protocols.

If no updates have been made, or if the connection to the host is unavailable, the CPE application should proceed to analyze flow samples based on the existing user configuration.

Send Updated Config

If the CPE application confirms that the user has updated the port and protocol definitions or added flow devices, then the collector should download updates accordingly. If, for some reason, a secure connection to the host cannot be negotiated, or if updates are unable to be downloaded, the CPE application should continue to process data based on the pre-existing configuration.

After updates have been downloaded, the CPE application should proceed to analyze flow samples based on the new user configuration.

Data Collection

The Apps CPE Application is designed to accept data sampling from any user-designated flow devices. All flows from devices not designated and identified by the user are discarded (though the offending source IP address(es) are kept around for some small interval of time, to support status inquiries).

Flow Data types

The two principle forms of flow data samples to be received and analyzed by the CPE application are NetFlow and sFlow. Regardless of the type of flow data, flow devices are configured to sample one out of every 100 packets. A sampling rate of 1:100 should provide sufficient accuracy without overburdening the flow devices. The same sampling rates are used with both sFlow and NetFlow simply for consistency.

NetFlow

The proprietary packet sampling technology developed by Cisco is called NetFlow. Apps's CPE application are designed to support current version of NetFlow, versions [insert v. numbers].

NetFlow includes the capability to configure packet sampling rates and data capture over user-defined time intervals. The sampling rate for flow devices are configured for 1:100 packets. Cisco's data capture for user-defined time intervals is a unique feature that summarizes packet information over a defined period of time. Flow devices are configured to send packet summaries every 60 seconds.

sFlow

The open source packet sampling technology called sFlow is published in RFC 3176. Developed by former engineers at HP, sFlow is a packet sampling technology found embedded (usually in an ASIC) on many Cisco competitors: including HP, Foundry, Extreme and Hitachi. sFlow includes only the ability to configure packet sampling rates. sFlow default is sampling rate is 1:512 packets; however flow devices are configured for 1:100 packets to ensure accuracy of information for data comparison (between NetFlow and sFlow devices).

sFlow does not include the ability to configure data capture over user-defined time intervals. As such, for particularly large client infrastructure (e.g. gig-E traffic), the collector could be processing large samples of packet data from sFlow devices.

Form of Data

Data received by the CPE application are designed to receive the following information from designated flow devices:
  Source Address
  In/Out Interface Number
  From/To Address
  From/To Port
  IP Protocol
  Start Time/End Time [Cisco only]
  # of Bytes
  # of Packets From the above information, the CPE application should analyze such data based on a user's recent configuration parameters, to determine "interesting ports" and to summarize data accordingly for database inserts.

Database inserts should include the following information.
  Timestamp
  Interface ID
  Direction In/Out
  IP Protocol
  "Interesting Port" (see below)
  "Unintersting Port"
  From Subnet ID
  From CIDR Address
  To Subnet ID
  To CIDR Address
  # of Bytes
  # of Packets "Interesting Port"

Many applications traverse different source and destination ports, thereby impacting the ability to analyze data based on user-defined port/protocol combinations. To ensure accuracy in reporting and handling of port data, the following hierarchy is used in determining the "interesting port" for purposes of analysis:
  If destination port <1024, then use destination port
  Or else, if source port <1024, then use source port
  Or else, if destination and source ports are known, then use minimum port (source or destination)
  Or else, if destination port is known, use destination
  Or else, if source port is known, use source
  Or else, use minimum port (source or destination)

Aggregation

Flow data is available for a variety of port and protocol combinations, defined and undefined. Similarly, data will flow among defined and undefined subnets, internal and external to the user network. Additionally, applications and subnets use in some cases may not reach critical thresholds, which can then be consolidated (into an "Other" category). As such, the following aggregation rules are utilized as a baseline to assimilate data.

Applications: Identified v. Unidentified v. Other

In another embodiment of the invention, for applications, the CPE application should define "interesting ports" based on actual total throughput as a percentage of total capacity (e.g. 2 mbps, would equal 2% on a FastE 100 mbps circuit). If an application has been defined by user-defined port and protocol combination or is a standard IANA port and protocol combination, then any utilization exceeding a set percentage (e.g. 1%) are recorded in the database. If a port and protocol combination has not been defined by the user or IANA, then any utilization exceeding another set percentage (e.g. 5%) are recorded in the database as Unidentified (recording port (protocol) as the application). If there is utilization below these thresholds that accumulates to more than another set percentage (e.g. 1%), that utilization are aggregated and summarized as "Other" (with no port (protocol) definition).

From/To: Identified v. Unidentified v. Other

Within the traffic for a given application, there are four cases:
  Both the From subnet and the To subnet are identified
  Only the From subnet is identified
  Only the To subnet is identified, and
  Neither subnet is identified.

If both subnets are identified, then, for each pair of identified subnets, utilization exceeding the set percentage are recorded in the database.

If only one of the subnets is identified, then any utilization exceeding the set percentage are recorded in the database, with the unidentified addresses being described using CIDR roll-ups, as defined below.

If neither subnet is identified, then any utilization exceeding the set unidentified percentage are recorded in the database using CIDR roll-ups, as defined below, for the unidentified addresses.

If there is utilization below the above thresholds, but accumulating to more than the other set percentage, then the total utilization are aggregated and summarized as an application-specific "Other" (with no From or To subnet information).

CIDR Roll-up v. Other

When dealing with IP addresses outside of the user-defined subnets, the CPE application should summarize those addresses using CIDR roll-ups.

If any individual address exceeds a set percentage (e.g. 5%), then it are recorded. Otherwise it should get aggregated together into the next larger CIDR. If that CIDR exceeds a set percentage, then it are recorded, otherwise it gets aggregated into the next larger CIDR. This process repeats until the set percentage threshold is achieved, or the largest CIDR has been considered. If, after accounting for all of the addresses and CIDRs that exceeded the set percentage, there is left over utilization exceeding a lesser set percentage (e.g. 1%), then that are entered in the database as "Other".

As an example, let's say, on a 100 mbps link, we see the following utilization:

192.168.0.1 accounted for 2 mbps
192.168.0.2 accounted for 20 mbps
192.168.0.3 accounted for 2 mbps
192.168.0.5 accounted for 2 mbps
192.168.0.253 accounted for 1 mbps
192.168.0.254 accounted for 1 mbps 192.168.0.2 have its own entry in the database, as it exceeds 5% all on its own.

192.168.0.0/31 accounts for 2%, so it doesn't get recorded.

192.168.0.0/30 accounts for 4% (after discounting the traffic attributed to 192.168.0.2), so it doesn't get recorded.

192.168.0.0/29 accounts for 6% (after discounting the traffic attributed to 192.168.0.2), so it does get entered in the database.

The remainder doesn't exceed 5%, but it does exceed 1%, so an "Other" entry is added to the database, listing 2% of the utilization.

Failover

Apps are designed to provide high availability to users. The system should account for issues created by the user, or the open Internet. In any case, Apps should have complete internal and external failover to ensure data integrity and minimize potential impacts due to structural failures.

Redundancy

Referring to FIG. 9, in another embodiment of the invention, it is assumed that host will maintain fully-redundant infrastructure. At the user site, Apps should include fully-redundant hardware for hot failover of the CPE application. As a result, the CPE application is designed to run in an active or passive mode.

Any failover of the CPE application are transparent to the user. For purposes of receiving flow data, a single internal IP address needs to transfer between the two servers and CPE application in the event of failover.

Automatic Hot Failover

Referring to FIG. 9, in another embodiment of the invention, in the event of server failure (e.g. hard drive burn out), the CPE application should automatically failover to the passive server immediately. While transparent to the user, the automatic failover should trigger a notification and alert to and the user Admin to address repair and/or replacement.

Controlled Hot Failover

In the event of server upgrades (e.g. OS upgrade or code upgrade to the CPE application), the host should have the ability to remotely failover to the passive collector in a controlled fashion. Security issues need to be outlined to handle this type of failover, and IP routing controls addressed (if the IP address failovers).

Cache

In another embodiment of the invention shown in FIG. 9, in the event secure transport to the host cannot be negotiated (due to a client, or Internet issues), the CPE application should cache historic data until the problem is resolved. The specifications of the server are large enough to cache up to 7 days worth of data.

Physical Configuration

Collectors 130 are drop-shipped by the server manufacturer (such as Dell) with the CPE application pre-loaded for delivery to the user.

User Site

In another embodiment of the invention, the collectors 130 are installed by the user (or Solution Provider) inside a central segment of the network, where flow data can be received from multiple user locations and access to the open Internet is available.

Collector Configuration

The collector should have a hardened OS and password-only CLI that precludes a user from making any modifications. Once installed on the user network, both active and passive collectors should immediately seek to negotiate a secure connection to a hosted flow proxy 135 to obtain configuration information.

From the Platform, the Admin user is prompted to accept random or to configure specific IP addresses for active and passive collectors. Thereafter, the user can then identify and configure flow devices.

Host Environment

The hosted flow proxy 135 must be configured to authenticate connection requests and to then negotiate and secure incoming and outgoing data transport requests from newly installed collectors 130.

Flow Proxy

All Apps communications between collectors and the CPE applications is handled by an flow proxy 135 (Flow Proxy). The Flow Proxy 135 are designed to handle a variety of functions, including: authentication, encryption, secure transport requests, inbound database writes to the back-end database servers, outbound configuration changes to the collector. See Transport below for details.

Transport

The data transport utilized between the CPE Collector and the hosted Flow Proxy 135 is standard TCP communications secured via a SSL/TLS secure socket layer. The CPE device will require an interne connection that can connect back to the hosted Flow Proxy on the designated TCP Port.

Encrypted Data Transfer

The SSL/TLS encryption layer embedded into both the Collector and the Flow Proxy will utilize AES 256 bit encryption along with SHA1 hashing algorithms in order to secure traffic after authentication has already occurred.

Security Standard: SSL/TLS

The minimum security standard is SSL v3, and the standard preferred protocol is TLS v1, which is the replacement for SSL v3. TLS v1 offers improved ciphers and overall security.

Client Authentication

Client authentication occurs using 2048 bit RSA x509 certificates. 2048 bit is well above accepted security levels and greatly exceeds that of most SSL secured websites (standard is still 512 bits). This level of security will ensure that it is impossible for a connection from anything but an distributed Collector to be made back into the hosted Flow Proxy server.

Authentication

The same level of authentication will occur client side on the CPE Collector 130 as on the hosted Flow Proxy 135. The Collector will receive a 2048 bit RSA certificate from the Flow Proxy and will abort the connection if it cannot confirm that it is in fact talking to the trusted Flow Proxy. This will guarantee that no attacker could setup a spoofed host to receive/intercept the clients monitored and confidential application flow data.

Flow Proxy

The Flow Proxy 135 is fully hosted in the datacenter. The purpose of the Flow Proxy is to authenticate collectors, send updated configurations to collectors, and to receive processed application flow data from the collectors and write it to the database. This proxy adds an additional security layer between the database and the collectors and also allows improved performance and the handling of a larger number of collectors with the same amount of database hardware.

Hourly/Daily/Weekly/Monthly Aggregation

In order to facilitate high speed generation of reports within the web based user interface the Flow Proxy 135 will periodically perform time based aggregation of the flow data. This aggregation will occur in order to create Hourly, Daily, Weekly and Monthly averages based off the collected 5 minute data in order to allow high level reports to be generated quickly. The flow proxy 135 will check for necessary aggregation work at set intervals and re-compute the averages in memory then update the database with the final values.

Accordingly, while the invention has been described with reference to the structures and processes disclosed it is not confined to the details set forth, but is intended to cover such modifications or changes as may fall within the scope of the following claims.

What is claimed is:

1. A system for monitoring information technology assets of enterprises, the system comprising:
    an application service provider database configured:
        to receive performance data from a plurality of Simple Network Management Protocol (SNMP)-enabled devices of a plurality of enterprises on a by-enterprise basis responsive to a request from a polling proxy server, wherein: the received performance data describes performance of the plurality of SNMP-enabled devices and includes application usage data, device metrics, and Internet Service Provider (ISP) performance data across data, wireless, voice over Internet Protocol, and virtual private networks (VPNs) for the plurality of SNMP-enabled devices of the plurality of enterprises; and
        the polling proxy server is communicatively coupled with polling servers that perform functions of SNMP data gathering, the polling servers communicatively coupled with the polling proxy server to determine SNMP-enabled devices that need to be polled, the polling servers grouped into polling clusters, wherein each polling cluster has at least two polling servers that enable each enterprise to use a same Internet Protocol (IP) address range for associated SNMP-enabled devices, and that enable unique identification of SNMP-enabled devices, each polling cluster assigned to a virtual firewall system; and
        to receive an alert about a prediction of a failure of an SNMP-enabled device from the polling proxy server; and
    a user interface to the application service provider database configured:
        to display a report showing a correlation of the received performance data and costs associated with SNMP-enabled device performance described by the received performance data for a respective enterprise responsive to receiving an authorized request from the respective enterprise, wherein costs associated with SNMP-enabled device performance comprise an unrealized cost; and
        to provide a correlation of virtual private network tunnel sessions across heterogeneous network environments.

2. The system of claim 1, wherein the user interface includes a configuration screen for real-time modification of a layout of the report.

3. The system of claim 1, wherein the user interface includes selectable time frames for providing a correlation of the received performance data and associated costs in the report over a time frame of the selectable time frames.

4. The system of claim 1, wherein the correlation of the received performance data and associated costs is based on a calculated equipment key performance indicator.

5. The system of claim 1, wherein the report is a web-based display of a graph of the correlation of the received performance data and associated costs.

6. The system of claim 1 wherein the report is a tabular display of the correlation of the received performance data and associated costs.

7. The system of claim 1, wherein the user interface to the application service provider database is further configured to provide a web-based interface configured to display selectable templates and metrics for creating and saving reports.

8. The system of claim 7, wherein the user interface is further configured to:
    provide a configuration screen for real-time modification of a layout of the report; and
    provide selectable time frames for providing a correlation of performance and associated costs in the report over a given time frame.

9. The system of claim 7, wherein the user interface is further configured to provide selectable time frames for providing a correlation of the received performance data and associated costs in the report, wherein correlating the received performance data and associated costs of the plurality of SNMP-enabled devices for a selected enterprise comprises correlating the received performance data and associated costs based on a calculated equipment key performance indicator.

10. The system of claim 7, wherein the user interface to the application service provider database is further configured to graphically display a tabular report and, responsive to a selection of metrics to be generated, build a dynamic image and table.

11. The system of claim 1, wherein the application service provider database is further configured to:

analyze stored performance data against alert rules;

notify of received performance data that violates an alert rule; and correlate the received performance data and associated costs of the plurality of SNMP-enabled devices for a selected enterprise.

12. The system of claim 1, wherein the user interface is further configured to display a real-time view of performance of Wireless Access Point (WAP) equipment, the real-time view of performance includes devices availability, wireless traffic statistics over monitored equipment, wireless signal strength, wireless Quality of Service (QOS), and data that indicates whether sufficient upstream bandwidth exists to support cost effective provisioning of equipment needed to power wireless networks.

13. The system of claim 1, wherein the application service provider database is further configured to receive flow sampling data from a plurality of customer NetFlow and sFlow enabled devices that support NetFlow and sFlow monitoring, the NetFlow and sFlow enabled devices configured to send the flow sampling data to a flow collector, the flow sampling data included in the received performance data correlated with the associated costs of the SNMP-enabled devices for a respective enterprise.

14. The system of claim 1, wherein the unrealized cost is calculated based on a target value for SNMP-enabled device performance.

15. A system for monitoring information technology assets of enterprises, the system comprising:

a plurality of polling servers configured to periodically collect metrics data from Simple Network Management Protocol (SNMP)-enabled devices of a plurality of enterprises and configured to deliver the metrics data to a plurality of database servers;

a plurality of polling proxy servers configured to identify SNMP-enabled devices that need to be polled and communicatively coupled to the plurality of polling servers to collect metrics data from the identified SNMP-enabled devices;

a plurality of flow collectors, communicatively coupled with the plurality of polling proxy servers, configured to monitor and process incoming flow data, the processed flow data formatted for the plurality of database servers;

a plurality of flow proxy servers configured to maintain and read configuration data for the plurality of flow collectors, and configured to receive the processed flow data from flow collectors and transfer the processed flow data to the plurality of database servers;

a plurality of web servers communicatively coupled to the plurality of database servers and configured to provide an interface to the database servers, wherein the interface restricts a respective enterprise's access to metrics data from its respective devices, the plurality of web servers further configured to receive a configuration of a real-time cost analysis report correlated to the metrics data from its respective devices and generate the real-time cost analysis report on a web-based reporting screen for an authorized user of a respective enterprise; and a plurality of notification servers configured to check for any scheduled reports and configured to generate alert emails.

16. The system of claim 15 further comprising an alert configuration screen communicatively coupled to the plurality of web servers and configured to enable a user to configure an alert such that an authorized user will be notified of a pre-configured condition or event based on the metrics data.

* * * * *